US010171748B2

United States Patent
Kino

(10) Patent No.: US 10,171,748 B2
(45) Date of Patent: Jan. 1, 2019

(54) IMAGE PICKUP APPARATUS, NON-TRANSITORY COMPUTER-READABLE MEDIUM STORING COMPUTER PROGRAM, AND IMAGE PICKUP METHOD

(71) Applicant: Olympus Corporation, Hachioji-shi, Tokyo (JP)

(72) Inventor: Tatsuya Kino, Kodaira (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/352,800

(22) Filed: Nov. 16, 2016

(65) Prior Publication Data

US 2017/0171449 A1  Jun. 15, 2017

(30) Foreign Application Priority Data

Dec. 15, 2015 (JP) .................................. 2015-244361

(51) Int. Cl.
  *H04N 5/235* (2006.01)
  *H04N 5/345* (2011.01)
(52) U.S. Cl.
  CPC ......... *H04N 5/2355* (2013.01); *H04N 5/2353* (2013.01); *H04N 5/3452* (2013.01)
(58) Field of Classification Search
  None
  See application file for complete search history.

(56) References Cited

U.S. PATENT DOCUMENTS 7,852,401 B2   12/2010  Hamamura et al.
8,488,019 B2 *  7/2013  Toyoda .............. H04N 5/35581
                                                       348/229.1

FOREIGN PATENT DOCUMENTS

JP   2007-281548   10/2007
JP   2015-012490   1/2015

* cited by examiner

*Primary Examiner* — Mark T Monk
(74) *Attorney, Agent, or Firm* — John C. Pokotylo; Pokotylo Patent Services

(57) ABSTRACT

An image pickup apparatus includes a microcomputer that sets, when a proper exposure time is longer than a frame period, one or more long exposure times equal to or shorter than the frame period and a short exposure time such that a total time of the one or more long exposure times and the short exposure time is equal to the proper exposure time, an image pickup device that outputs a long exposure image and a short exposure image for every frame period, and a cumulative addition processing section that adds the short exposure image and the long exposure image or long exposure images of one or more frames to generate a synthetic image corresponding to the proper exposure time.

9 Claims, 20 Drawing Sheets

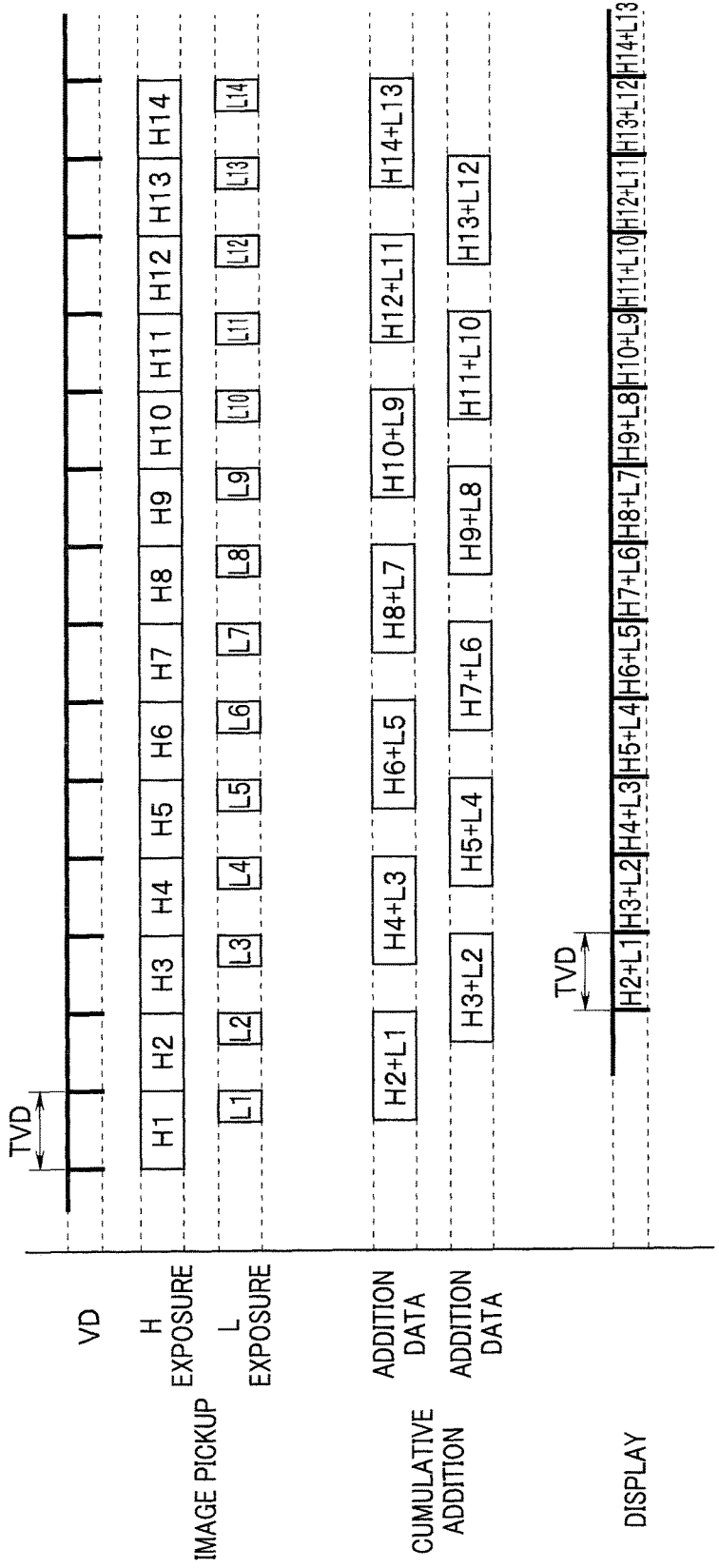

IMAGE PICKUP APPARATUS, NON-TRANSITORY COMPUTER-READABLE MEDIUM STORING COMPUTER PROGRAM, AND IMAGE PICKUP METHOD

CROSS REFERENCE TO RELATED APPLICATION

This application claims benefit of Japanese Application No. 2015-244361 filed in Japan on Dec. 15, 2015, the entire contents of which are incorporated herein by this reference.

BACKGROUND OF THE INVENTION

1. Field of the Invention

The present invention relates to an image pickup apparatus, a non-transitory computer-readable medium storing a computer program, and an image pickup method, for obtaining an image corresponding to a proper exposure time longer than a frame period by synthesizing images.

2. Description of the Related Art

In recent years, image pickup speed of image pickup devices has been increased, and photographing at a high-speed frame rate has become possible while maintaining the number of pixels. The high-speed frame rate provides such advantages that movement of an object in a moving image/live view becomes smooth and the number of sequential photographing frames is increased. However, as the speed of frame rate is increased, the exposure time of one frame becomes shorter. Therefore, in order to obtain exposure time longer than a frame period, the frame rate has to be decreased. For example, when a moving image is photographed at a frame rate of 60 fps, if the proper exposure time becomes longer than 1/60 seconds, the frame rate has to be decreased to 30 fps.

Incidentally, some recent cameras are provided with a function of synthesizing a long time exposure image (hereinafter, shortly referred to as long exposure image, as needed) and a short time exposure image (hereinafter, shortly referred to as short exposure image, as needed), to generate an image having a wide dynamic range (HDR image). Such HDR processing has been performed not only on a still image but also on a moving image or live view image.

In addition to a method of obtaining a long exposure image and a short exposure image alternately for each frame, there is a method of simultaneously obtaining a long exposure image and a short exposure image in one exposure period. In recent years, an image pickup device (also referred to HDR sensor) provided with a function for enabling the latter method has been proposed.

Specifically, the image pickup device called HDR sensor obtains a long exposure image from even-numbered lines and a short exposure image from odd-numbered lines by setting a different exposure time for each line or for each pixel, for example.

In addition, Japanese Patent Application Laid-Open Publication No. 2015-12490, for example, discloses a technique for generating an HDR image without decreasing resolution and frame rate by interchanging the lines for long time exposure and the lines for short time exposure, for each frame.

On the other hand, Japanese Patent Application Laid-Open Publication No. 2007-281548 discloses a technique for generating an image corresponding to a desired exposure time without decreasing the frame rate, by dividing one frame into short time intervals to obtain time-division images and synthesizing an arbitrary number of continuous time-division images, for example.

SUMMARY OF THE INVENTION

An image pickup apparatus according to one aspect of the present invention includes: an exposure control section that determines a proper exposure time, and sets, when the proper exposure time is longer than a frame period, a long exposure time equal to or shorter than the frame period and a short exposure time shorter than the long exposure time such that a total time of the short exposure time and one or more long exposure times is equal to the proper exposure time; an image pickup section that outputs, for every frame period, a long exposure image exposed for the long exposure time and a short exposure image exposed for the short exposure time within an exposure period of the long exposure image, when the proper exposure time is longer than the frame period; and a synthesizing section that adds the short exposure image of one frame and the long exposure image or long exposure images of one or more frames, to generate a synthetic image corresponding to the proper exposure time, when the proper exposure time is longer than the frame period.

A non-transitory computer-readable medium storing a computer program according to one aspect of the present invention stores a computer program for causing a computer to execute: an exposure control step of determining a proper exposure time, and setting, when the proper exposure time is longer than a frame period, a long exposure time equal to or shorter than the frame period and a short exposure time shorter than the long exposure time such that a total time of the short exposure time and one or more long exposure times is equal to the proper exposure time; an image pickup step of outputting, for every frame period, a long exposure image exposed for the long exposure time and a short exposure image exposed for the short exposure time within an exposure period of the long exposure image, when the proper exposure time is longer than the frame period; and a synthesizing step of adding the short exposure image of one frame and the long exposure image or long exposure images of one or more frames, to generate a synthetic image corresponding to the proper exposure time, when the proper exposure time is longer than the frame period.

An image pickup method according to one aspect of the present invention includes: an exposure control step of determining a proper exposure time, and setting, when the proper exposure time is longer than a frame period, a long exposure time equal to or shorter than the frame period and a short exposure time shorter than the long exposure time such that a total time of the short exposure time and one or more long exposure times is equal to the proper exposure time; an image pickup step of outputting, for every frame period, a long exposure image exposed for the long exposure time and a short exposure image exposed for the short exposure time within an exposure period of the long exposure image, when the proper exposure time is longer than the frame period; and a synthesizing step of adding the short exposure image of one frame and the long exposure image or long exposure images of one or more frames, to generate a synthetic image corresponding to the proper exposure time, when the proper exposure time is longer than the frame period.

DETAILED DESCRIPTION OF THE PREFERRED EMBODIMENT(S)

Hereinafter, an embodiment of the present invention will be described with reference to drawings.

First Embodiment

Figure 1:
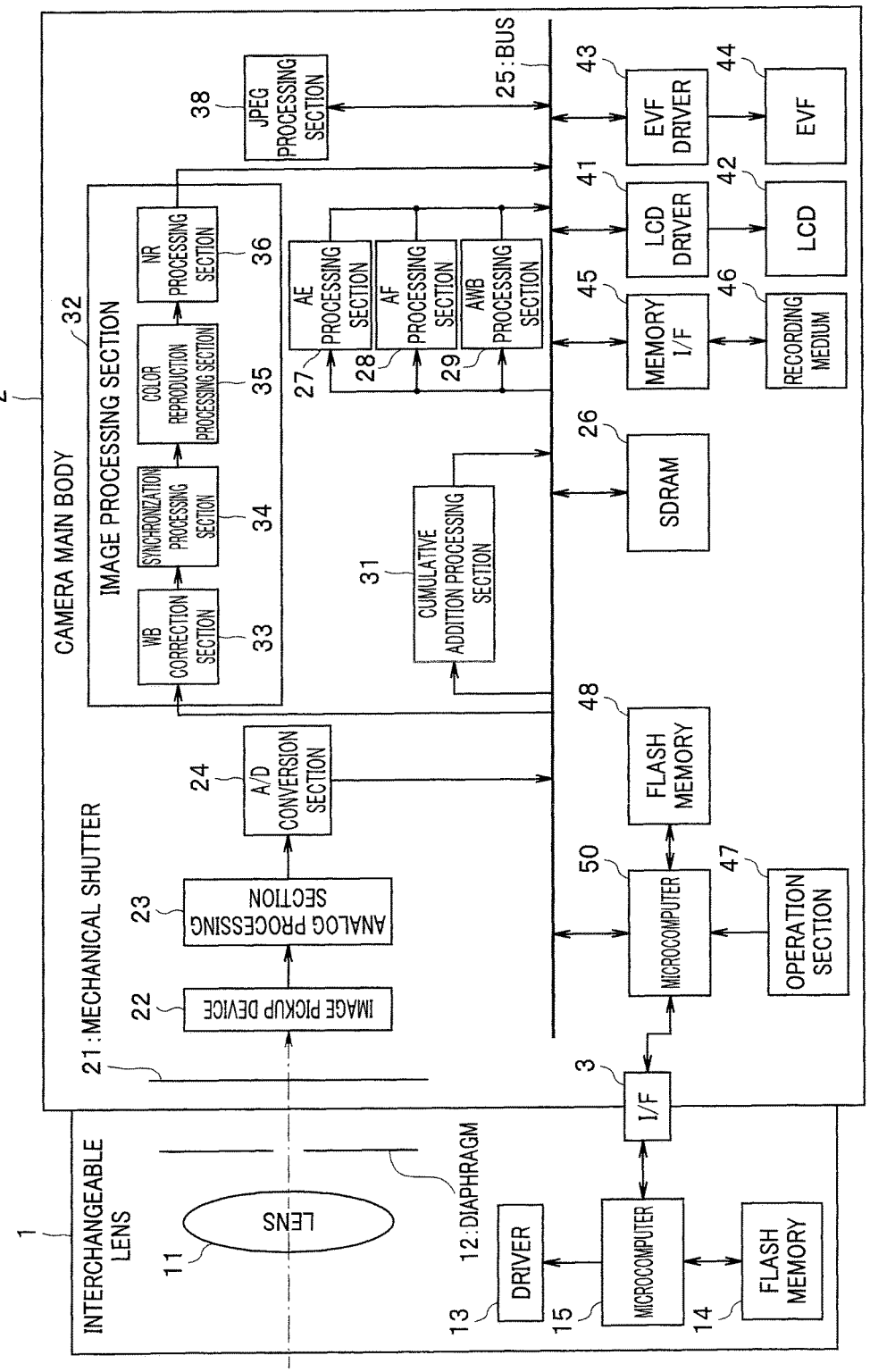
FIG. 1 is a block diagram showing a configuration of an image pickup apparatus according to a first embodiment of the present invention.

FIGS. 1 to 20 show the first embodiment of the present invention, and FIG. 1 is a block diagram showing a configuration of an image pickup apparatus. Note that description will be made on the image pickup apparatus by taking a digital camera as an example in the present embodiment. However, the image pickup apparatus is not limited to the example, and may be an arbitrary apparatus as long as the apparatus is provided with an image pickup function.

The image pickup apparatus is configured by connecting an interchangeable lens 1 and a camera main body 2 so as to communicate with each other, through an interface (I/F) 3, and includes a function of synthesizing data of a plurality of images obtained by sequential photographing, to generate data of one synthetic image.

The interchangeable lens 1 is detachably mounted to the camera main body 2 through a lens mount, for example, and the interface 3 is configured by electric contacts formed at the lens mount (an electric contact provided on the interchangeable lens 1 and an electric contact provided on the camera main body 2) and the like.

The interchangeable lens 1 includes a lens 11, a diaphragm 12, a driver 13, a flash memory 14, and a microcomputer 15.

The lens 11 is a photographing optical system that forms an optical image of an object on the image pickup device 22, to be described later, of the camera main body 2.

The diaphragm 12 is an optical diaphragm that controls a passing range of a luminous flux proceeding from the lens 11 to image pickup device 22.

The driver 13 drives the lens 11 to adjust a focus position based a command from the microcomputer 15. In addition, the driver 13 drives the diaphragm 12 to cause the aperture diameter to be changed based on a command from the microcomputer 15. Driving of the diaphragm 12 causes the brightness of the optical image of the object to be changed and also causes the magnitude of blur to be changed.

The flash memory 14 is a storage medium that stores a control program to be executed by the microcomputer 15 and various kinds of information on the interchangeable lens 1.

The microcomputer 15 is what is called a lens-side computer, and connected with the driver 13, the flash memory 14, and the interface 3. The microcomputer 15 communicates with a microcomputer 50 which is a main-body-side computer, to be described later, through the interface 3, receives a command from the microcomputer 50 to read/write the information stored in the flash memory 14, and controls the driver 13. Furthermore, the microcomputer 15 transmits the various kinds of information on the interchangeable lens 1 to the microcomputer 50.

The interface 3 connects the microcomputer 15 of the interchangeable lens 1 and the microcomputer 50 of the camera main body 2 so as to bi-directionally communicate with each other.

Next, the camera main body 2 includes a mechanical shutter 21, the image pickup device 22, an analog processing section 23, an analog/digital conversion section (A/D conversion section) 24, a bus 25, an SDRAM 26, an AE processing section 27, an AF processing section 28, an AWB processing section 29, a cumulative addition processing section 31, an image processing section 32, a JPEG processing section 38, an LCD driver 41, an LCD 42, an EVF (electronic view finder) driver 43, an EVF 44, a memory interface (memory I/F) 45, a recording medium 46, an operation section 47, a flash memory 48, and a microcomputer 50.

The mechanical shutter 21 is an optical shutter configured to control the time for the luminous flux from the lens 11 to reach the image pickup device 22, and cause a shutter curtain to run, for example. The mechanical shutter 21 is driven based on the command from the microcomputer 50 at the time of still image photographing, to control the reaching time of the luminous flux to the image pickup device 22, that is, the exposure time of an object by the image pickup device 22. On the other hand, at the time of moving image photographing or live view, the mechanical shutter 21 is maintained in the opened state, and an image of each frame is obtained with what is called an electronic shutter of the image pickup device 22.

The image pickup device 22 is an image pickup section including an image pickup surface on which a plurality of pixels are two-dimensionally aligned at a predetermined pixel pitch, and configured to photoelectrically convert the optical image of the object which is formed by the lens 11 and the diaphragm 12, to generate an analog image signal, based on the control by the microcomputer 50 as an image pickup control section.

The image pickup device 22 according to the present embodiment is configured as a single-plate image pickup device having a color filter of a primary color Bayer array, for example. However, it is needless to say that the image pickup device 22 is not limited to the single-plate image pickup device, and may be a laminated image pickup device configured to separate color components in the substrate thickness direction, for example.

Furthermore, the image pickup device 22 according to the present embodiment is configured as what is called an HDR sensor that obtains a plurality of images with different exposure times in one time of exposure. When the proper exposure time SS (see FIG. 3, etc.) is longer than a frame period (vertical synchronization period TVD to be described later), the image pickup device 22 outputs, for every frame period, the long exposure image exposed for a long exposure time and a short exposure image exposed for a short exposure time within the exposure period of the long exposure image.

Figure 2:
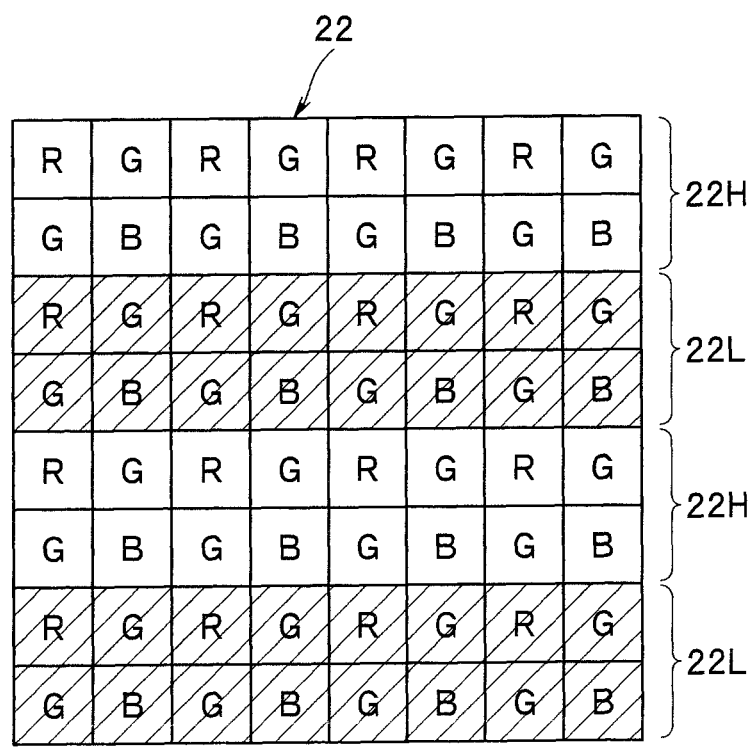
FIG. 2 illustrates a configuration of an image pickup device as an HDR sensor according to the first embodiment.

FIG. 2 illustrates the configuration of the image pickup device 22 as the HDR sensor.

The primary color Bayer array, as is publicly known, includes 2×2 pixels as a basic array, and G (green) filters are arranged at diagonal positions of the basic array, and an R (red) filter and a B (blue) filter are arranged at remaining diagonal positions of the basic array.

The image pickup device 22 is configured such that an H-field 22H constituted of a pixel group for picking up a long time exposure image (hereinafter, shortly referred to as long exposure image, as needed) and an L-field 22L constituted of a pixel group for picking up a short time exposure image (hereinafter, shortly referred to as short exposure image, as needed) are arranged alternately for every two lines in which the basic arrays are aligned in the horizontal direction.

In the track of the interlace system in which a frame is divided into even-numbered fields and odd-numbered fields, the term "field" is used in the present embodiment. However, unlike the interlace system, the image pickup device 22, which is configured as the HDR sensor, according to the present embodiment, reads out the image of H-field 22H and the image of the L-field 22L in the same one frame (in one vertical synchronization period TVD).

At least one of an exposure starting timing and an exposure finishing timing (read-out timing) is made different in the H-field 22H and the L-field 22L, to thereby obtain a long exposure image exposed for a long exposure time from the H-field 22H, and obtain a short exposure image exposed for a short exposure time shorter than the long exposure time from the L-field 22L.

For example, when the long exposure image and the short exposure image are read out in synchronization with a vertical synchronization signal VD (see FIGS. 7 to 9, 19, etc.), the exposure of the long exposure image has only to be started at the time going back by the exposure time of the long exposure image from the read-out clock time indicated by the vertical synchronization signal VD, and the exposure of the short exposure image has only to be started at the time going back by the exposure time of the short exposure image from the read-out clock time.

Note that FIG. 2 shows an exemplary configuration in which a frame is divided into different fields for every two lines. However, the frame may be divided into different fields for every two columns, or for every unit of the 2×2 basic array. In addition, when the Bayer array is not applied, the frame may be divided into different fields for every line, every column, every pixel, or the like. Therefore, the method of dividing the frame into the fields that are different in the exposure time is not limited.

The analog processing section 23 performs waveform shaping after reducing reset noise and the like, to increase the gain to obtain target brightness, with respect to the analog image signal read out from the image pickup device 22.

The A/D conversion section 24 converts the analog image signal outputted from the analog processing section 23 into a digital image signal (referred to as image data, as needed).

The bus 25 is a transfer path for transferring various kinds of data and a control signal generated at a certain part in the image pickup apparatus to another part in the image pickup apparatus. The bus 25 according to the present embodiment is connected to the A/D conversion section 24, the SDRAM 26, the AE processing section 27, the AF processing section 28, the AWB processing section 29, the cumulative addition processing section 31, the image processing section 32, the JPEG processing section 38, the LCD driver 41, the EVF driver 43, the memory I/F 45, and the microcomputer 50.

The image data (hereinafter, referred to as RAW image data, as needed) outputted from the A/D conversion section 24 is transferred through the bus 25, to be temporarily stored in the SDRAM 26.

The SDRAM 26 is a storing section that temporarily stores various kinds of image data such as the above-described RAW image data, or image data processed in the cumulative addition processing section 31, image processing section 32, the JPEG processing section 38, and the like.

The SDRAM 26 also serves as a storing section that temporarily stores at least one of the short exposure image and the long exposure image. The image which is required to be stored in the SDRAM 26 is an image of a temporally preceding frame. Therefore, the image which is required to be stored is not the same in the case where the short exposure image is obtained first and thereafter one or more long exposure images are obtained continuously and in the case where the one or more long exposure images are obtained continuously first and thereafter the short exposure image is obtained. In view of the above, the image to be temporarily stored in the SDRAM 26 is referred to as "at least one of the short exposure image and the long exposure image".

The AE processing section 27 extracts luminance components from the RAW image data, and calculates proper exposure conditions (Tv, Av, Sv, etc.) based on the extracted luminance components. The calculated proper exposure conditions are used in automatic exposure (AE) control. Specifically, control of the diaphragm 12 based on the Av value, control of the mechanical shutter 21 based on the Tv value, or exposure timing control (what is called, control of the electronic shutter) of the image pickup device 22 based on the Tv value, gain control of the analog processing section 23 (or digital gain control of the image processing section 32) based on the Sv value, and the like are performed.

The AF processing section 28 extracts a signal of high-frequency components from the RAW image data to obtain a focusing evaluation value by AF (autofocus) integration processing. The obtained focusing evaluation value is used for the AF driving of the lens 11. Note that it is needless to say that AF is not limited to such a contrast AF, and phase difference AF may be performed by using a dedicated AF sensor (or pixels for AF on the image pickup device 22), for example.

The AWB processing section 29 performs auto white balance processing for adjusting white balance by detecting the color balance of the object, calculating a gain for each of the RGB components, and multiplies the calculated gains, based on the RAW image data.

The cumulative addition processing section 31 is a synthesizing section that adds the short exposure image of one frame and the long exposure image or the long exposure images of one or more frames, to generate a synthetic image corresponding to a proper exposure time SS, when the proper exposure time SS (see FIG. 3, etc.) is longer than the frame period (vertical synchronization period TVD to be described later).

As described later, the microcomputer 50 that functions as an exposure control section sets the frame period as the long exposure time, sets the quotient obtained by dividing the proper exposure time SS by the long exposure time as the number of frames, sets the long exposure time for the frames that are continuous by the number of frames, and sets the remainder obtained by dividing the proper exposure time SS by the long exposure time as the short exposure time. The cumulative addition processing section 31 synthesizes the long exposure images of the frames that are continuous by the number of frames calculated as the quotient and the one short exposure image with the exposure time as the remainder by cumulatively adding the pixel values for each pixel position. As a result, the synthetic image becomes an image corresponding to the image exposed continuously for the proper exposure time SS.

The image processing section 32 performs various kinds of image processing on the RAW image data or synthetic image data generated from the RAW image data by the cumulative addition processing section 31, and includes a WB correction section 33, a synchronization processing section 34, a color reproduction processing section 35, and an NR processing section 36.

The WB correction section 33 performs white balance processing on the image data such that a white object is observed as white in color.

The synchronization processing section 34 performs demosaicing processing for converting the image data of the RGB Bayer array in which only one color component of the RGB components exists for each pixel into the image data in which all pixels include all the three color components of RGB, by obtaining color components which do not exist in a target pixel by complement from the peripheral pixels.

The color reproduction processing section 35 performs processing for reproducing the color of the object with higher fidelity by performing color matrix calculation on the image data.

The NR processing section 36 performs noise reduction processing by performing coring processing in accordance with the spatial frequency on the image data.

The image data subjected to the various kinds of processing by the image processing section 32 is stored again in the SDRAM 26.

When recording the image data, the JPEG processing section 38 reads out the image data from the SDRAM 26, compresses the image data following the JPEG compression method to generate JPEG image data, and causes the SDRAM 26 to store the generated JPEG image data. After a header and the like are added to the JPEG image data stored in the SDRAM 26 by the microcomputer 50, the JPEG image data is recorded as a JPEG file in a recording medium 46 through the memory I/F 45.

In addition, the JPEG processing section 38 also expands the compressed image data. That is, when the recorded image is to be reproduced, the JPEG file is read out from the recording medium 46 through the memory I/F 45, for example, based on the control by the microcomputer 50, and temporarily stored in the SDRAM 26. The JPEG processing section 38 expands the JPEG image data in the JPEG file stored in the SDRAM 26, following the JPEG expansion method, and causes the SDRAM 26 to store the expanded image.

Furthermore, the JPEG processing section 38 compresses and expands also the moving image data by using an appropriate processing method such as Motion JPEG or MPEG. Note that the JPEG processing section 38 is configured to serve also as a compression/expansion section for compressing and expanding the moving image data in the present embodiment. However, a compression/expansion section dedicated for moving image data may be provided in addition to the JPEG processing section 38.

The LCD driver 41 reads out the image data stored in the SDRAM 26, converts the read image data into a video signal, and controls and drives the LCD 42 to cause the LCD 42 to display an image based on the video signal.

With the above-described drive control by the LCD driver 41, the LCD 42 displays the image and also various kinds of information related to the image pickup apparatus.

The EVF driver 43 reads out the image data stored in the SDRAM 26, converts the read image data into a video signal, and drives and controls the EVF 44 to cause the EVF 44 to display an image based on the video signal.

With the above-described drive control by the EVF driver 43, the EVF 44 displays the image and also various kinds of information related to the image pickup apparatus.

The image display performed by the LCD 42 or the EVF 44 includes a rec view display for displaying still image data immediately after the photographing for only a short time, a reproducing display of the JPEG file recorded in the recording medium 46, a reproducing display of a moving image file recorded in the recording medium 46, a live-view display, and the like.

The memory I/F 45 is a recording control section that performs control for recording the image data in the recording medium 46, and is configured to also read out the image data from the recording medium 46.

The recording medium 46 is a recording section that stores the image data in a non-volatile manner and is configured by a memory card configured to be attachable to and detachable from the camera main body 2, for example. The recording medium 46, however, is not limited to the memory card, and may be a disk-shaped recording medium, or another arbitrary recording medium. Therefore, the recording medium 46 does not necessarily have a configuration unique to the image pickup apparatus.

The operation section 47 is a section through which various kinds of operation inputs are performed with respect to the image pickup apparatus and includes a power source button for turning on and off the power source of the image pickup apparatus, a release button for instructing a start of image photographing, which is constituted of a two-stage operation button including, for example, a first release switch and a second release switch, a reproduction button for reproducing the recorded image, a menu button for performing setting and the like of the image pickup apparatus, operation buttons such as a cross key used for item selecting operation and an OK button used for determination operation of the selected item, and the like. The items that can be set by using the menu button, the cross key, the OK button and the like include a photographing mode (single photographing mode, sequential photographing mode, moving image photographing mode, etc.), recording mode, reproducing mode and the like. When an operation is performed with respect to the operation section 47, a signal corresponding to the operation content is outputted to the microcomputer 50.

The flash memory 48 is a storage medium that stores, in a non-volatile manner, a processing program to be executed by the microcomputer 50 (including an image pickup program for executing the image pickup method by the image pickup apparatus), various kinds of information related to the image pickup apparatus. As several examples of the information stored in the flash memory 48, for example, a model name and production number for identifying the image pickup apparatus, parameters to be used for the image processing, setting values set by the user, the vertical synchronization period TVD, etc., can be listed. The information stored in the flash memory 48 is read by the microcomputer 50.

The microcomputer 50 is a control section that controls each of the sections in the camera main body 2, sends a command to the microcomputer 15 through the interface 3 to control the interchangeable lens 1, and integrally controls the image pickup apparatus. When the user performs operation input through the operation section 47, the microcomputer 50 reads the parameters necessary for the processing from the flash memory 48 according to the processing program stored in the flash memory 48, and executes various kinds of sequences corresponding to the operation contents.

Furthermore, the microcomputer 50 functions as an exposure control section that determines the proper exposure time SS based on the Tv value calculated by the AE processing section 27, and when the proper exposure time SS is longer than the frame period (the vertical synchronization period TVD to be described later), sets the long exposure time equal to or shorter than the frame period and a short exposure time shorter than the long exposure time such that the total time of the short exposure time and one or more long exposure times is equal to the proper exposure time SS.

Specifically, the microcomputer 50 sets the vertical synchronization period TVD, which is the frame period, as the long exposure time, and sets the remainder obtained by dividing the proper exposure time SS by the long exposure time as the short exposure time. The microcomputer 50 then sets the quotient obtained by dividing the proper exposure time SS by the long exposure time as the number of frames, and sets the long exposure time for the frames that are continuous by the number of frames. Furthermore, the microcomputer 50 sets the short exposure time for the frame before the first frame of the frames that are continuous by the number of frames and for the frame after the last frame of the frames that are continuous by the number of frames.

Note that the long exposure time can be set to the time shorter than the vertical synchronization period TVD which is the frame period. However, in view of the fact that there is a case where the image obtained by synchronization does not become an image exposed continuously for the proper exposure time SS but becomes an image in which a non-exposure period is generated for every frame period, and the number of frames for making the total exposure time equal to the proper exposure time SS is increased, it is preferable that the long exposure time is equal to the vertical synchronization period TVD which is the frame period.

In addition, the microcomputer 50 performs control of the diaphragm 12 based on the Av value calculated by the AE processing section 27 through the microcomputer 15 and the driver 13, and also performs gain control of the analog processing section 23 (or digital gain control of the image processing section 32) based on the Sv value calculated by the AE processing section 27.

Furthermore, the microcomputer 50 performs control of the mechanical shutter 21 based on the Tv value calculated by the AE processing section 27 at the time of still image photographing.

Figure 3:
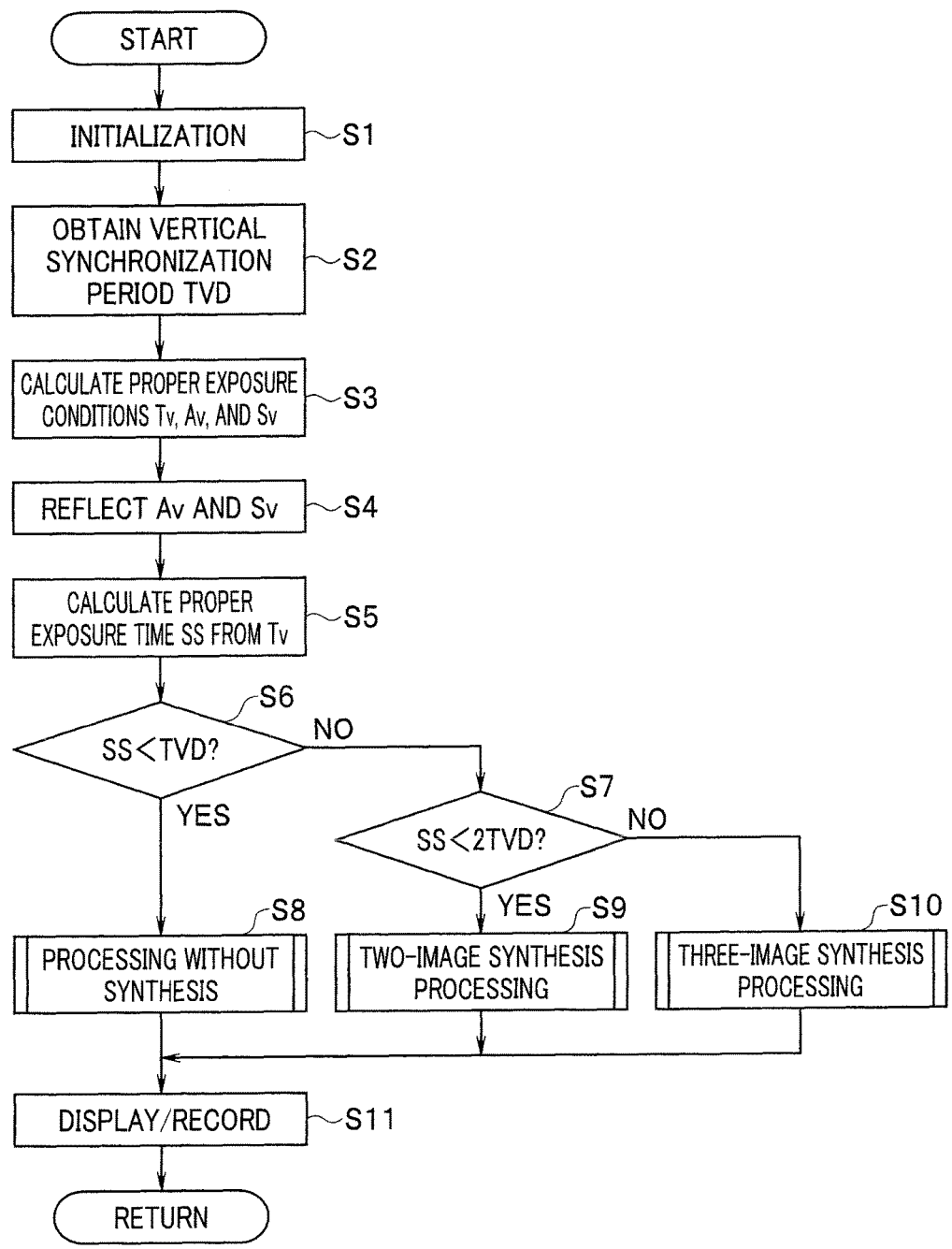
FIG. 3 is a flowchart showing one image photographing processing in the image pickup apparatus according to the first embodiment.

Next, FIG. 3 is a flowchart showing one image photographing processing in the image pickup apparatus. The processing (and processing shown in each of the subsequent flowcharts) is performed based on the control by the microcomputer 50 as the control section.

Figure 7:
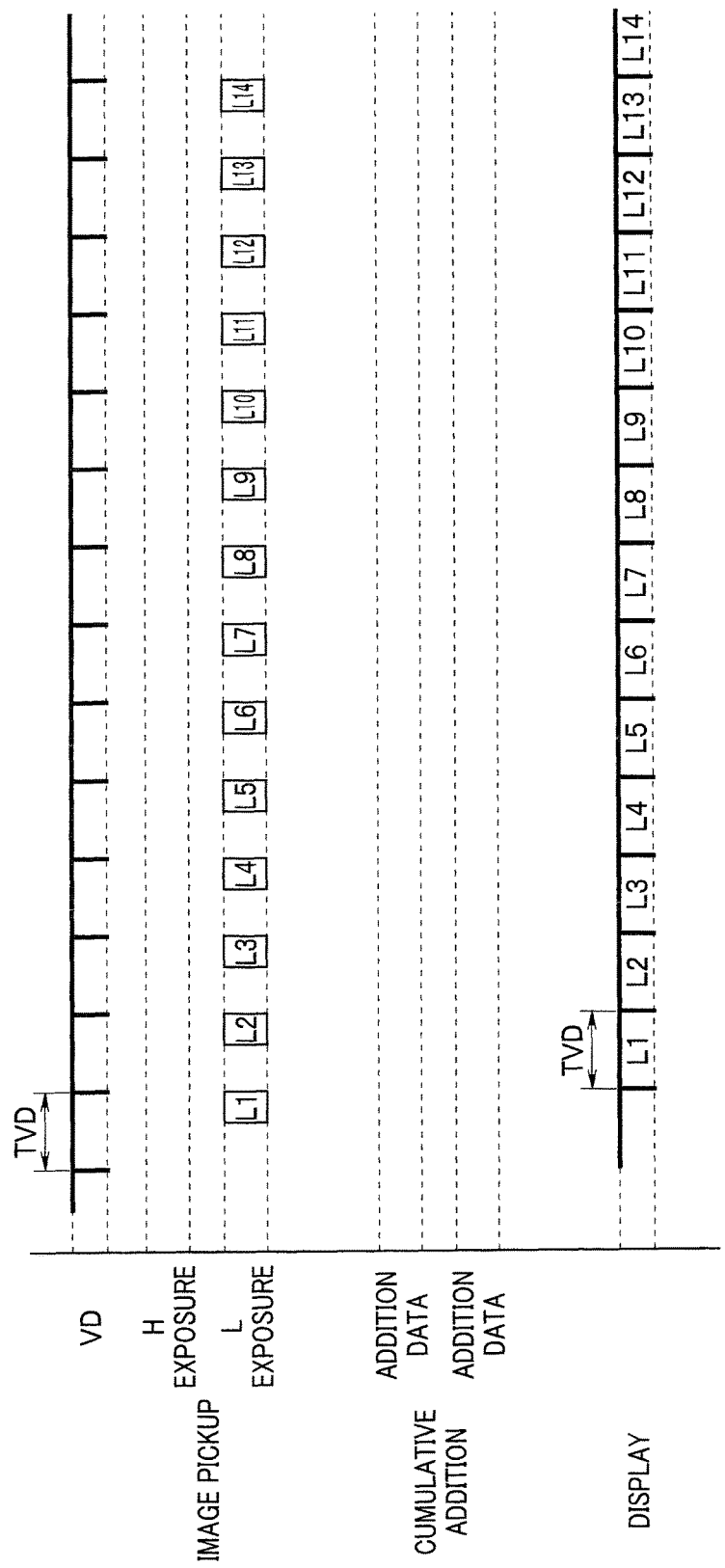
FIG. 7 is a timing chart for describing the processing without synthesis according to the first embodiment.
Figure 9:
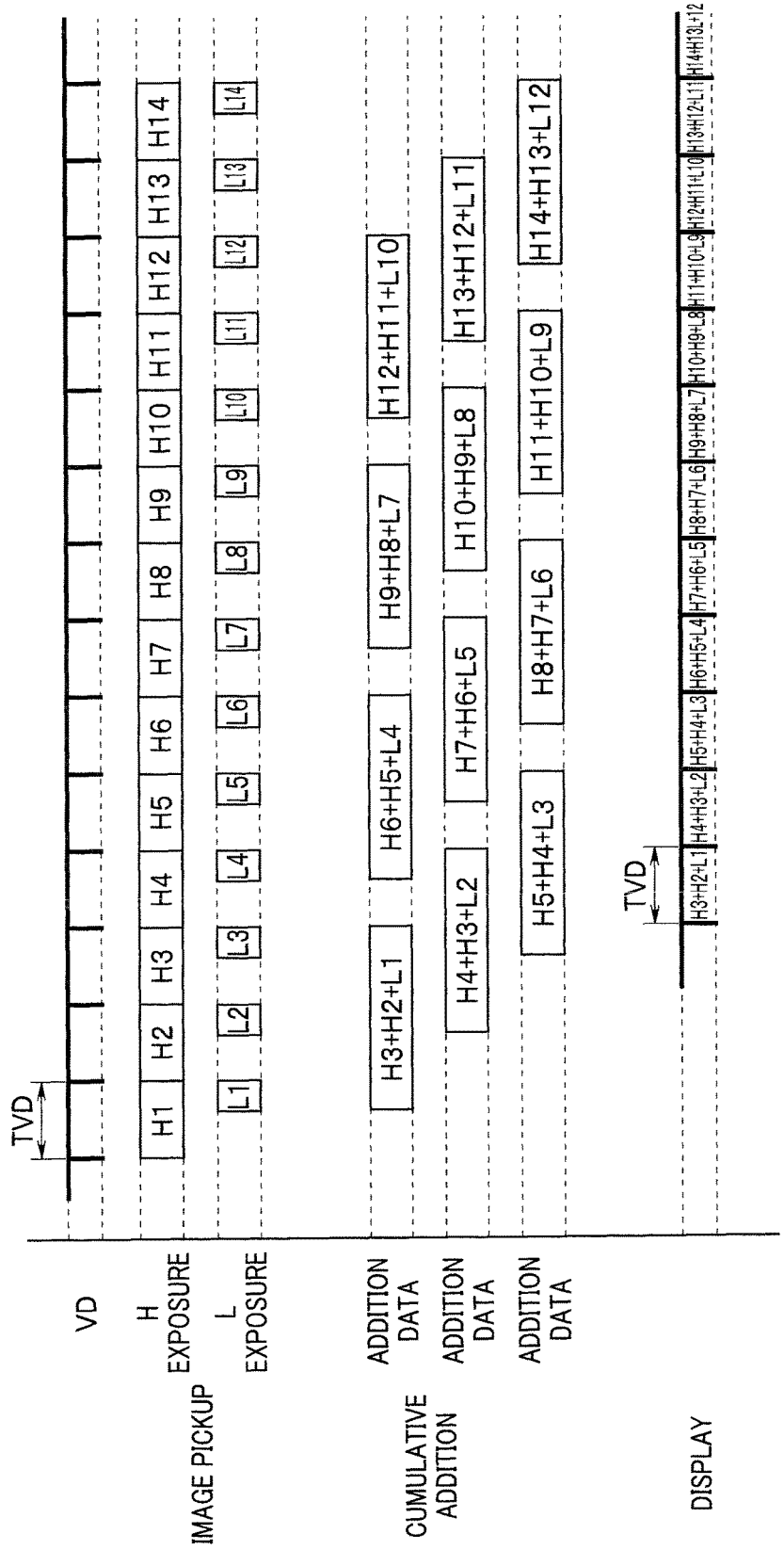
FIG. 9 is a timing chart for describing the three-image synthesis processing according to the first embodiment.
Figure 8:
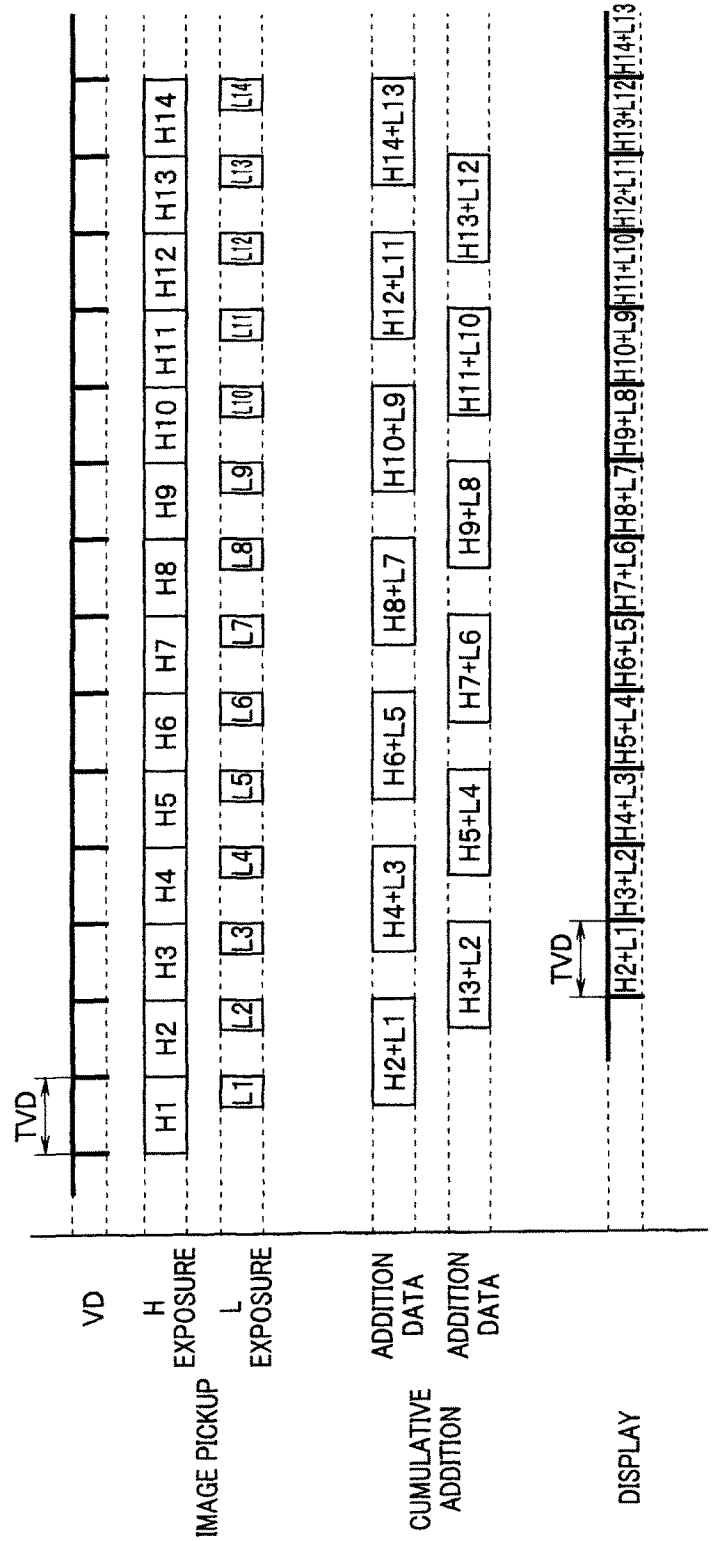
FIG. 8 is a timing chart for describing the two-image synthesis processing according to the first embodiment.
Figure 10:
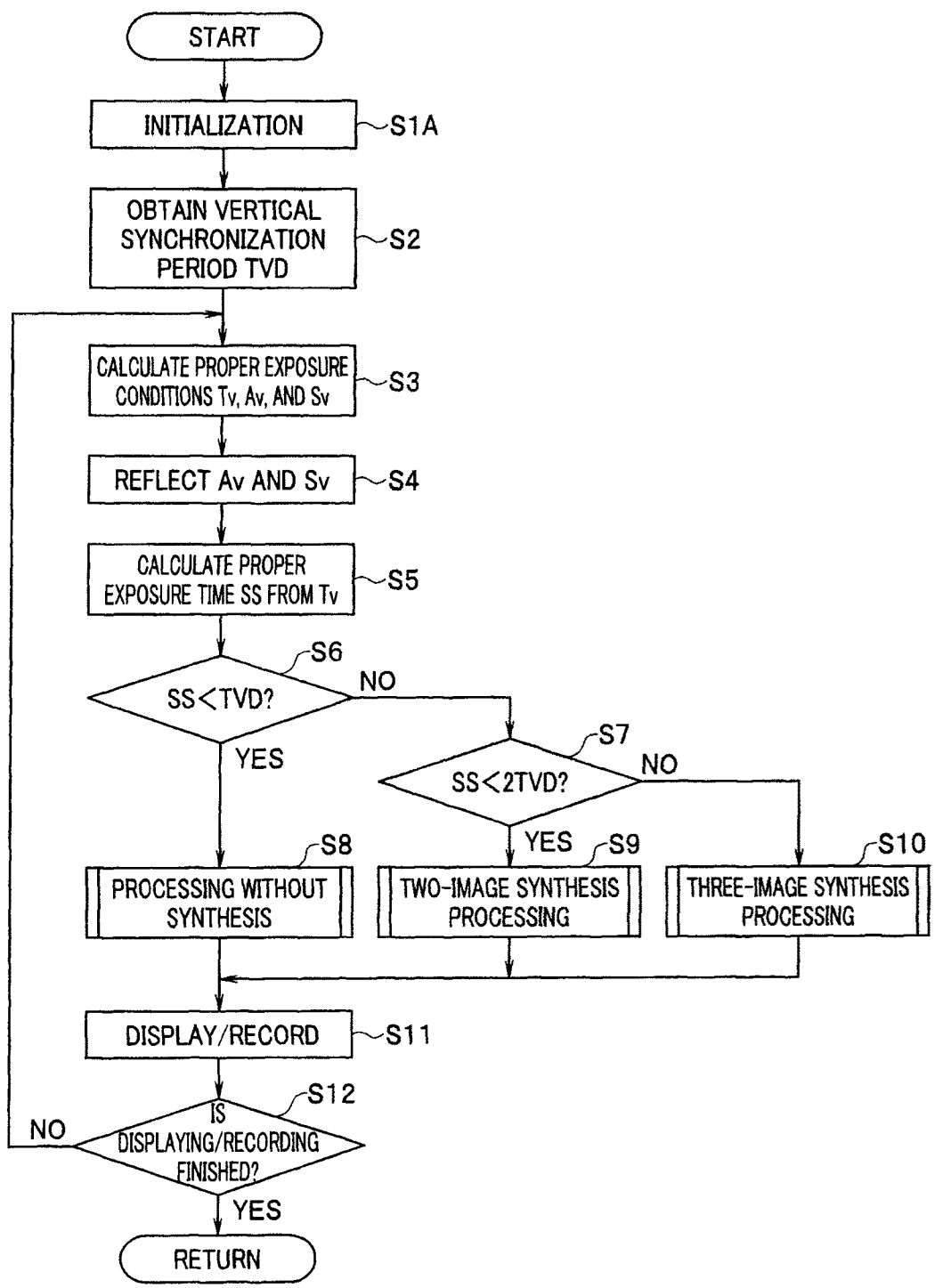
Figure 11:
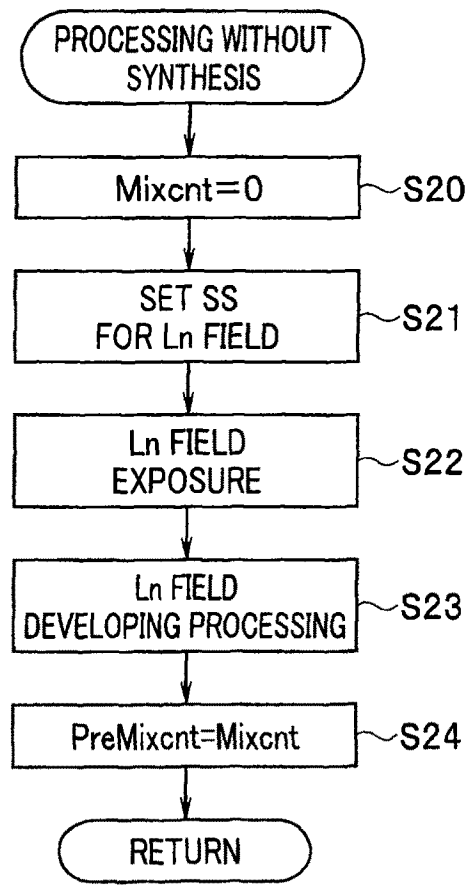
Figure 12:
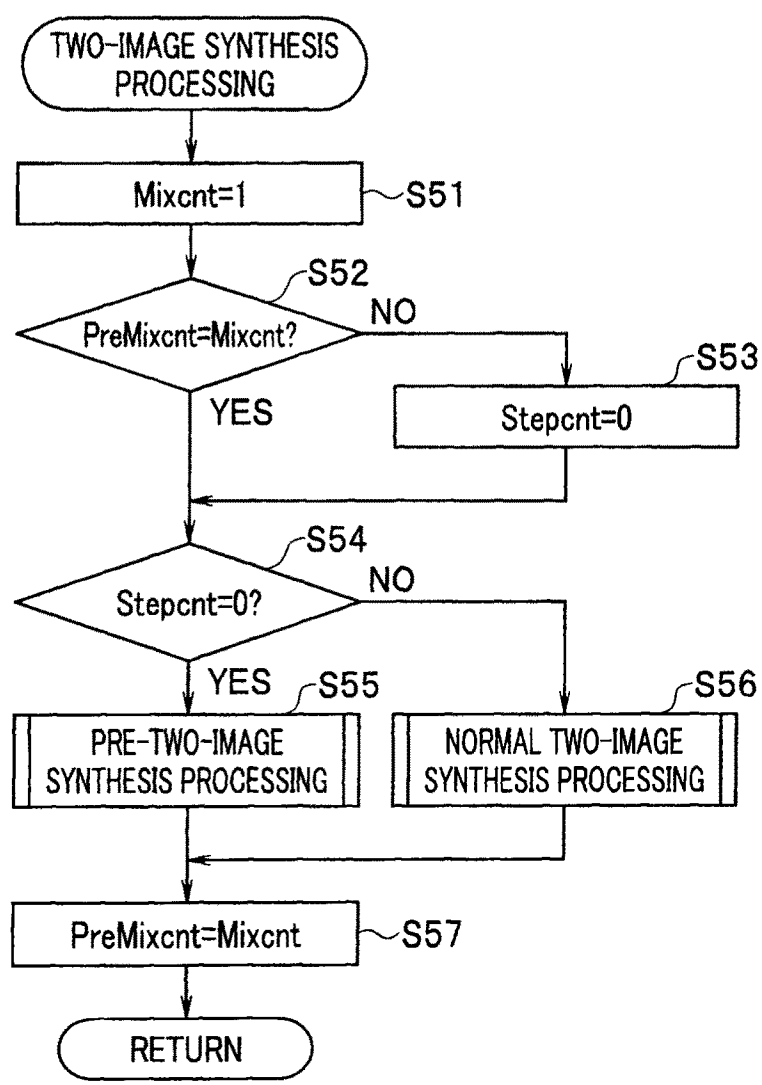
Figure 13:
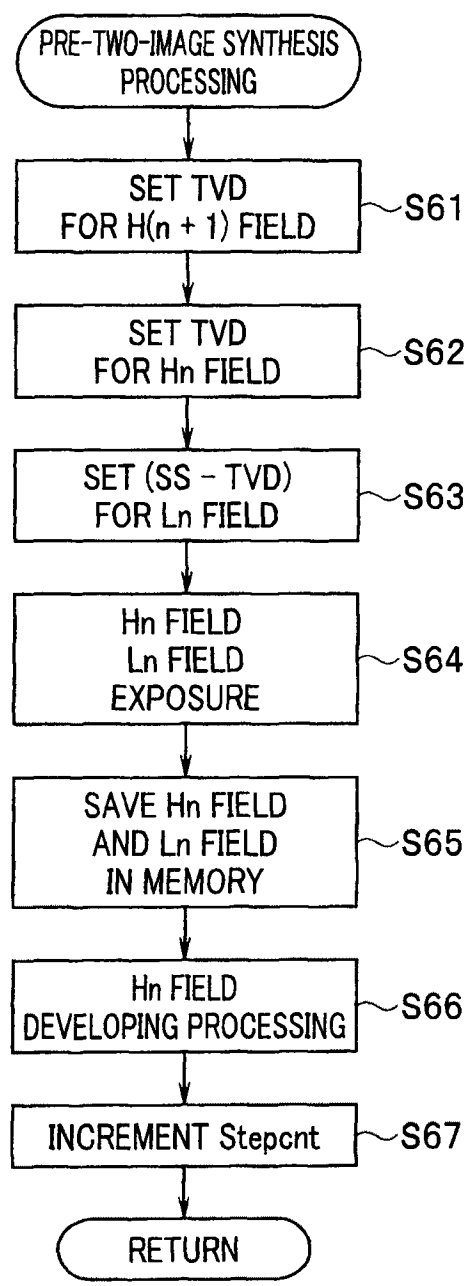
Figure 14:
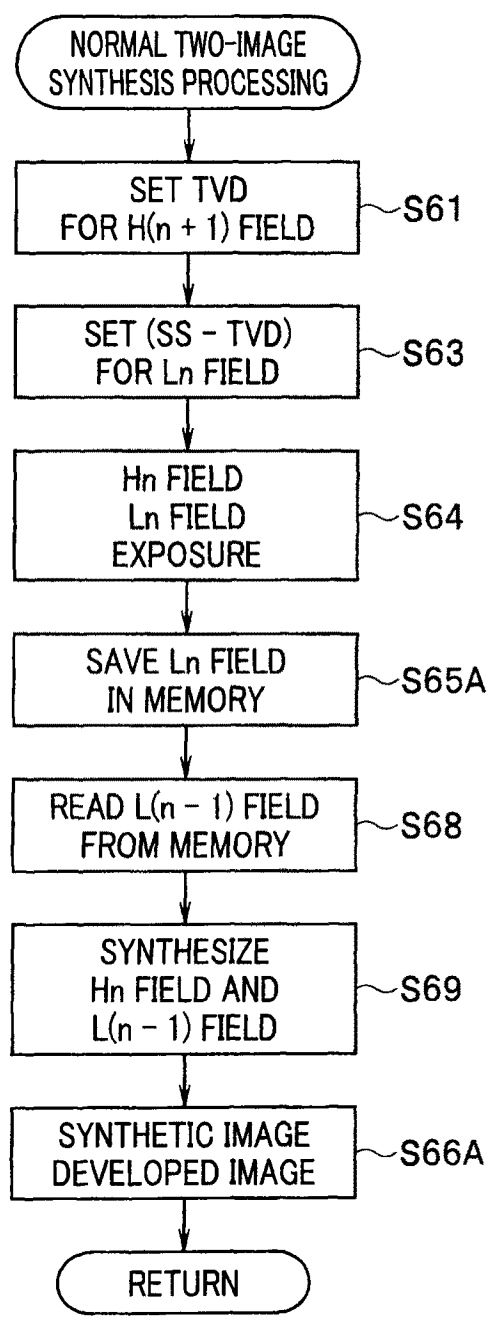
Figure 15:
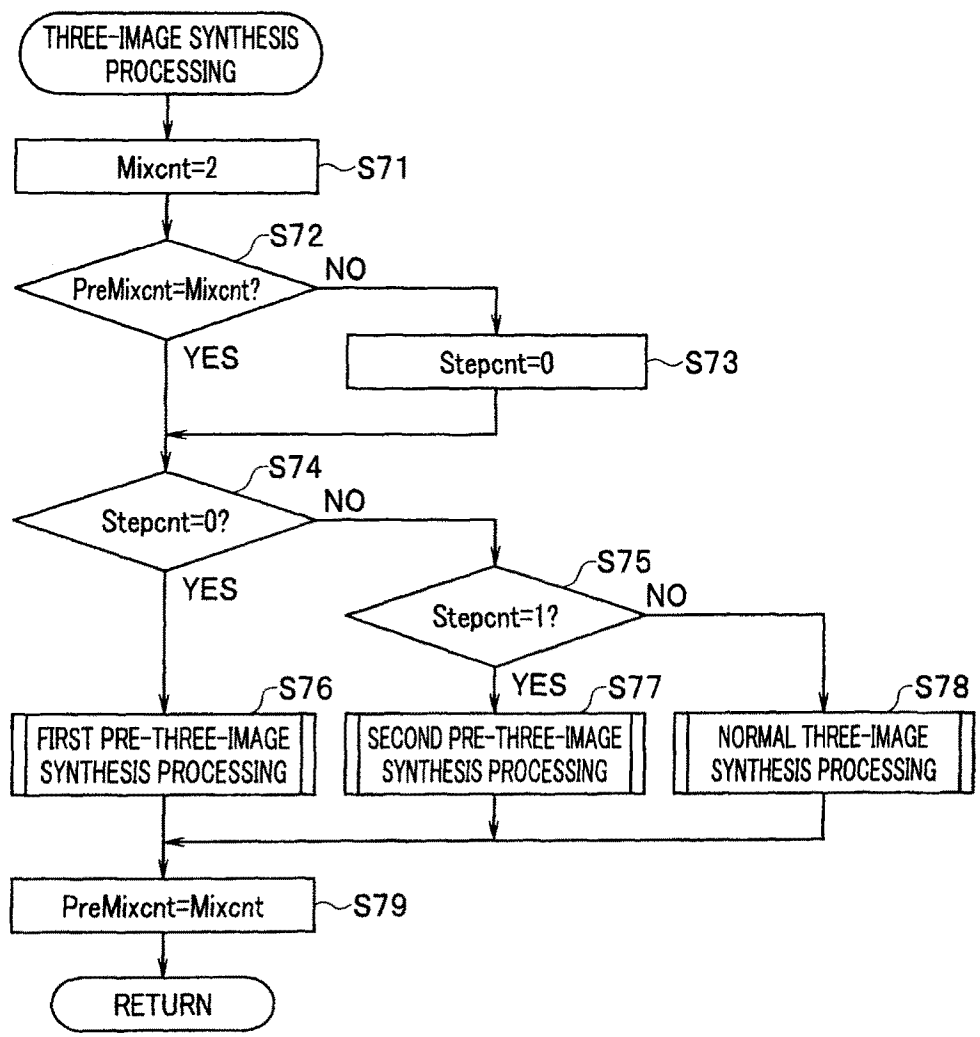
Figure 16:
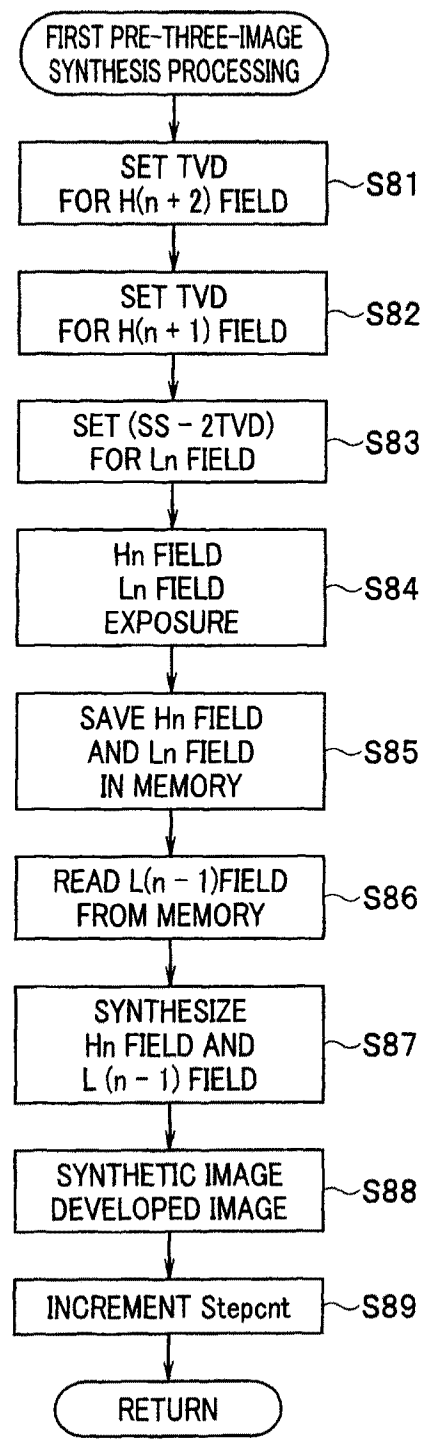
Figure 17:
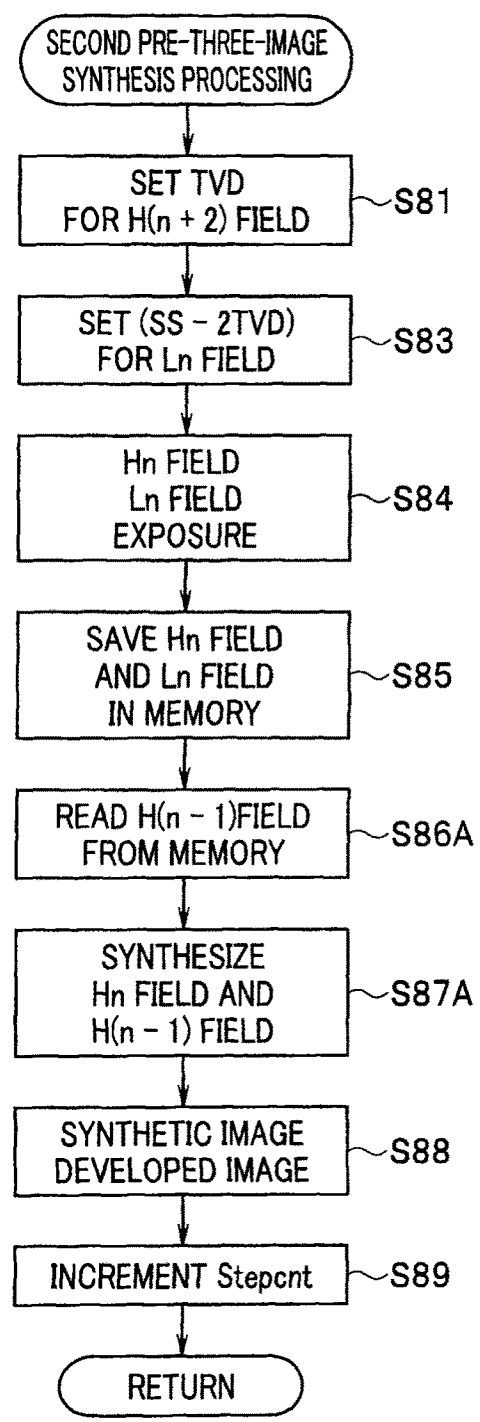
Figure 18:
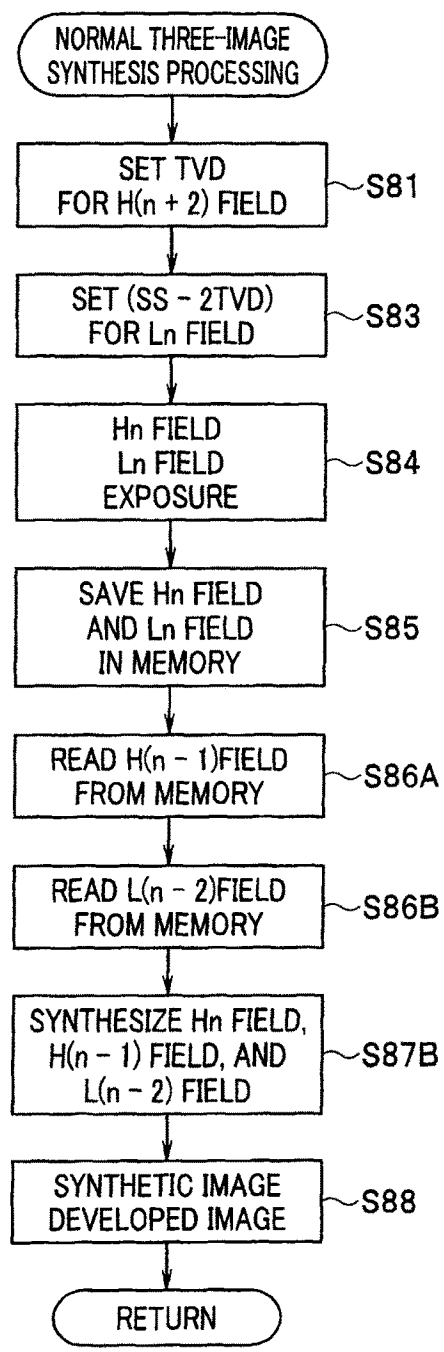
Figure 19:
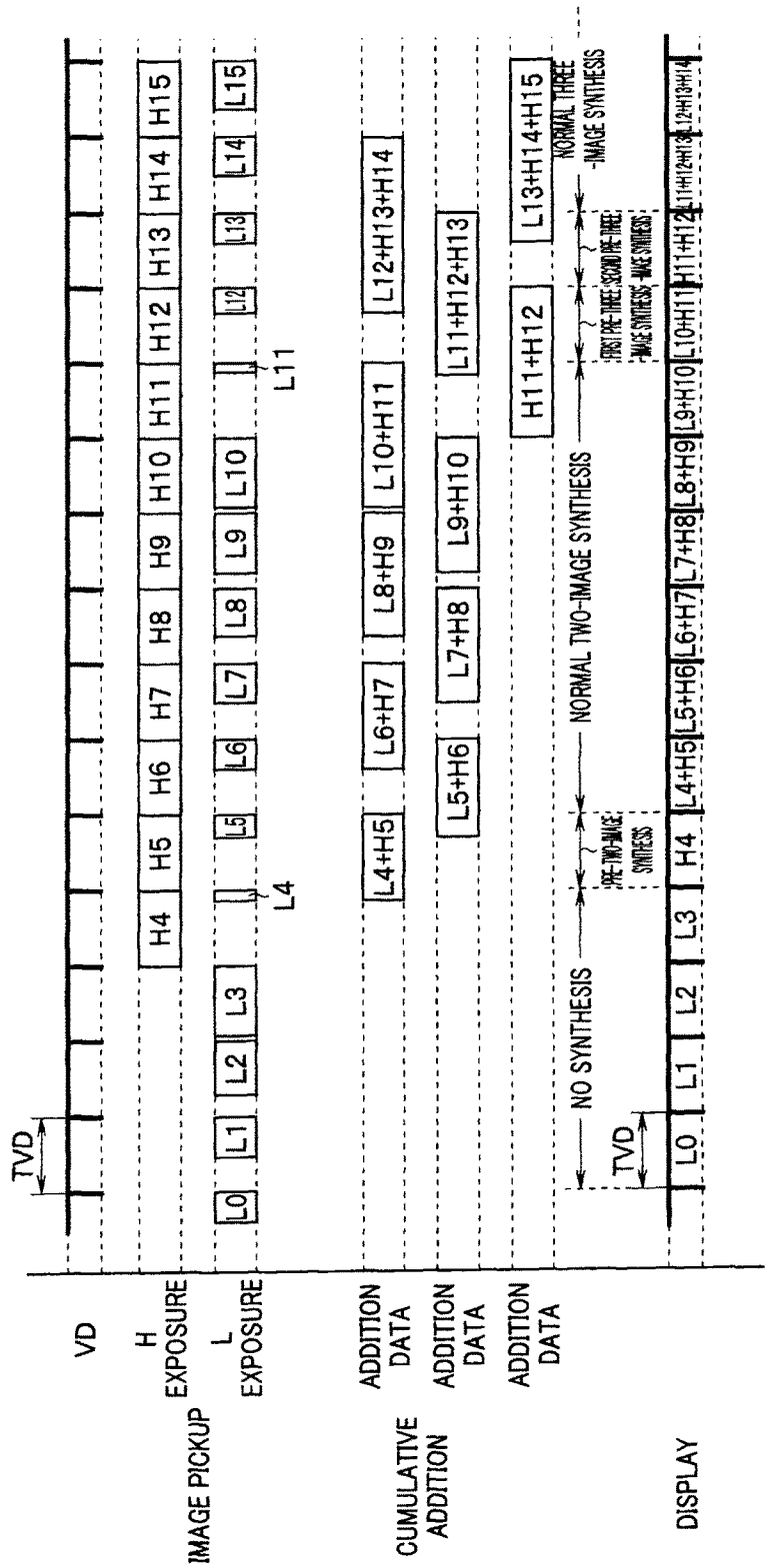
Figure 20:
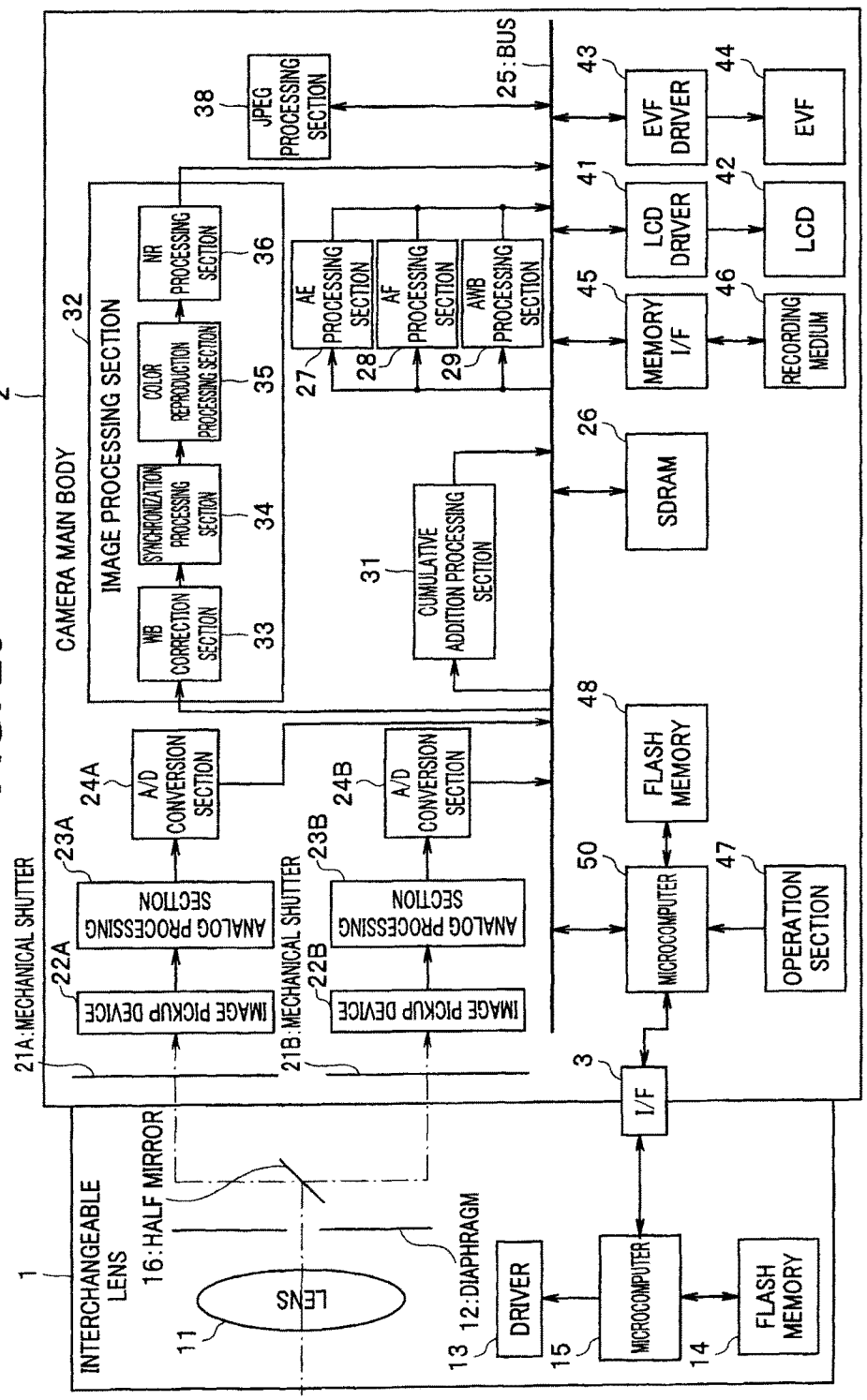

Note that the one image photographing processing described below is not the processing in the single photographing mode for photographing one still image by opening and closing the mechanical shutter 21, but the processing for obtaining one image based on a certain cycle of the vertical synchronization signal VD (see FIGS. 7 to 9, and 19, etc.), with the mechanical shutter 21 opened (however, FIGS. 7 to 9 show the example in which one image photographing is repeatedly performed for every vertical synchronization period TVD).

When this processing is performed while processing in the main routine, not shown, is being performed after the power source of the image pickup apparatus is turned on with the power source button, initial setting is performed first (step S1). In the initial setting, if the mechanical shutter 21 is closed, processing for opening the mechanical shutter 21 is performed, for example.

Next, the microcomputer 50 obtains the predetermined cycle of the vertical synchronization signal VD, that is, the vertical synchronization period TVD that is the frame period from the flash memory 48, for example (step S2).

Then, based on the image data obtained in the live view or the like, the AE processing section 27 calculates the proper exposure conditions (Tv, Av, Sv, etc.) (step S3).

The microcomputer 50 controls the aperture diameter of the diaphragm 12 such that the calculated Av value is reflected, and controls the gain of the analog processing section 23 (or digital gain of the image processing section 32) such that the calculated Sv value is reflected (step S4).

Furthermore, the microcomputer 50 calculates the proper exposure time SS which is a shutter speed corresponding to the calculated Tv value (step S5).

Subsequently, the microcomputer 50 determines whether or not SS<TVD (step S6).

When determining that SS≥TVD, the microcomputer 50 further determines whether or not SS<2TVD (step S7).

Figure 4:
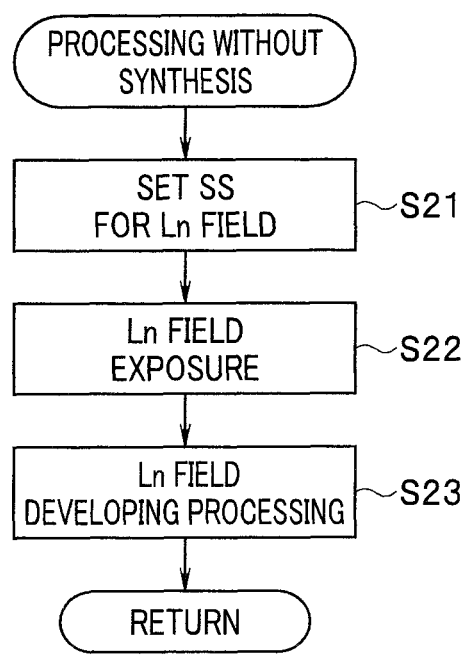
FIG. 4 is a flowchart showing processing without synthesis in step S8 in FIG. 3 according to the first embodiment.

When determination has been made that SS<TVD in the step S6, processing without synthesis, which will be described later with reference to FIG. 4, is performed (step S8).

Figure 5:
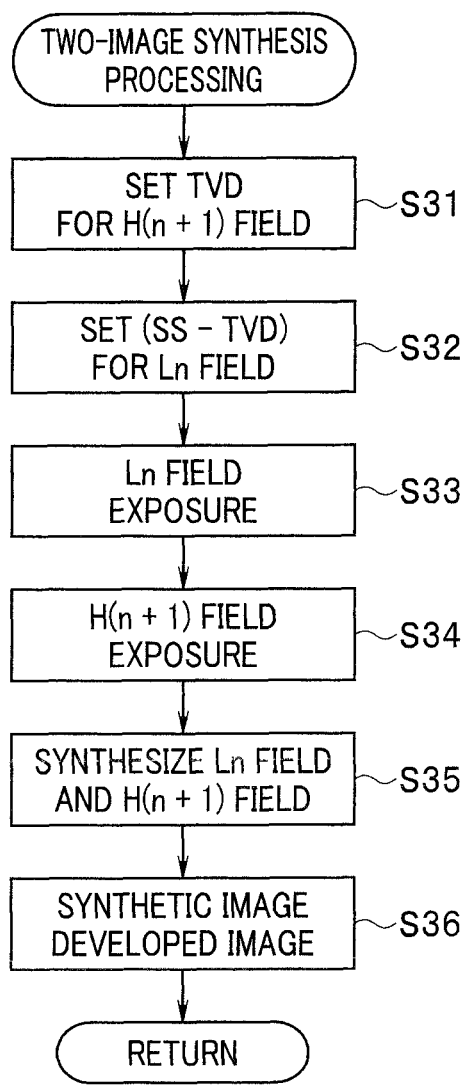
FIG. 5 is a flowchart showing two-image synthesis processing in step S9 in FIG. 3 according to the first embodiment.

When determination has been made that SS<2TVD in step S7, two-image synthesis processing, which will be described later with reference to FIG. 5, is performed (step S9).

Figure 6:
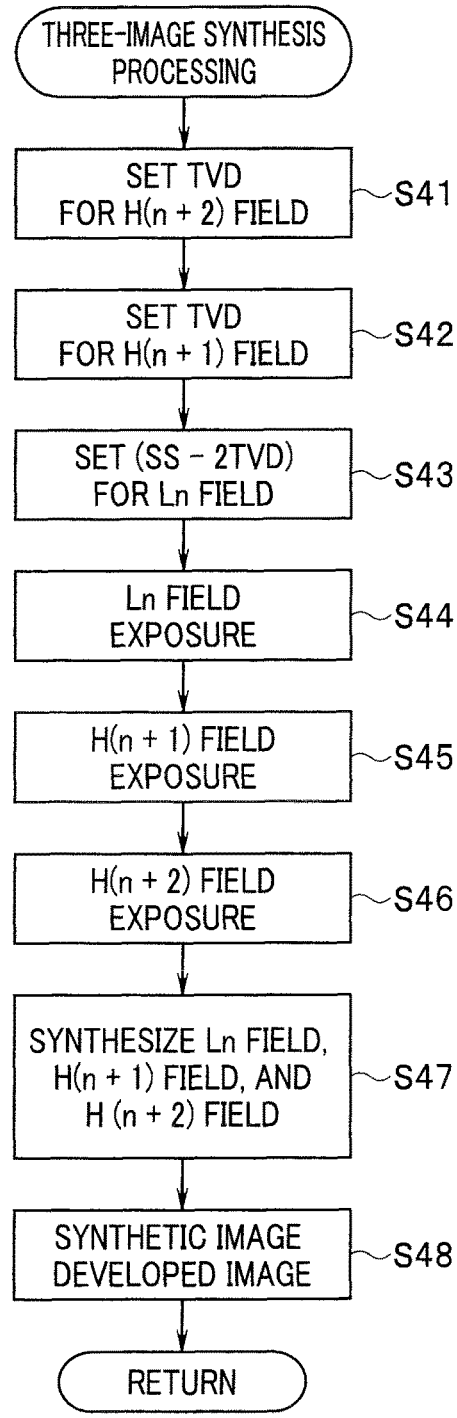
FIG. 6 is a flowchart showing three-image synthesis processing in step S10 in FIG. 3 according to the first embodiment.

Furthermore, when determination has been made that SS≥2TVD in step S7, three-image synthesis processing, which will be described later with reference to FIG. 6, is performed (step S10).

Note that, in the case where 3TVD≤SS<4TVD, four-image synthesis processing may be performed, and in the case where 4TVD≤SS<5TVD, five-image synthesis processing may be performed similarly. However, in order to avoid complicated description, description on the case where 3TVD≤SS is omitted in the present embodiment assuming that SS<3TVD. Therefore, description will be made below supposing that SS<3TVD.

When any one of processings in steps S8 to S10 has been performed, the obtained image is processed by the image processing section 32, and the processed image is displayed on the LCD 42 or the EVF 44, or recorded in the recording medium 46 (step S11).

After that, the processing procedure returns from the above-described processing to the processing in the main routine, not shown.

Next, FIG. 4 is a flowchart showing the processing without synthesis in the step S8 in FIG. 3, and FIG. 7 is a timing chart for describing the processing without synthesis.

Note that "n" is used as an integer indicating the time-series frame number in the flowchart in FIG. 4 or the flowcharts in the subsequent drawings. In particular, when "n" is used as the number of the frame which is currently processed, the one frame before the frame currently being processed is indicated as (n−1) and one frame after the frame currently being processed is indicated as (n+1).

In addition, the long exposure image read out from the H-field 22H in the n frame is referred to as an image of the Hn field, and the short exposure image read out from the L-field 22L in the n frame is referred to as an image of the Ln field. Furthermore, in the timing chart in FIG. 7 or the timing charts in the subsequent drawings, the exposure timing related to the image pickup of the H-field is recited as H exposure, and the exposure timing related to the image pickup of the L-field is recited as L exposure.

The processing shown in FIG. 4 is performed when determination has been made that SS<TVD in the step S6 in FIG. 3. In this case, the quotient obtained by dividing SS by TVD is 0, and the remainder is SS.

Therefore, the exposure time is not set for the Hn field, and SS is set as the exposure time only for the Ln field (step S21).

Then, exposure of the Ln field is performed (step S22).

The image of the exposed Ln field is read out in synchronization with the vertical synchronization signal VD, and subjected to developing processing by the image processing section 32 (step S23). Therefore, the cumulative addition processing is not performed by the cumulative addition processing section 31.

After that, the processing procedure returns from this processing to the processing shown in FIG. 3.

As a result of such processing, the image is displayed at the cycle same as that of the vertical synchronization period TVD, as shown in FIG. 7.

Next, FIG. 5 is a flowchart showing the two-image synthesis processing in the step S9 in FIG. 3, and FIG. 8 is a timing chart for describing the two-image synthesis processing.

The processing shown in FIG. 5 is performed in the case where determination has been made that SS≥TVD in the step S6 in FIG. 3 and determination has been further made that SS<2TVD in the step S7. In this case, the quotient obtained by dividing SS by TVD is 1, and the remainder is (SS−TVD).

Therefore, the vertical synchronization period TVD is set as the exposure time for the H(n+1) field (step S31), and the exposure time (SS−TVD) is set for the Ln field (step S32).

Along the time series, exposure of the Ln field is performed first (step S33), and then exposure of the H(n+1) field is performed (step S34).

The images of the exposed Ln field and H(n+1) field are read out in synchronization with the vertical synchronization signal VD in the similar manner as described above.

After that, the cumulative addition processing of the image of the Ln field and the image of the H(n+1) field is performed by the cumulative addition processing section 31, and a synthetic image is generated (step S35).

Then, the developing processing is performed on the synthetic image by the image processing section 32 (step S36), and the processing procedure returns from this processing to the processing shown in FIG. 3.

As a result of such processing, the image corresponding to the proper exposure time SS longer than the vertical synchronization period TVD is displayed at the cycle same as that of the vertical synchronization period TVD, as shown in FIG. 8.

Next, FIG. 6 is a flowchart showing the three-image synthesis processing in the step S10 in FIG. 3, and FIG. 9 is a timing chart for describing the three-image synthesis processing.

The processing shown in FIG. 6 is performed when determination has been made that SS≥2TVD in the step S7 in FIG. 3 (it is assumed that SS<3TVD, as described above). In this case, the quotient obtained by dividing SS by TVD is 2, and the remainder is (SS−2TVD).

Therefore, the vertical synchronization period TVD is set as the exposure time for the H(n+2) field (step S41), the vertical synchronization period TVD is set as the exposure time for the H(n+1) field (step S42), and the exposure time (SS−2TVD) is set for the Ln field (step S43).

Then, along the time series, exposure of the Ln field is performed first (step S44), exposure of the H(n+1) field is performed next (step S45), and further exposure of the H(n+2) field is performed (step S46).

The images of the exposed Ln field, H(n+1) field, and H(n+2) field are read out in synchronization with the vertical synchronization signal VD in the similar manner as described above.

After that, the cumulative addition processing of the image of the Ln field, the image of the H(n+1) field, and the image of the H(n+2) field is performed by the cumulative addition processing section 31, and a synthetic image is generated (step S47).

Then, the developing processing is performed on the synthetic image by the image processing section 32 (step S48), and the processing procedure returns from this processing to the processing shown in FIG. 3.

As a result of such processing, the image corresponding to the proper exposure time SS longer than the vertical synchronization period TVD is displayed at the cycle same as that of the vertical synchronization period TVD, as shown in FIG. 9.

Figure 10:
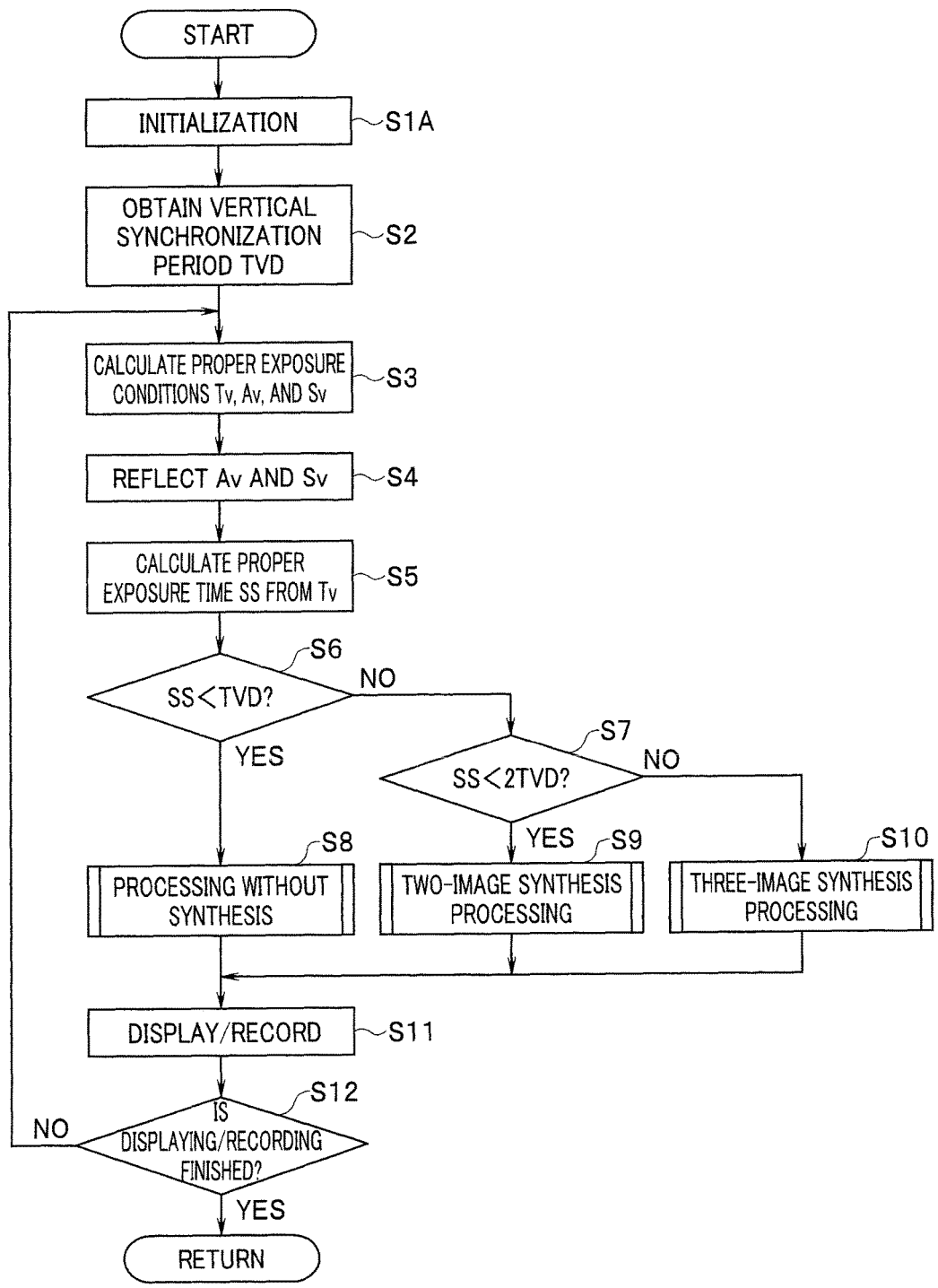
FIG. 10 is a flowchart showing moving image photographing processing in the image pickup apparatus according to the first embodiment.

Next, FIG. 10 is a flowchart showing moving image photographing processing in the image pickup apparatus. Note that description is made here assuming that the processing is the moving image photographing processing. However, the same processing (also the sub routine and the timing chart in FIG. 19, to be described later) can be applied also to the live-view.

The moving image photographing processing shown in FIG. 10 is substantially the same as the one-image photographing processing shown in FIG. 3, but is different in several points, that is, images are repeatedly obtained in the moving photographing processing, and this processing copes with also the change in the brightness of the object.

In the initialization processing performed first after the processing shown in FIG. 10 has been started, not only the mechanical shutter 21 is opened but also various kinds of counters to be used in the processing are reset (step S1A). Specifically, counters are set such that PreMixcnt=0, Mixcnt=0, and Stepcnt=0. Note that the symbol "=" used for the counter without a question mark "?" indicates that the value of the right side is assigned to the counter of the left side, and the symbol "=" used for the counter with the question mark "?" indicates equality (the symbols similar to the C language in programming are used).

PreMixcnt is a counter for indicating that the processing performed previously is which one of the processing without synthesis, the two-image synthesis processing, and the three-image synthesis processing, Mixcnt is a counter for indicating which one of the processing without synthesis, the two-image synthesis processing, and the three-image synthesis processing is being executed, and Stepcnt is a counter for indicating, regarding the loop of steps S3 to S12, whether the loop is "first time continuous loop" or "second time continuous loop or subsequent continuous loop" in the two-image synthesis processing, and whether the loop is "first time continuous loop", "second time continuous loop", or "third time continuous loop or subsequent continuous loop" in the three-image synthesis processing.

Stepcnt is used for determining which of pre-two-image synthesis processing and normal two-image synthesis processing is to be performed, with respect to the two-image synthesis processing, and determining which one of first pre-three-image synthesis processing, second pre-three-image synthesis processing, and the normal three-image synthesis processing is to be performed, with respect to the three-image synthesis processing.

After the processing in the step S1A is performed, the subsequent processings in steps S2 to S11 are performed similarly as in the one-image photographing processing shown in FIG. 3.

After that, the microcomputer 50 determines whether to finish or continue the processing of displaying and recording (step S12).

When determination is made to continue the processing, the processing procedure returns to the step S3 and the processing as described above is performed, and when determination is made to finish the processing, the processing procedure returns from this processing to the processing in the main routine, not shown.

Figure 11:
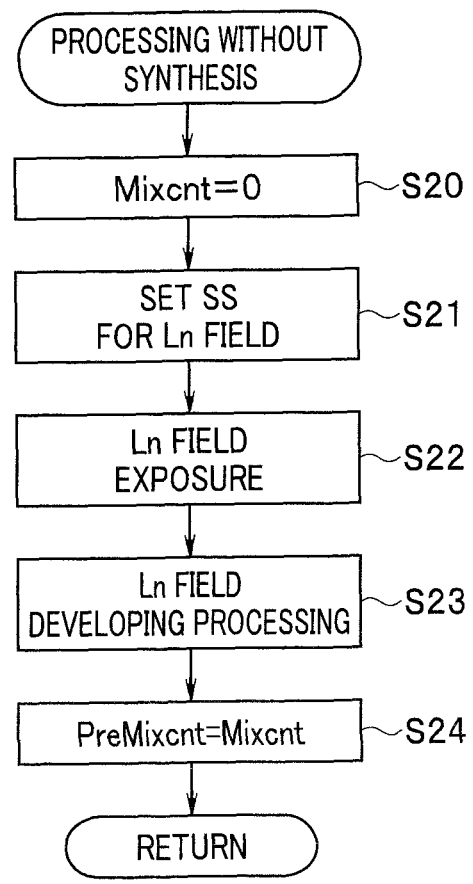
FIG. 11 is a flowchart showing processing without synthesis in step S8 in FIG. 10 according to the first embodiment.
Figure 19:
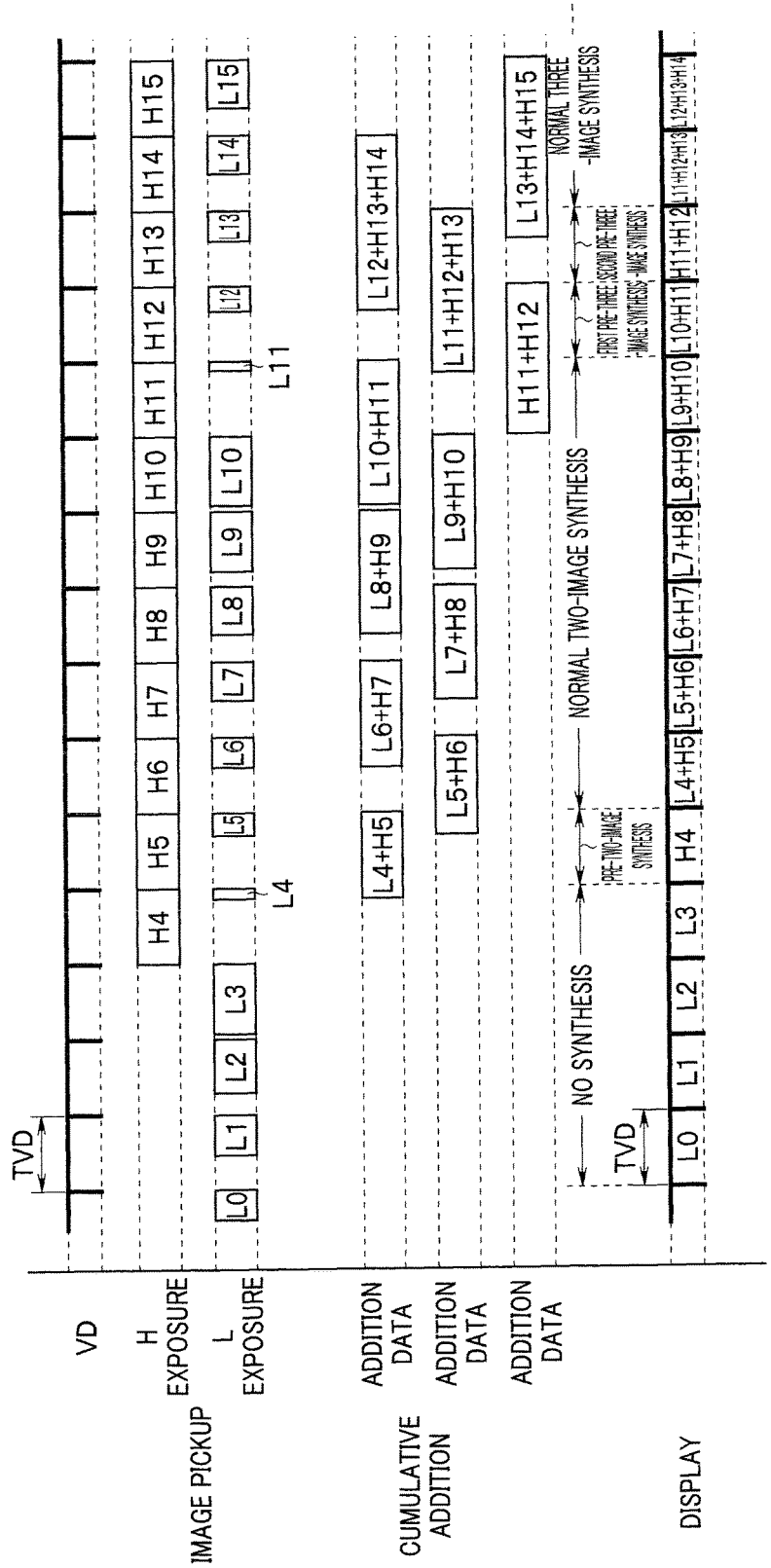
FIG. 19 is a timing chart for describing the moving image photographing processing according to the first embodiment.

FIG. 11 is a flowchart showing the processing without synthesis in the step S8 in FIG. 10, and FIG. 19 is a timing chart for describing the moving image photographing processing. Note that FIG. 19 shows the state where the object gradually becomes dark, and the proper exposure time SS becomes longer by degrees.

The processing shown in FIG. 11 is performed when determination has been made that SS<TVD in the step S6 in FIG. 10. In this case, the quotient obtained by dividing SS by TVD is 0, and the remainder is SS.

When the processing is started, the microcomputer 50 first performs setting such that Mixcnt=0 (step S20).

After the processings shown in steps S21 to S23 shown in FIG. 4 are performed, the microcomputer 50 performs setting such that PreMixcnt=Mixcnt (step S24), and the processing procedure returns from this processing to the processing shown in FIG. 10.

As a result of such processing, the image is displayed at the cycle same as that of the vertical synchronization period TVD, as shown in L0 to L3 in the "DISPLAY" part in FIG. 19.

Figure 12:
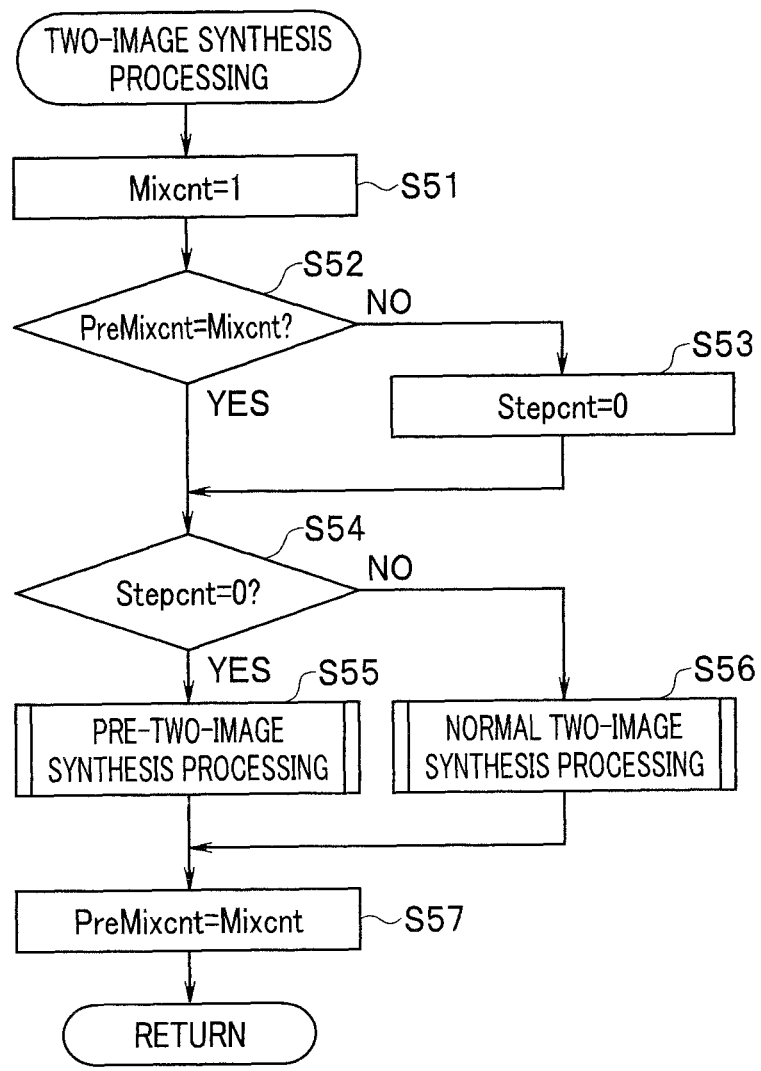
FIG. 12 is a flowchart showing two-image synthesis processing in step S9 in FIG. 10 according to the first embodiment.

FIG. 12 is a flowchart showing the two-image synthesis processing in the step S9 in FIG. 10.

The processing shown in FIG. 12 is performed when determination has been made that SS≥TVD in the step S6 in FIG. 10, and determination has been further made that SS<2TVD in the step S7. In this case, the quotient obtained by dividing SS by TVD is 1, and the remainder is (SS−TVD).

When this processing is started, the microcomputer 50 first performs setting such that Mixcnt=1 (step S51).

Next, the microcomputer 50 determines whether or not PreMixcnt=Mixcnt (step S52).

When determining that PreMixcnt≠Mixcnt, the microcomputer 50 performs setting such that Stepcnt=0 (step S53).

When the microcomputer 50 has performed the processing in the step S53, or determined that PreMixcnt=Mixcnt, the microcomputer 50 determines whether or not Stepcnt=0 (step S54).

Figure 13:
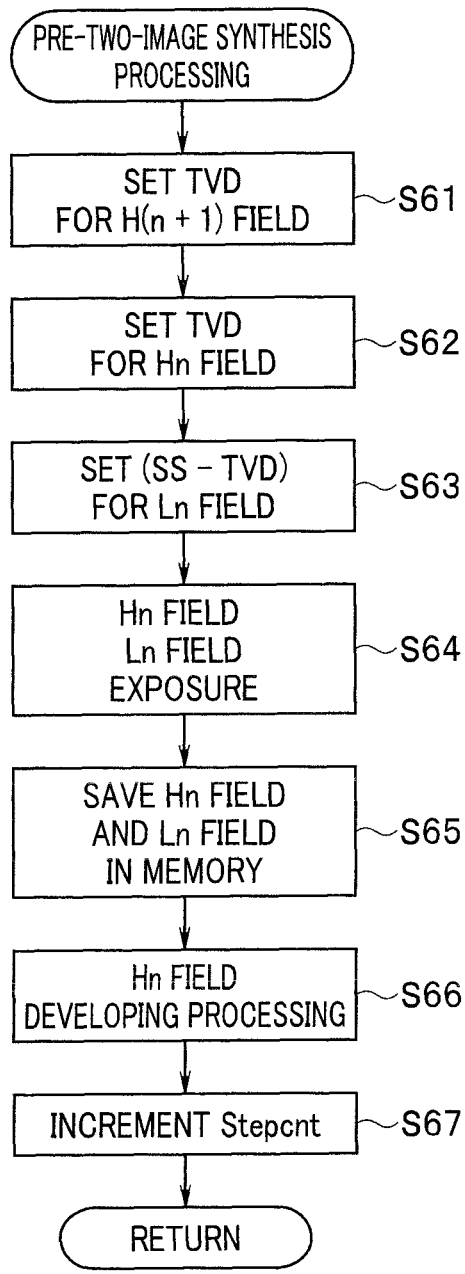
FIG. 13 is a flowchart showing pre-two-image synthesis processing in step S55 in FIG. 12 according to the first embodiment.

When determination has been made that Stepcnt=0, the pre-two-image synthesis processing, which will be described later with reference to FIG. 13, is performed (step S55).

Figure 14:
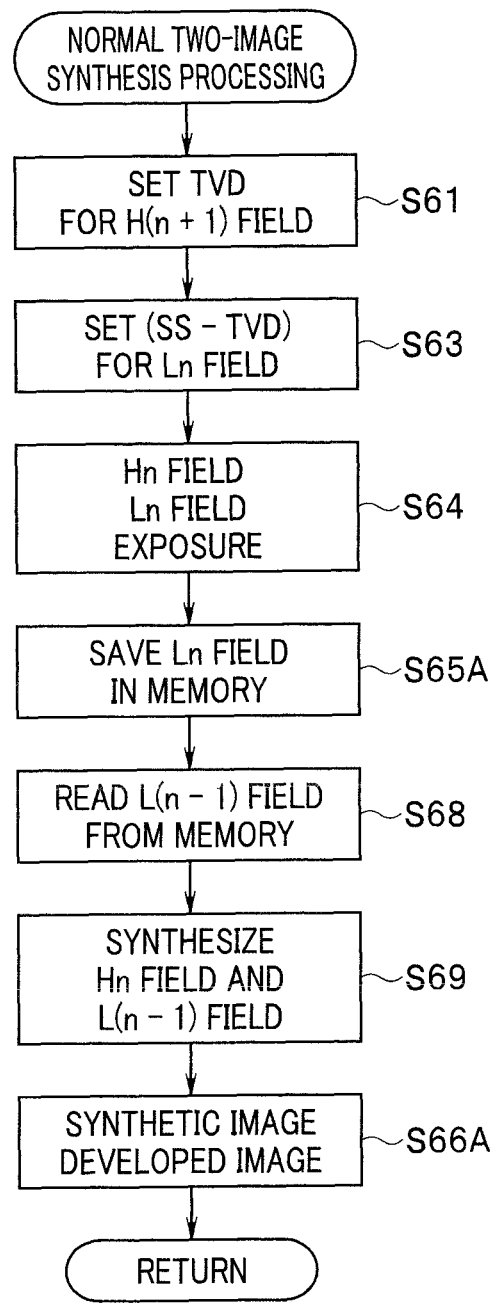
FIG. 14 is a flowchart showing normal two-image synthesis processing in step S56 in FIG. 12 according to the first embodiment.

In addition, when determination has been made that Stepcnt≠0 in the step S54, the normal two-image synthesis processing, which will be described later with reference to FIG. 14, is performed (step S56).

After the processing in the step S55 or step S56 is performed, the microcomputer 50 performs setting such that PreMixcnt=Mixcnt (step S57), and the processing procedure returns from this processing to the processing shown in FIG. 10.

Next, FIG. 13 is a flowchart showing the pre-two-image synthesis processing in the step S55 in FIG. 12.

The processing shown in FIG. 13 is performed when determination has been made that Stepcnt=0 in the step S54 in FIG. 12, that is, when determination has been made that the loop of the steps S3 to S12 is the first time continuous loop in the two-image synthesis processing. In addition, the quotient obtained by dividing SS by TVD is 1, and the remainder is (SS−TVD), as described above.

When this processing is started, the vertical synchronization period TVD is set for H(n+1) field as the exposure time (step S61), the vertical synchronization period TVD is set for Hn field (step S62), and the exposure time (SS−TVD) is set for the Ln field (step S63).

Then, exposure of the Hn field and exposure of the Ln field are performed (step S64). The images of the exposed Hn field and Ln field are read out in synchronization with the vertical synchronization signal VD in the similar manner as described above.

The images of the Hn field and Ln field, which are thus read out, are saved in the memory such as the SDRAM (step S65).

The image of the Hn field is subjected to the developing processing by the image processing section 32 (step S66).

Therefore, the cumulative addition processing is not performed by the cumulative addition processing section 31 in the pre-two-image synthesis processing.

Then, the microcomputer 50 increments Stepcnt (step S67). As a result, when the two-image synthesis processing in the step S9 is started in the next loop of the steps S3 to S12, the normal two-image synthesis processing in the step S56 is started based on the determination in the step S54 in FIG. 12.

After that, the processing procedure returns from this processing to the processing shown in FIG. 12.

As a result of such processing, the image corresponding to the proper exposure time SS that is same as the vertical synchronization period TVD is shown at the cycle same as that of the vertical synchronization period TVD, as shown in H4 in the "DISPLAY" part in FIG. 19. In addition, display of H4 is performed in the vertical synchronization period TVD next to L3 in the "DISPLAY" part in FIG. 19. Therefore, a dropped frame is not generated in the display. In addition, since the exposure period of the image of H4 is TVD, the change of the exposure amount with respect to the images of the previous and next frames is smooth, which results in the image with natural brightness change.

Next, FIG. 14 is a flowchart showing the normal two-image synthesis processing in the step S56 in FIG. 12.

The processing shown in FIG. 14 is performed when determination has been made that Stepcnt≠0 in the step S54 in FIG. 12, that is, determination has been made that the loop of the steps S3 to S12 is the second time continuous loop or subsequent continuous loop in the two-image synthesis processing. In addition, the quotient obtained by dividing SS by TVD is 1, and the remainder is (SS−TVD), as described above.

When this processing is started, the above-described processings in the steps S61, S63, and S64 are performed. The above-described processing in the step S62 is not necessary (since the processing has been previously performed as the processing in the step S61 in FIG. 13 or FIG. 14 in the previous loop).

Then, the read-out image of the Ln field is saved in the memory such as SDRAM 26 (step S65A).

Subsequently, the image of the L(n−1) field is read from the memory such as SDRAM 26 (step S68).

After that, the cumulative addition processing of the image of the Hn field and the image of the L(n−1) field is performed by the cumulative addition processing section 31, and a synthetic image is generated (step S69).

Then, the developing processing is performed on the synthetic image by the image processing section 32 (step S66A), and the processing procedure returns from this processing to the processing shown in FIG. 12.

As a result of such processing, the image corresponding to the proper exposure time SS longer than the vertical synchronization period TVD is displayed at the cycle same as that of the vertical synchronization period TVD, as shown in (L4+H5) to (L9+H10) in the "DISPLAY" part in FIG. 19. In addition, similarly as described above, display of (L4+H5) is performed in the vertical synchronization period TVD next to H4 in the "DISPLAY" part in FIG. 19, which prevents a dropped frame from being generated in the display and enables the exposure amount to be changed smoothly.

Figure 15:
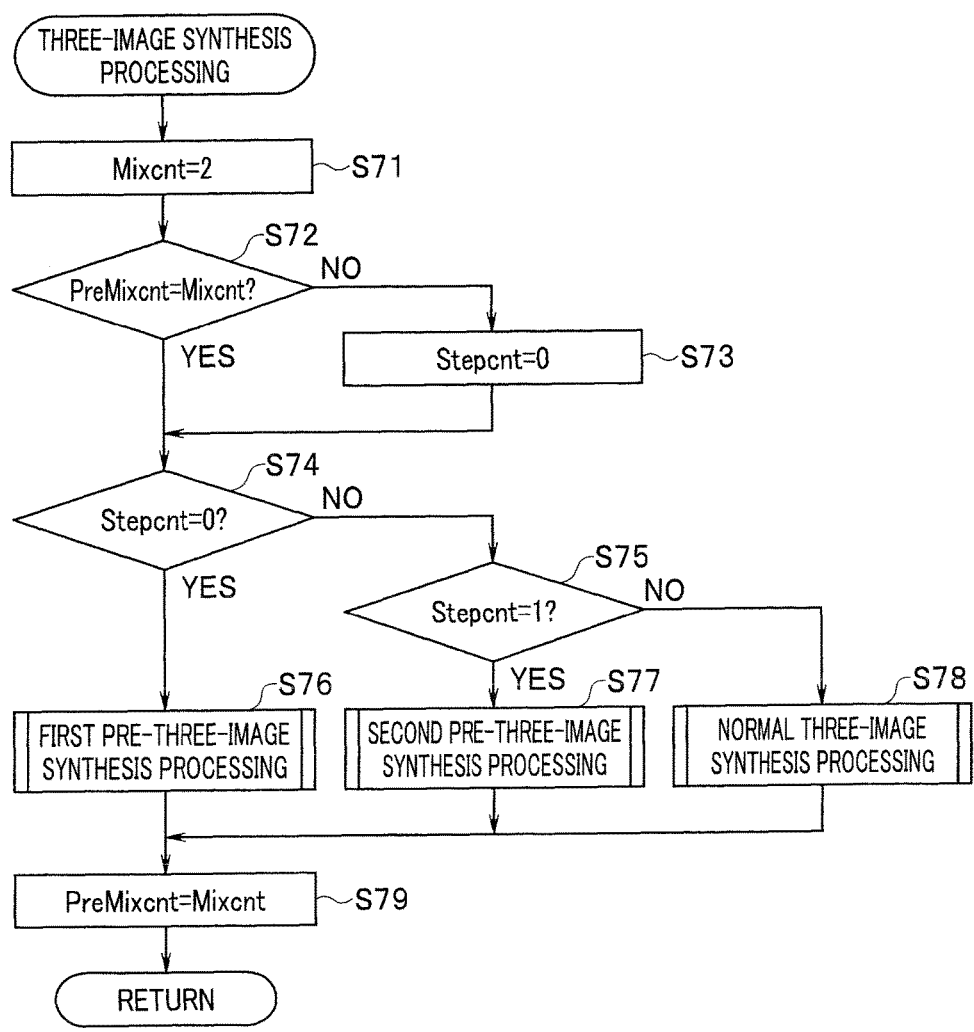
FIG. 15 is a flowchart showing three-image synthesis processing in step S10 in FIG. 10 according to the first embodiment.

FIG. 15 is a flowchart showing the three-image synthesis processing in the step S10 in FIG. 10.

The processing shown in FIG. 15 is performed when determination has been made that SS≥2TVD in the step S7 in FIG. 10 (it is assumed that SS<3TVD, as described above). In this case, the quotient obtained by dividing SS by TVD is 2, and the remainder is (SS−2TVD).

When this processing is started, the microcomputer 50 first performs setting such that Mixcnt=2 (step S71).

Next, the microcomputer 50 determines whether or not PreMixcnt=Mixcnt (step S72).

When determining that PreMixcnt≠Mixcnt, the microcomputer 50 performs setting such that Stepcnt=0 (step S73).

When the microcomputer 50 has performed the processing in the step S73 or determined that PreMixcnt=Mixcnt in the step S72, the microcomputer 50 determines whether or not Stepcnt=0 (step S74).

When determining that Stepcnt≠0, the microcomputer 50 further determines whether or not Stepcnt=1 (step S75).

Figure 16:
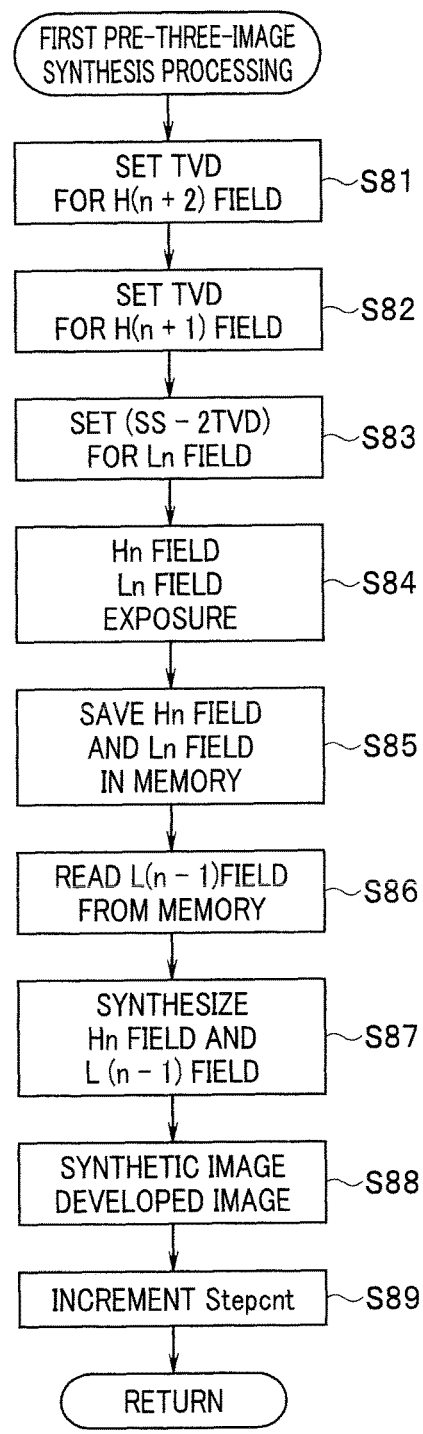
FIG. 16 is a flowchart showing first pre-three-image synthesis processing in step S76 in FIG. 15 according to the first embodiment.

When determination has been made that Stepcnt=0 in the step S74, first pre-three-image synthesis processing, which will be described later with reference to FIG. 16, is performed (step S76).

Figure 17:
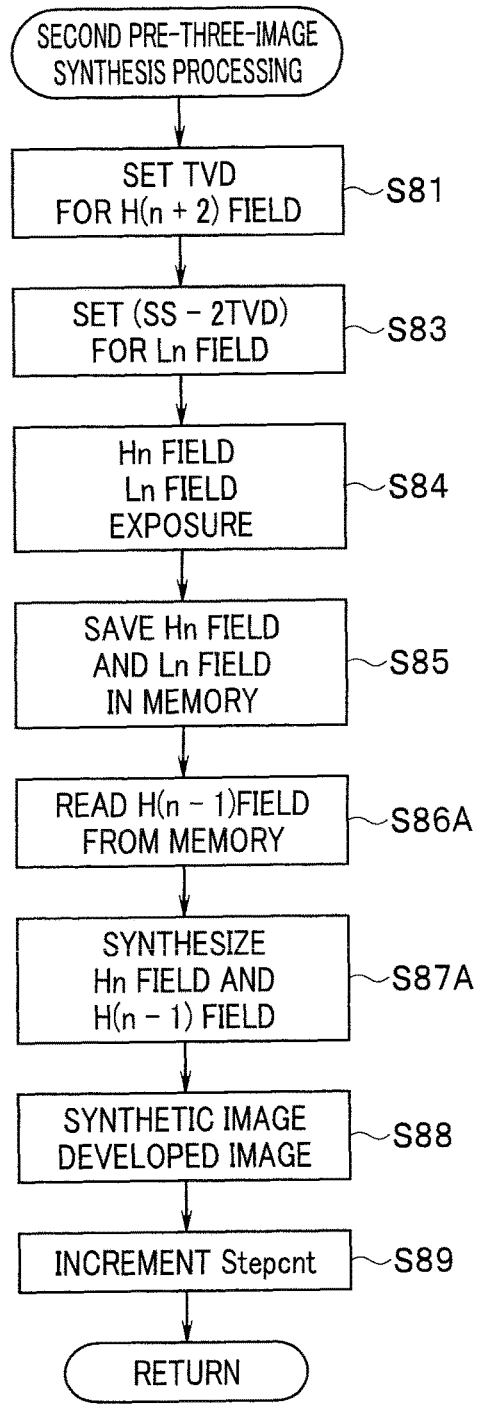
FIG. 17 is a flowchart showing second pre-three-image synthesis processing in step S77 in FIG. 15 according to the first embodiment.

When determination has been made that Stepcnt=1 in the step S75, second pre-three-image synthesis processing, which will be described later with reference to FIG. 17, is performed (step S77).

Figure 18:
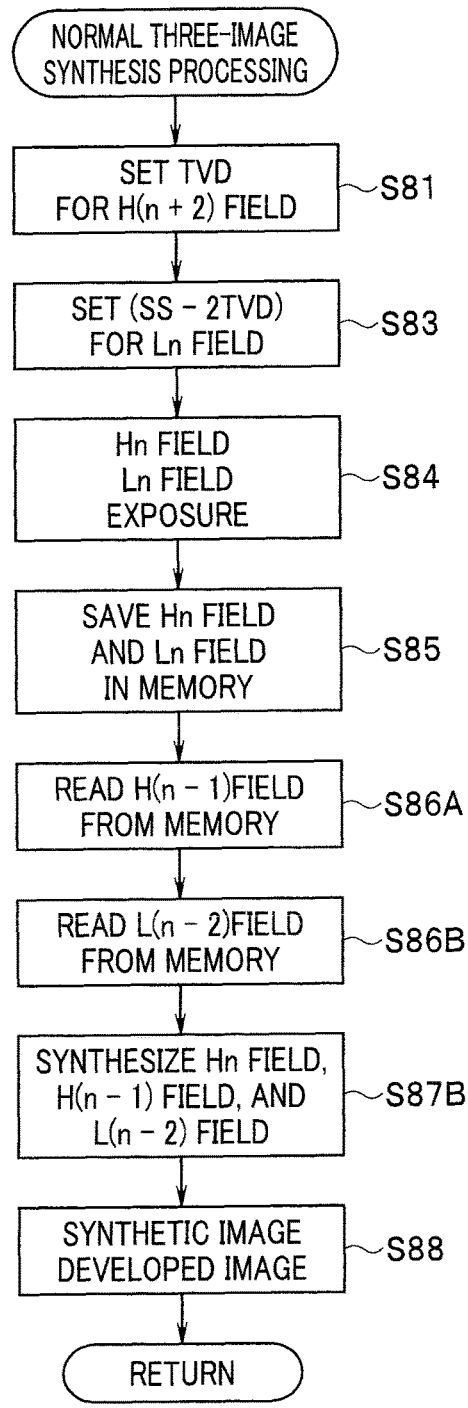
FIG. 18 is a flowchart showing normal three-image synthesis processing in step S78 in FIG. 15 according to the first embodiment.

When determination has been made that Stepcnt≠1, normal three-image synthesis processing, which will be described later with reference to FIG. 18, is performed (step S78).

After any one of the processing in the steps S76 to S78 is performed, the microcomputer 50 performs setting such that PreMixcnt=Mixcnt (step S79), and the processing procedure returns from this processing to the processing shown in FIG. 10.

FIG. 16 is a flowchart showing the first pre-three-image synthesis processing in the step S76 in FIG. 15.

The processing shown in FIG. 16 is performed when determination has been made that Stepcnt=0 in the step S74 in FIG. 15, that is, determination has been made that the loop of the steps S3 to S12 is the first time continuous loop in the three-image synthesis processing. In addition, as described above, the quotient obtained by dividing SS by TVD is 2, and the remainder is (SS−2TVD).

When this processing is started, the vertical synchronization period TVD is set for H(n+2) field as the exposure time (step S81), the vertical synchronization period TVD is set for H(n+1) field (step S82), and the exposure time (SS−2TVD) is set for the Ln field (step S83).

Then, exposure of the Hn field and exposure of the Ln field are performed (step S84). The images of the exposed Hn field and Ln field are read out in synchronization with the vertical synchronization signal VD in the similar manner as described.

The images of the Hn field and Ln field, which are thus read out, are saved in the memory such as the SDRAM (step S85).

Subsequently, the image of L(n−1) field is read from the memory such as the SDRAM 26 (step S86).

After that, the cumulative addition processing of the image of the Hn field and the image of the L(n−1) field is performed by the cumulative addition processing section 31, and a synthetic image is generated (step S87).

Then, developing processing is performed on the synthetic image by the image processing section 32 (step S88).

Further, the microcomputer 50 increments Stepcnt (step S89). As a result, Stepcnt becomes 1. That is, when the three-image synthesis processing in the step S10 is started in the next loop from the steps S3 to S12, the second pre-threeimage synthesis processing in the step S77 is started based on the determination in the step S75 in FIG. 15.

After that, the processing procedure returns from this processing to the processing shown in FIG. 15.

As a result of such processing, the image corresponding to the proper exposure time SS longer than the vertical synchronization period TVD is displayed at the cycle same as that of the vertical synchronization period TVD, as shown in (L10+H11) in the "DISPLAY" part in FIG. 19. In addition, display of (L10+H11) is performed in the vertical synchronization period TVD next to (L9+H10) in the "DISPLAY" part in FIG. 19. Therefore, a dropped frame is not generated in the display. In addition, in the image of (L10+H11), the change of the exposure amount with respect to the images of previous and next frames is smooth, which results in the image with natural brightness change.

FIG. 17 is a flowchart showing the second pre-three-image synthesis processing in the step S77 in FIG. 15.

The processing shown in FIG. 17 is performed when determination has been made that Stepcnt=1 in the step S75 in FIG. 15, that is, determination has been made that the loop of the steps S3 to S12 is the second time continuous loop in the three-image synthesis processing. In addition, as described above, the quotient obtained by dividing SS by TVD is 2, and the remainder is (SS−2TVD).

When this processing is started, the processings in the steps S81, and S83 to S85 are performed. The above-described processing in the step S82 is not necessary (since the processing has been previously performed as the processing in the step S81 in FIG. 16 in the previous loop).

Subsequently, the image of H(n−1) field is read from the memory such as the SDRAM 26 (step S86A).

Then, the cumulative addition processing of the image of the Hn field and the image of the H(n−1) field is performed by the cumulative addition processing section 31, and a synthetic image is generated (step S87A).

After that, the developing processing in the step S88 is performed and the microcomputer 50 increments Stepcnt in the step S89. As a result, Stepcnt becomes 2. That is, when the three-image synthesis processing in the step S10 is started in the next loop of the steps S3 to S12, the normal three-image synthesis processing in the step S78 is started based on the determination in the step S75 in FIG. 15.

After that, the processing procedure returns from this processing to the processing shown in FIG. 15.

As a result of such processing, the image corresponding to the proper exposure time SS longer than the vertical synchronization period TVD is displayed at the cycle same as that of the vertical synchronization period TVD, as shown in (H11+H12) in the "DISPLAY" part in FIG. 19. In addition, display of (H11+H12) is performed in the vertical synchronization period TVD next to (L10+H11) in the "DISPLAY" part in FIG. 19. Therefore, a dropped frame is not generated in the display. In addition, since the exposure period of the image of (H11+H12) is 2TVD, the change of the exposure amount with respect to the images of previous and next frames is smooth, which results in the image with natural brightness change.

FIG. 18 is a flowchart showing the normal three-image synthesis processing in the step S78 in FIG. 15.

The processing shown in FIG. 18 is performed when determination has been made that Stepcnt≠1 in the step S75 in FIG. 15, that is, determination has been made that the loop of the steps S3 to S12 is the third time continuous loop or subsequent continuous loop in the three-image synthesis processing. In addition, as described above, the quotient obtained by dividing SS by TVD is 2, and the remainder is (SS−2TVD).

When this processing is started, the processings in the steps S81, S83 to S 85, and S86A are performed. The above-described processing in the step S82 is not necessary (since the processing has been previously performed as the processing in the step S81 in FIG. 17 or FIG. 18 in the previous loop).

Furthermore, the image of L(n−2) field is read from the memory such as the SDRAM 26 (step S86B).

Then, the cumulative addition processing of the image of the Hn field, the image of the H(n−1) field, and the image of the L(n−2) field is performed by the cumulative addition processing section 31, and a synthetic image is generated (step S87B).

Then, the developing processing in the step S88 is performed and the processing procedure returns from this processing to the processing shown in FIG. 15.

As a result of such processing, the image corresponding to the proper exposure time SS longer than the vertical synchronization period TVD is displayed at the cycle same as that of the vertical synchronization period TVD, as shown in (L11+H12+H13), (L12+H13+H14), . . . in the "DISPLAY" part in FIG. 19. In addition, similarly as described above, display of (L11+H12+H13) is performed in the vertical synchronization period TVD next to (H11+H12) in the "DISPLAY" part in FIG. 19, which prevents a dropped frame from being generated in the display. In addition, since the image of the frame after the image of (H11+H12) whose exposure period is 2TVD is the image of (L11+H12+H13), the change of the exposure amount is smooth, to thereby provide the image with natural brightness change.

Thus, in the image pickup apparatus, when the state is shifted from the state where the proper exposure time SS is shorter than the frame period and synthesis processing is not performed by the cumulative addition processing section 31 as the synthesizing section to the state where two images are synthesized in the moving image or the live view under the control by the microcomputer 50, a long exposure image of one frame is used as an image for recording or displaying (see the pre-two-image synthesis processing in FIG. 13 and H4 in the "DISPLAY" part in FIG. 19). In addition, when the state is shifted from the state where the cumulative addition processing section 31 as the synthesizing section synthesizes j images (j is an integer equal to or greater than 2) to the state where the cumulative addition processing section 31 synthesizes (j+1) images, a synthetic image is generated by using only the long exposure images and the synthetic image is used as an image for recording or displaying during at least one frame (see the second pre-three-image synthesis processing in FIG. 17, and (H11+H12) in the "DISPLAY" part in FIG. 19).

Note that FIG. 19 illustrates the state where the object gradually becomes dark and the proper exposure time SS gradually becomes long, as described above. In contrast, when the object gradually becomes bright, and the proper exposure time SS gradually becomes short, the pre-two-image synthesis processing shown in FIG. 13, the first pre-three-image synthesis processing in FIG. 16, and the second pre-three-image synthesis processing in FIG. 17 may be omitted.

In addition, in the description above, the cumulative addition processing section 31 as the synthesizing section is configured to obtain the synthetic image which is same as the image exposed continuously for the proper exposure time SS by synthesizing the continuous long exposure images and the short exposure image. However, the present invention is not limited to such a configuration. For example, the short exposure image and the long exposure image of the same one frame may be synthesized in order only to obtain a synthetic image with the exposure amount corresponding to the proper exposure time SS.

In the exemplary configuration shown in FIG. 1, the image pickup device 22 configured as the HDR sensor is used as the image pickup section that outputs, for every frame period, the long exposure image exposed for the long exposure time and the short exposure image exposed for the short exposure time within the exposure period of the long exposure image, when the proper exposure time SS is longer than the frame period. The present invention, however, is not limited to such a configuration.

Figure 20:
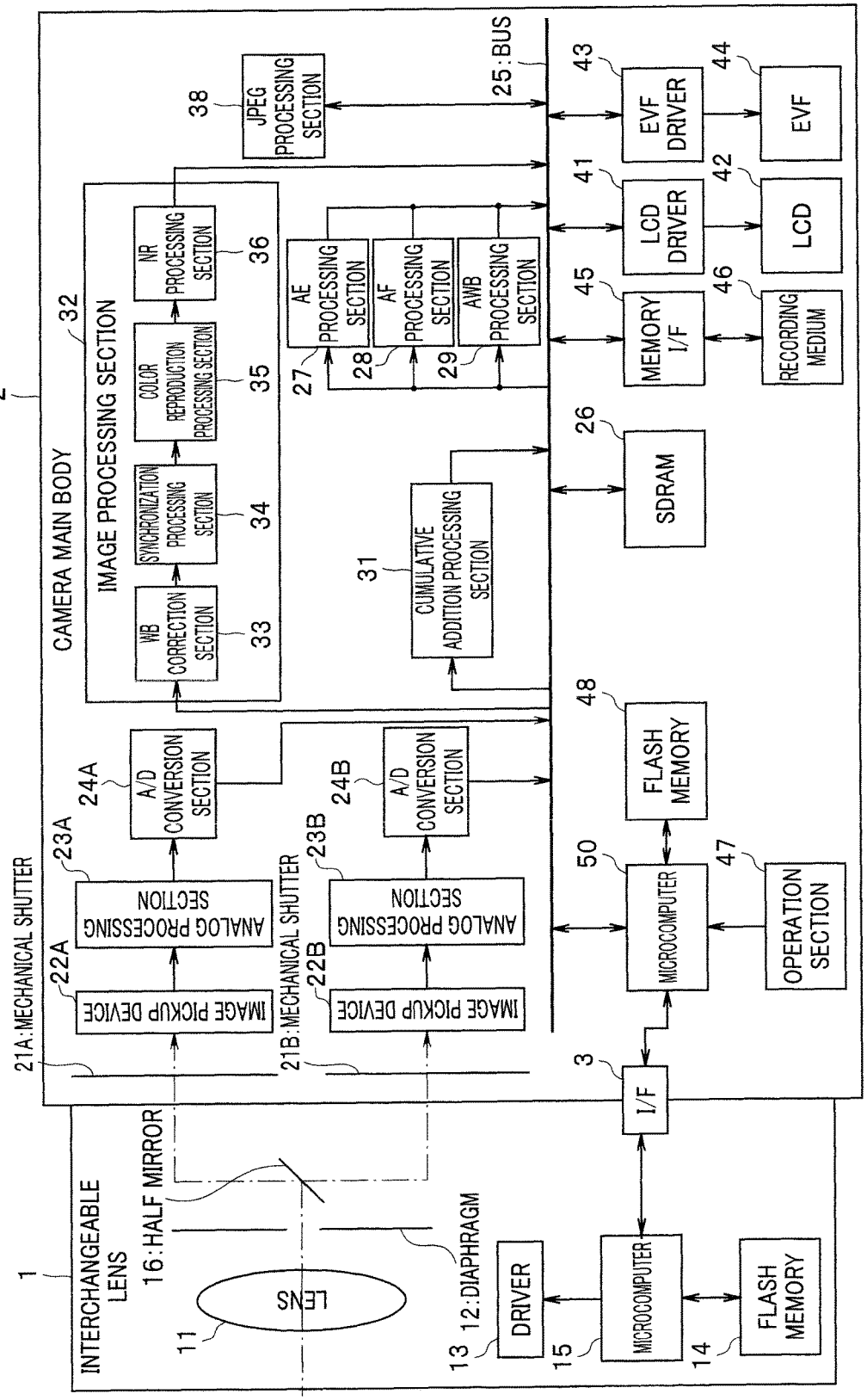
FIG. 20 is a block diagram showing a configuration of an image pickup apparatus according to a modified example of the first embodiment.
Figure 1:
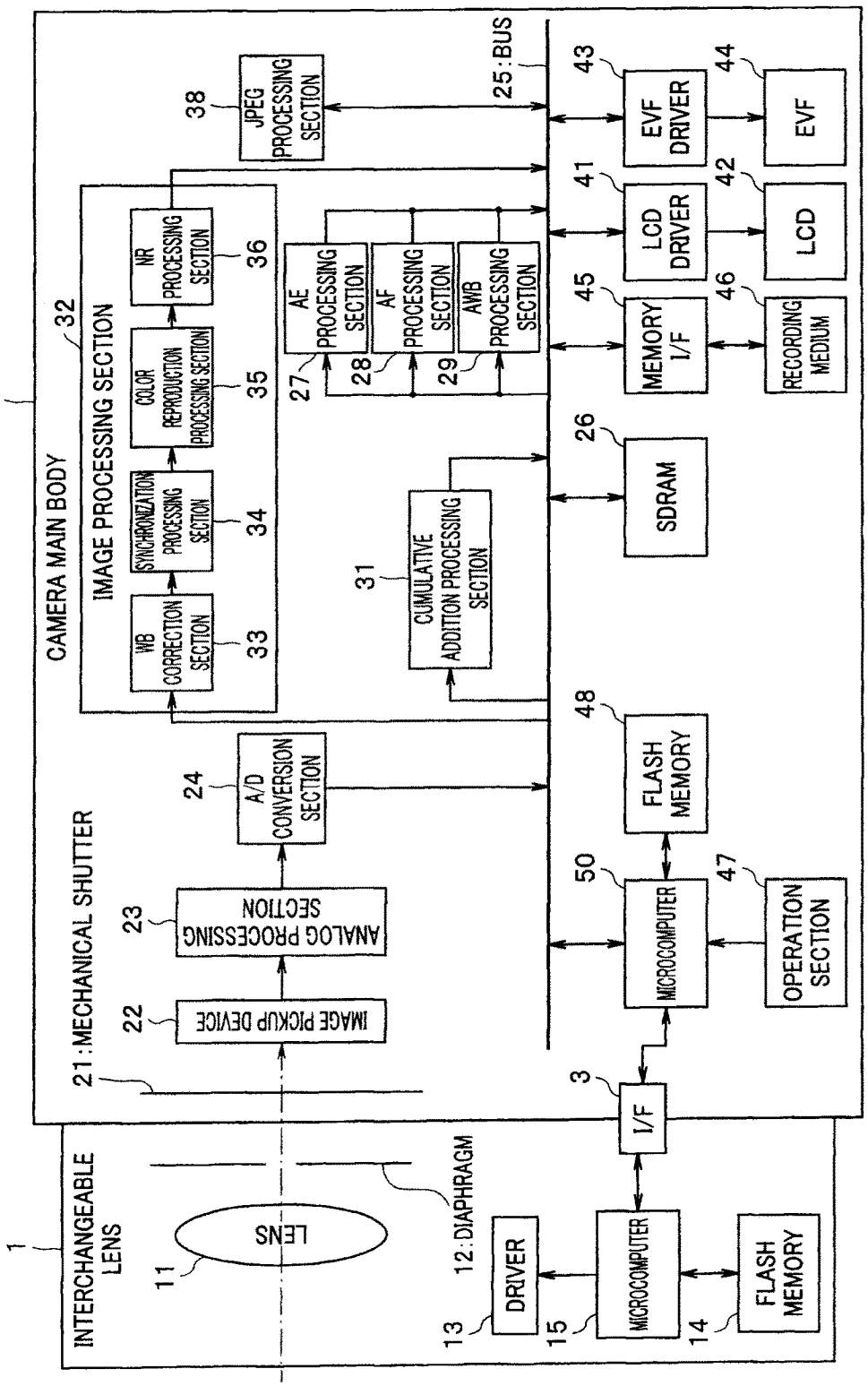
Figure 2:
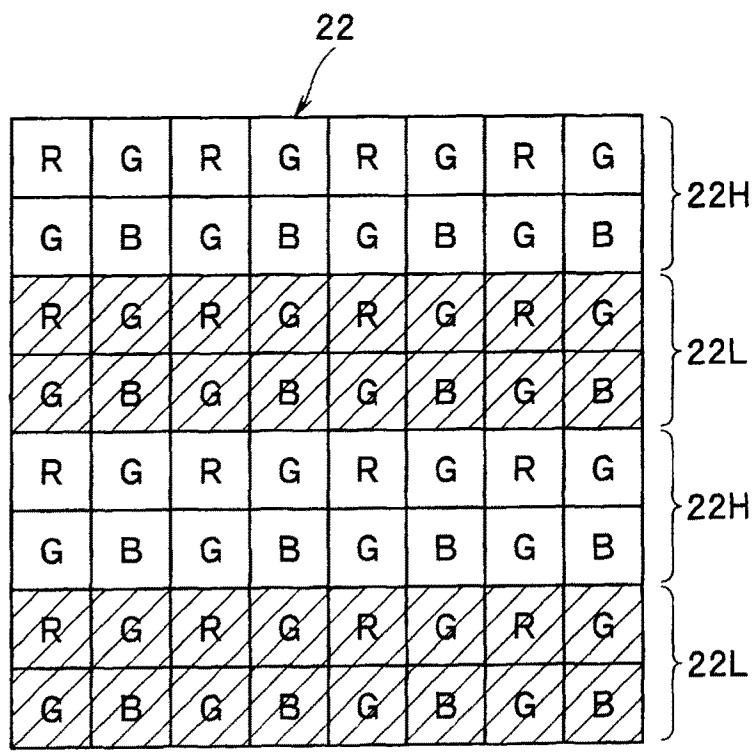
Figure 3:
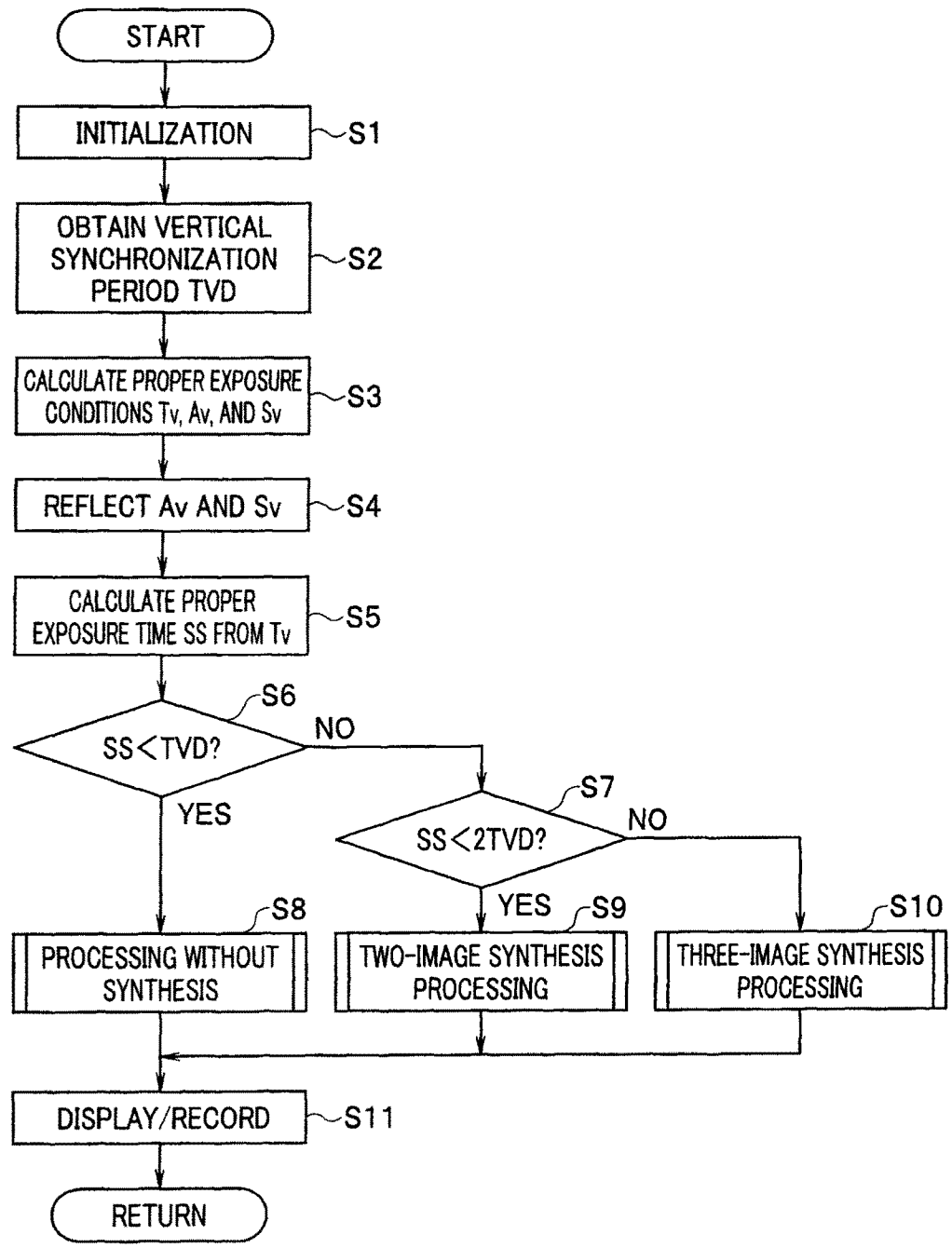
Figure 4:
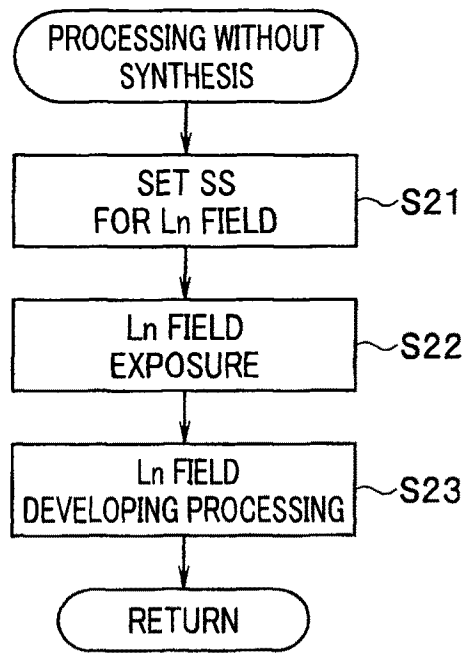
Figure 5:
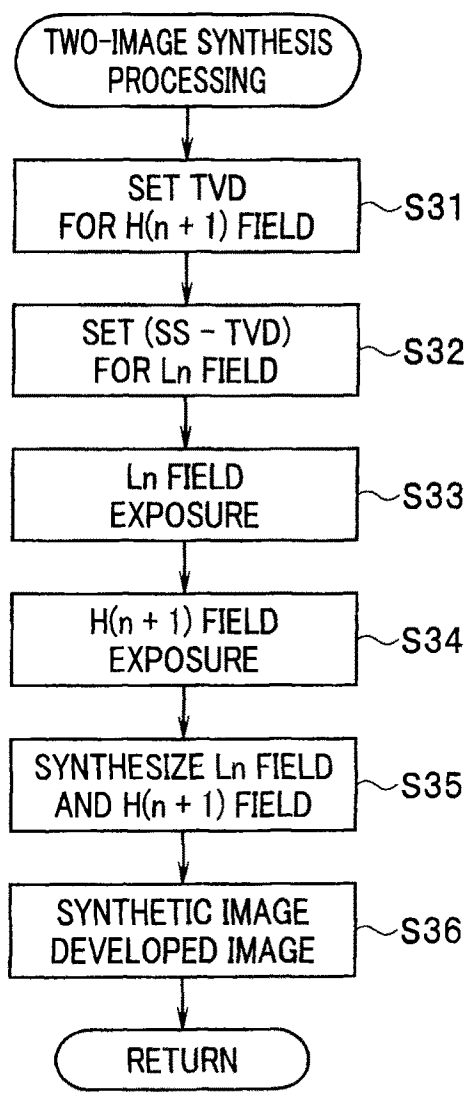
Figure 6:
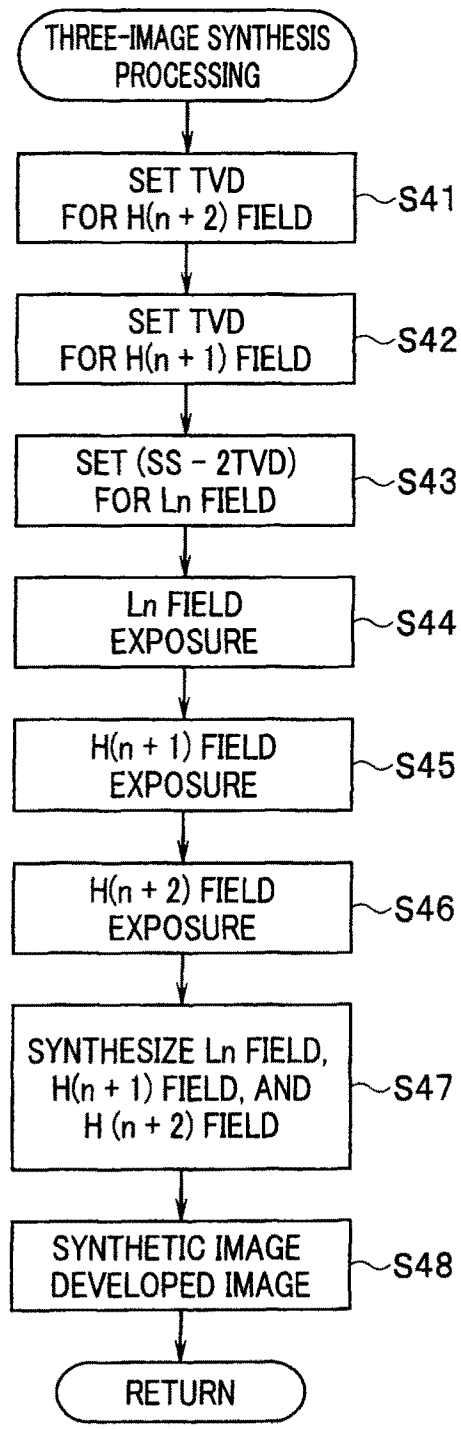
Figure 7:
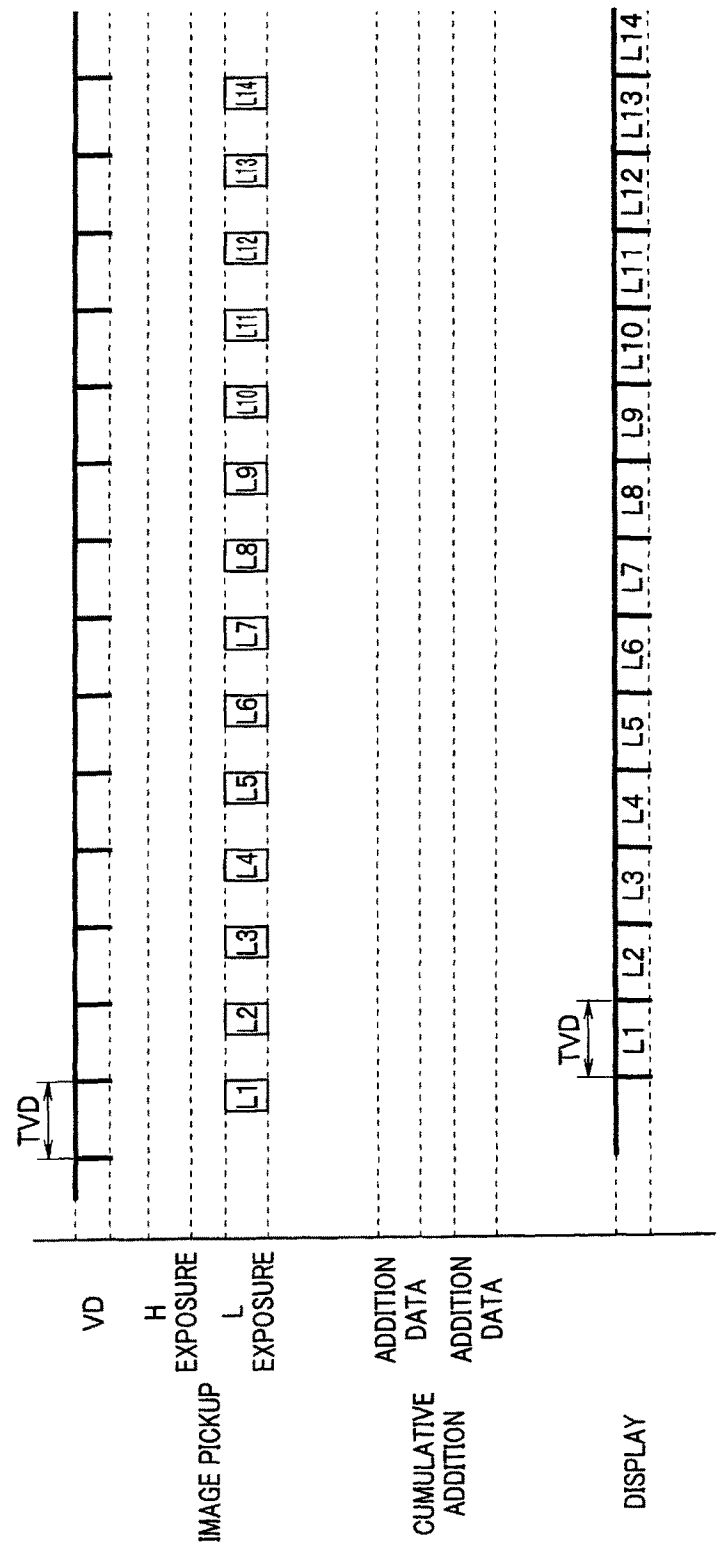

FIG. 20 is a block diagram showing the configuration of the image pickup apparatus in a modified example of the present embodiment. The modified example shown in FIG. 20 is an example of what is called a twin-lens reflex camera that forms two optical images on the two image pickup devices.

The interchangeable lens 1 further includes a half mirror 16 on the optical paths of the lens 11 and the diaphragm 12, and is configured to form two optical images of the object.

A mechanical shutter 21A and an image pickup device 22A are arranged on an optical path of one of the optical images, and an analog image signal read out from the image pickup device 22A is processed by an analog processing section 23A and converted into a digital image signal by an A/D conversion section 24A.

In addition, a mechanical shutter 21B and an image pickup device 22B are arranged on an optical path of the other of the optical images, and an analog image signal read out from the image pickup device 22B is processed by an analog processing section 23B and converted into a digital image signal by an A/D conversion section 24B.

In such a configuration, in the case of the moving image photographing and the live view, exposure time of the image generated by the image pickup device 22A may be made different from the exposure time of the image generated by the image pickup device 22B by differentiating the operations of the electronic shutters of the image pickup device 22A and the image pickup device 22B. In the case of the sequential photographing, the exposure time of the image generated by the image pickup device 22A may be made different from the exposure time of the image generated by the image pickup device 22B by differentiating the open/close times of the mechanical shutter 21A and the mechanical shutter 21B.

Furthermore, the image pickup section, which is configured to output, for every frame period, the long exposure image exposed for the long exposure time and a short exposure image exposed for the short exposure time within the exposure period of the long exposure image when the proper exposure time SS is longer than the frame period, is not limited to the above-described example, and an image pickup device capable of non-destructively reading out an image may be used, for example. When such an image pickup device is used, the short exposure image may be read out non-destructively at the time when the short exposure time has elapsed from the start of the exposure and the long exposure image may be read out at the time when the long exposure time has elapsed from the start of the exposure, for every frame period.

With such a first embodiment, when the proper exposure time SS is longer than the vertical synchronization period TVD as the frame period, the long exposure time equal to or shorter than the frame period and the short exposure time shorter than the long exposure time are set such that the total time of the short exposure time and one or more long exposure times is equal to the proper exposure time SS, the long exposure image exposed for the long exposure time and the short exposure image exposed for the short exposure time within the exposure period of the long exposure image are outputted for every frame period, and the short exposure image of one frame and the long exposure image or the long exposure images of one or more frames are added to generate a synthetic image corresponding to the proper exposure time SS. Therefore, it is enabled to obtain the image corresponding to an arbitrary exposure time longer than the frame period without decreasing the frame rate.

It is possible to obtain a proper exposure image with an accurate exposure amount with the smallest number of frames, by setting the vertical synchronization period TVD, which is the frame period, as the long exposure time and setting the remainder obtained by dividing the proper exposure time SS by the long exposure time as the short exposure time.

Furthermore, it is enabled to obtain the long exposure image and the short exposure image from which the image same as the image exposed continuously for the proper exposure time SS can be synthesized, by setting the quotient by dividing the proper exposure time SS by the long exposure time as the number of frames, and setting the long exposure time for the frames that are continuous by the number of frames.

In addition, it is enabled to select a desired control method of starting and finishing the exposure in synchronization with the vertical synchronization signal, by setting the short exposure time for the frame before the first frame of the frames that are continuous by the number of frames or for the frame after the last frame of the frames that are continuous by the number of frames.

In addition, synthesizing the long exposure images of the frames that are continuous by the number of frames and one short exposure image enables the image same as the image exposed continuously for the proper exposure time SS to be obtained as the synthetic image. Furthermore, the obtained synthetic image does not include a non-exposure period in the middle of frames, which prevents unnatural discontinuity from being generated in an object blur in the case where a moving object exists, for example.

In addition, a storing section that temporarily stores at least one of the short exposure image and the long exposure image is further provided, to thereby eliminate a delay circuit and the like, and enable an image synthesis to be performed at a desired time point.

Furthermore, in the moving image or the live view, when the state is shifted from the state where the proper exposure time SS is shorter than the frame period and synthesizing is not performed by the synthesizing section to the state where two images are synthesized, the long exposure image of one frame is used as an image for recording or displaying, and when the state is shifted from the state where the synthesizing section synthesizes j images (j is an integer equal to or greater than 2) to the state where the synthesizing section synthesizes (j+1) images, a synthetic image is generated by using only the long exposure image and the synthetic image is used as the image for recording or displaying during at least one frame. Therefore, it is enabled to prevent a dropped frame from being generated in the display and prevent the brightness of the image from changing unnaturally when the number of images to be synthesized by the synthesizing section is changed.

Note that the above-described sections may be configured as circuits. Arbitrary circuits may be mounted as a single circuit or as circuits by combining a plurality of circuits, as long as the circuit or circuits are capable of performing the functions same as those in the above-described embodiment. Furthermore, arbitrary circuits are not limited to those configured as dedicated circuits for performing intended functions, and may be configured to perform intended functions by causing a general-use circuit to execute a processing program.

Description has been made above mainly on the image pickup apparatus. The present invention, however, may be an image pickup method for performing control same as the control performed by the image pickup apparatus, a computer program for causing a computer to execute processing same as the processing performed by the image pickup apparatus, a non-transitory computer-readable medium storing the computer program, and the like.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image pickup apparatus comprising:
   an exposure control section that determines a proper exposure time, and sets, when the proper exposure time is longer than a frame period, a long exposure time equal to or shorter than the frame period and a short exposure time shorter than the long exposure time such that a total time of the short exposure time and one or more long exposure times is equal to the proper exposure time;
   an image pickup section that outputs, for every frame period, a long exposure image exposed for the long exposure time and a short exposure image exposed for the short exposure time within an exposure period of the long exposure image, when the proper exposure time is longer than the frame period; and
   a synthesizing section that adds the short exposure image of one frame and the long exposure image or long exposure images of one or more frames, to generate a synthetic image corresponding to the proper exposure time, when the proper exposure time is longer than the frame period.

2. The image pickup apparatus according to claim 1, wherein the exposure control section sets the frame period as the long exposure time, and sets a remainder obtained by dividing the proper exposure time by the long exposure time as the short exposure time.

3. The image pickup apparatus according to claim 2, wherein the exposure control section sets a quotient obtained by dividing the proper exposure time by the long exposure time as a number of frames, and sets the long exposure time for frames that are continuous by the number of frames.

4. The image pickup apparatus according to claim 3, wherein the exposure control section sets the short exposure time for a frame before a first frame of the frames that are continuous by the number of frames or for a frame after a last frame of the frames that are continuous by the number of frames.

5. The image pickup apparatus according to claim 4, wherein the synthesizing section synthesizes the long exposure image of the frames that are continuous by the number of frames and the one short exposure image.

6. The image pickup apparatus according to claim 1, further comprising a storing section that temporarily stores at least one of the short exposure image and the long exposure image.

7. The image pickup apparatus according to claim 1, wherein, in a moving image or a live view, when a state is shifted from a state where the proper exposure time is shorter than the frame period and synthesizing is not performed by the synthesizing section to a state where the synthesizing section synthesizes two images, the long exposure image of one frame is used as an image for recording or displaying, and when the state is shifted from a state where the synthesizing section synthesizes j (j is an integer equal to or larger than 2) images to a state where the synthesizing section synthesizes (j+1) images, only the long exposure images are used to generate a synthetic image and the synthetic image is used as the image for recording or displaying, during at least one frame.

8. A non-transitory computer-readable medium storing a computer program for causing a computer to execute:
   an exposure control step of determining a proper exposure time, and setting, when the proper exposure time is longer than a frame period, a long exposure time equal to or shorter than the frame period and a short exposure time shorter than the long exposure time such that a total time of the short exposure time and one or more long exposure times is equal to the proper exposure time;
   an image pickup step of outputting, for every frame period, a long exposure image exposed for the long exposure time and a short exposure image exposed for the short exposure time within an exposure period of the long exposure image, when the proper exposure time is longer than the frame period; and
   a synthesizing step of adding the short exposure image of one frame and the long exposure image or long exposure images of one or more frames, to generate a synthetic image corresponding to the proper exposure time, when the proper exposure time is longer than the frame period.

9. An image pickup method comprising:
   an exposure control step of determining a proper exposure time, and setting, when the proper exposure time is longer than a frame period, a long exposure time equal to or shorter than the frame period and a short exposure time shorter than the long exposure time such that a total time of the short exposure time and one or more long exposure times is equal to the proper exposure time;
   an image pickup step of outputting, for every frame period, a long exposure image exposed for the long exposure time and a short exposure image exposed for the short exposure time within an exposure period of the long exposure image, when the proper exposure time is longer than the frame period; and
   a synthesizing step of adding the short exposure image of one frame and the long exposure image or long exposure images of one or more frames, to generate a synthetic image corresponding to the proper exposure time, when the proper exposure time is longer than the frame period.

* * * * *

UNITED STATES PATENT AND TRADEMARK OFFICE
CERTIFICATE OF CORRECTION

| | |
|---|---|
| PATENT NO. | : 10,171,748 B2 |
| APPLICATION NO. | : 15/352800 |
| DATED | : January 1, 2019 |
| INVENTOR(S) | : Kino |

It is certified that error appears in the above-identified patent and that said Letters Patent is hereby corrected as shown below:

Please delete Patent No. 10,171,748 B2 in its entirety and insert Patent No. 10,171,748 B2 in its entirety as shown on the attached pages.

Signed and Sealed this
Twenty-third Day of July, 2019

Andrei Iancu
*Director of the United States Patent and Trademark Office*

(12) United States Patent
Kino

(10) Patent No.: US 10,171,748 B2
(45) Date of Patent: Jan. 1, 2019

(54) IMAGE PICKUP APPARATUS, NON-TRANSITORY COMPUTER-READABLE MEDIUM STORING COMPUTER PROGRAM, AND IMAGE PICKUP METHOD

(71) Applicant: Olympus Corporation, Hachioji-shi, Tokyo (JP)

(72) Inventor: Tatsuya Kino, Kodaira (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/352,800

(22) Filed: Nov. 16, 2016

(65) Prior Publication Data

US 2017/0171449 A1   Jun. 15, 2017

(30) Foreign Application Priority Data

Dec. 15, 2015   (JP) .................. 2015-244361

(51) Int. Cl.
   *H04N 5/235*   (2006.01)
   *H04N 5/345*   (2011.01)

(52) U.S. Cl.
   CPC ......... *H04N 5/2355* (2013.01); *H04N 5/2353* (2013.01); *H04N 5/3452* (2013.01)

(58) Field of Classification Search
   None
   See application file for complete search history.

(56) References Cited

U.S. PATENT DOCUMENTS 7,852,401 B2   12/2010   Hamamura et al.
8,488,019 B2 *  7/2013   Toyoda ............ H04N 5/35581
                                                            348/229.1

FOREIGN PATENT DOCUMENTS

JP   2007-281548   10/2007
JP   2015-012490   1/2015

* cited by examiner

*Primary Examiner* — Mark T Monk
(74) *Attorney, Agent, or Firm* — John C. Pokotylo; Pokotylo Patent Services

(57) ABSTRACT

An image pickup apparatus includes a microcomputer that sets, when a proper exposure time is longer than a frame period, one or more long exposure times equal to or shorter than the frame period and a short exposure time such that a total time of the one or more long exposure times and the short exposure time is equal to the proper exposure time, an image pickup device that outputs a long exposure image and a short exposure image for every frame period, and a cumulative addition processing section that adds the short exposure image and the long exposure image or long exposure images of one or more frames to generate a synthetic image corresponding to the proper exposure time.

9 Claims, 20 Drawing Sheets

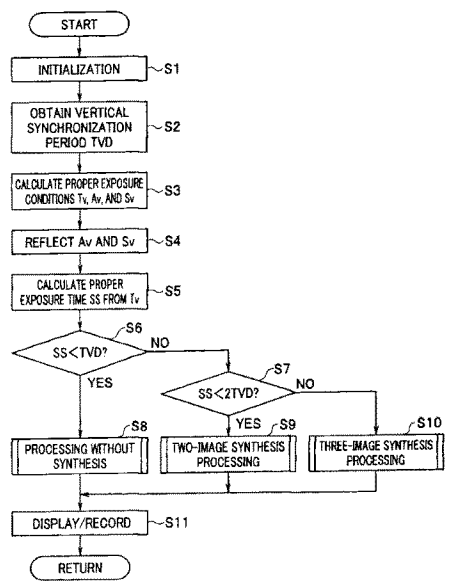

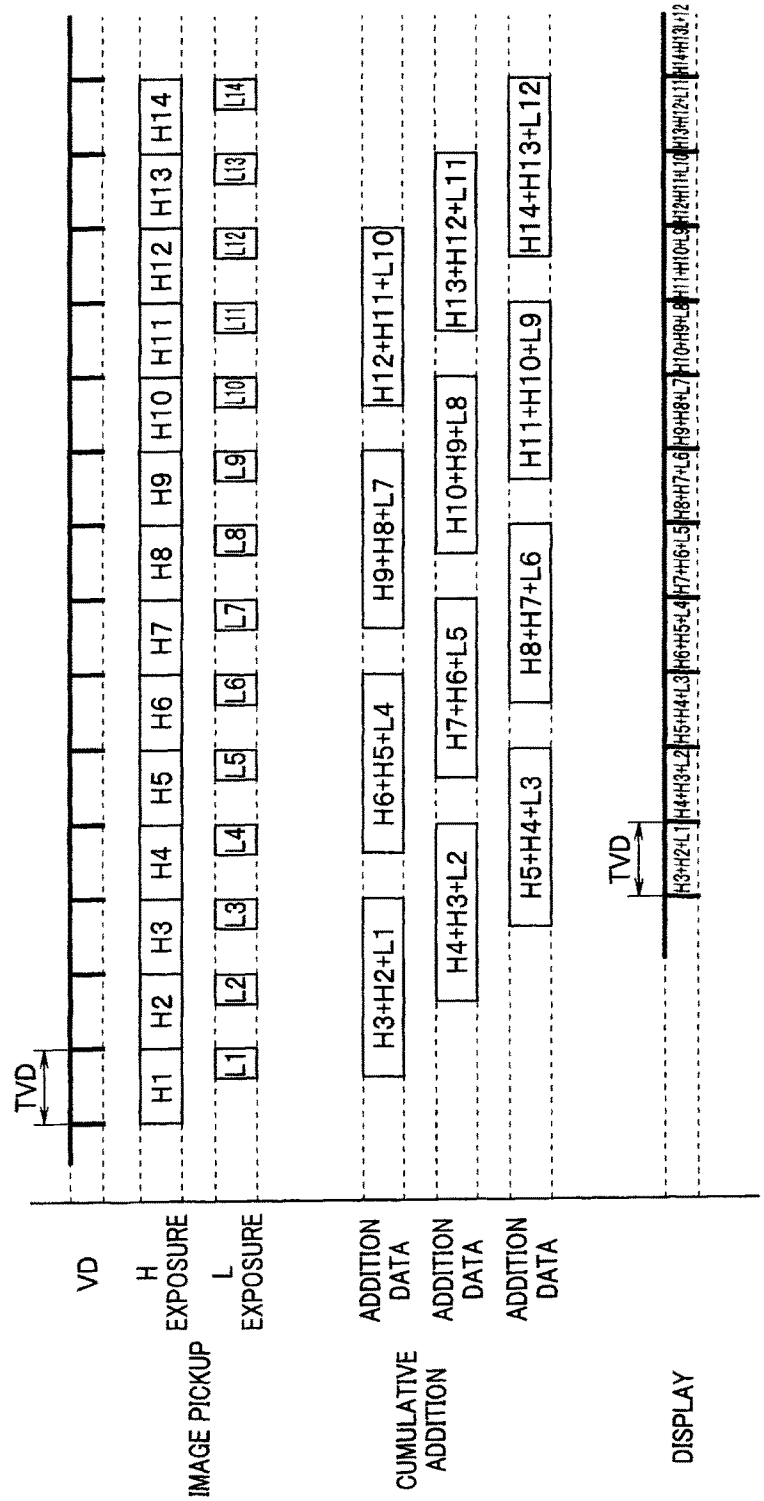

IMAGE PICKUP APPARATUS, NON-TRANSITORY COMPUTER-READABLE MEDIUM STORING COMPUTER PROGRAM, AND IMAGE PICKUP METHOD

CROSS REFERENCE TO RELATED APPLICATION

This application claims benefit of Japanese Application No. 2015-244361 filed in Japan on Dec. 15, 2015, the entire contents of which are incorporated herein by this reference.

BACKGROUND OF THE INVENTION

1. Field of the Invention

The present invention relates to an image pickup apparatus, a non-transitory computer-readable medium storing a computer program, and an image pickup method, for obtaining an image corresponding to a proper exposure time longer than a frame period by synthesizing images.

2. Description of the Related Art

In recent years, image pickup speed of image pickup devices has been increased, and photographing at a high-speed frame rate has become possible while maintaining the number of pixels. The high-speed frame rate provides such advantages that movement of an object in a moving image/live view becomes smooth and the number of sequential photographing frames is increased. However, as the speed of frame rate is increased, the exposure time of one frame becomes shorter. Therefore, in order to obtain exposure time longer than a frame period, the frame rate has to be decreased. For example, when a moving image is photographed at a frame rate of 60 fps, if the proper exposure time becomes longer than 1/60 seconds, the frame rate has to be decreased to 30 fps.

Incidentally, some recent cameras are provided with a function of synthesizing a long time exposure image (hereinafter, shortly referred to as long exposure image, as needed) and a short time exposure image (hereinafter, shortly referred to as short exposure image, as needed), to generate an image having a wide dynamic range (HDR image). Such HDR processing has been performed not only on a still image but also on a moving image or live view image.

In addition to a method of obtaining a long exposure image and a short exposure image alternately for each frame, there is a method of simultaneously obtaining a long exposure image and a short exposure image in one exposure period. In recent years, an image pickup device (also referred to HDR sensor) provided with a function for enabling the latter method has been proposed.

Specifically, the image pickup device called HDR sensor obtains a long exposure image from even-numbered lines and a short exposure image from odd-numbered lines by setting a different exposure time for each line or for each pixel, for example.

In addition, Japanese Patent Application Laid-Open Publication No. 2015-12490, for example, discloses a technique for generating an HDR image without decreasing resolution and frame rate by interchanging the lines for long time exposure and the lines for short time exposure, for each frame.

On the other hand, Japanese Patent Application Laid-Open Publication No. 2007-281548 discloses a technique for generating an image corresponding to a desired exposure time without decreasing the frame rate, by dividing one frame into short time intervals to obtain time-division images and synthesizing an arbitrary number of continuous time-division images, for example.

SUMMARY OF THE INVENTION

An image pickup apparatus according to one aspect of the present invention includes: an exposure control section that determines a proper exposure time, and sets, when the proper exposure time is longer than a frame period, a long exposure time equal to or shorter than the frame period and a short exposure time shorter than the long exposure time such that a total time of the short exposure time and one or more long exposure times is equal to the proper exposure time; an image pickup section that outputs, for every frame period, a long exposure image exposed for the long exposure time and a short exposure image exposed for the short exposure time within an exposure period of the long exposure image, when the proper exposure time is longer than the frame period; and a synthesizing section that adds the short exposure image of one frame and the long exposure image or long exposure images of one or more frames, to generate a synthetic image corresponding to the proper exposure time, when the proper exposure time is longer than the frame period.

A non-transitory computer-readable medium storing a computer program according to one aspect of the present invention stores a computer program for causing a computer to execute: an exposure control step of determining a proper exposure time, and setting, when the proper exposure time is longer than a frame period, a long exposure time equal to or shorter than the frame period and a short exposure time shorter than the long exposure time such that a total time of the short exposure time and one or more long exposure times is equal to the proper exposure time; an image pickup step of outputting, for every frame period, a long exposure image exposed for the long exposure time and a short exposure image exposed for the short exposure time within an exposure period of the long exposure image, when the proper exposure time is longer than the frame period; and a synthesizing step of adding the short exposure image of one frame and the long exposure image or long exposure images of one or more frames, to generate a synthetic image corresponding to the proper exposure time, when the proper exposure time is longer than the frame period.

An image pickup method according to one aspect of the present invention includes: an exposure control step of determining a proper exposure time, and setting, when the proper exposure time is longer than a frame period, a long exposure time equal to or shorter than the frame period and a short exposure time shorter than the long exposure time such that a total time of the short exposure time and one or more long exposure times is equal to the proper exposure time; an image pickup step of outputting, for every frame period, a long exposure image exposed for the long exposure time and a short exposure image exposed for the short exposure time within an exposure period of the long exposure image, when the proper exposure time is longer than the frame period; and a synthesizing step of adding the short exposure image of one frame and the long exposure image or long exposure images of one or more frames, to generate a synthetic image corresponding to the proper exposure time, when the proper exposure time is longer than the frame period.

BRIEF DESCRIPTION OF THE DRAWINGS

FIG. 1 is a block diagram showing a configuration of an image pickup apparatus according to a first embodiment of the present invention.

FIG. 2 illustrates a configuration of an image pickup device as an HDR sensor according to the first embodiment.

FIG. 3 is a flowchart showing one image photographing processing in the image pickup apparatus according to the first embodiment.

FIG. 4 is a flowchart showing processing without synthesis in step S8 in FIG. 3 according to the first embodiment.

FIG. 5 is a flowchart showing two-image synthesis processing in step S9 in FIG. 3 according to the first embodiment.

FIG. 6 is a flowchart showing three-image synthesis processing in step S10 in FIG. 3 according to the first embodiment.

FIG. 7 is a timing chart for describing the processing without synthesis according to the first embodiment.

FIG. 8 is a timing chart for describing the two-image synthesis processing according to the first embodiment.

FIG. 9 is a timing chart for describing the three-image synthesis processing according to the first embodiment.

FIG. 10 is a flowchart showing moving image photographing processing in the image pickup apparatus according to the first embodiment.

FIG. 11 is a flowchart showing processing without synthesis in step S8 in FIG. 10 according to the first embodiment.

FIG. 12 is a flowchart showing two-image synthesis processing in step S9 in FIG. 10 according to the first embodiment.

FIG. 13 is a flowchart showing pre-two-image synthesis processing in step S55 in FIG. 12 according to the first embodiment.

FIG. 14 is a flowchart showing normal two-image synthesis processing in step S56 in FIG. 12 according to the first embodiment.

FIG. 15 is a flowchart showing three-image synthesis processing in step S10 in FIG. 10 according to the first embodiment.

FIG. 16 is a flowchart showing first pre-three-image synthesis processing in step S76 in FIG. 15 according to the first embodiment.

FIG. 17 is a flowchart showing second pre-three-image synthesis processing in step S77 in FIG. 15 according to the first embodiment.

FIG. 18 is a flowchart showing normal three-image synthesis processing in step S78 in FIG. 15 according to the first embodiment.

FIG. 19 is a timing chart for describing the moving image photographing processing according to the first embodiment.

FIG. 20 is a block diagram showing a configuration of an image pickup apparatus according to a modified example of the first embodiment.

DETAILED DESCRIPTION OF THE PREFERRED EMBODIMENT(S)

Hereinafter, an embodiment of the present invention will be described with reference to drawings.

First Embodiment

FIGS. 1 to 20 show the first embodiment of the present invention, and FIG. 1 is a block diagram showing a configuration of an image pickup apparatus. Note that description will be made on the image pickup apparatus by taking a digital camera as an example in the present embodiment. However, the image pickup apparatus is not limited to the example, and may be an arbitrary apparatus as long as the apparatus is provided with an image pickup function.

The image pickup apparatus is configured by connecting an interchangeable lens 1 and a camera main body 2 so as to communicate with each other, through an interface (I/F) 3, and includes a function of synthesizing data of a plurality of images obtained by sequential photographing, to generate data of one synthetic image.

The interchangeable lens 1 is detachably mounted to the camera main body 2 through a lens mount, for example, and the interface 3 is configured by electric contacts formed at the lens mount (an electric contact provided on the interchangeable lens 1 and an electric contact provided on the camera main body 2) and the like.

The interchangeable lens 1 includes a lens 11, a diaphragm 12, a driver 13, a flash memory 14, and a microcomputer 15.

The lens 11 is a photographing optical system that forms an optical image of an object on the image pickup device 22, to be described later, of the camera main body 2.

The diaphragm 12 is an optical diaphragm that controls a passing range of a luminous flux proceeding from the lens 11 to image pickup device 22.

The driver 13 drives the lens 11 to adjust a focus position based on a command from the microcomputer 15. In addition, the driver 13 drives the diaphragm 12 to cause the aperture diameter to be changed based on a command from the microcomputer 15. Driving of the diaphragm 12 causes the brightness of the optical image of the object to be changed and also causes the magnitude of blur to be changed.

The flash memory 14 is a storage medium that stores a control program to be executed by the microcomputer 15 and various kinds of information on the interchangeable lens 1.

The microcomputer 15 is what is called a lens-side computer, and connected with the driver 13, the flash memory 14, and the interface 3. The microcomputer 15 communicates with a microcomputer 50 which is a main-body-side computer, to be described later, through the interface 3, receives a command from the microcomputer 50 to read/write the information stored in the flash memory 14, and controls the driver 13. Furthermore, the microcomputer 15 transmits the various kinds of information on the interchangeable lens 1 to the microcomputer 50.

The interface 3 connects the microcomputer 15 of the interchangeable lens 1 and the microcomputer 50 of the camera main body 2 so as to bi-directionally communicate with each other.

Next, the camera main body 2 includes a mechanical shutter 21, the image pickup device 22, an analog processing section 23, an analog/digital conversion section (A/D conversion section) 24, a bus 25, an SDRAM 26, an AE processing section 27, an AF processing section 28, an AWB processing section 29, a cumulative addition processing section 31, an image processing section 32, a JPEG processing section 38, an LCD driver 41, an LCD 42, an EVF (electronic view finder) driver 43, an EVF 44, a memory interface (memory I/F) 45, a recording medium 46, an operation section 47, a flash memory 48, and a microcomputer 50.

The mechanical shutter 21 is an optical shutter configured to control the time for the luminous flux from the lens 11 to reach the image pickup device 22, and cause a shutter curtain to run, for example. The mechanical shutter 21 is driven based on the command from the microcomputer 50 at the time of still image photographing, to control the reaching time of the luminous flux to the image pickup device 22, that is, the exposure time of an object by the image pickup device 22. On the other hand, at the time of moving image photographing or live view, the mechanical shutter 21 is maintained in the opened state, and an image of each frame is obtained with what is called an electronic shutter of the image pickup device 22.

The image pickup device 22 is an image pickup section including an image pickup surface on which a plurality of pixels are two-dimensionally aligned at a predetermined pixel pitch, and configured to photoelectrically convert the optical image of the object which is formed by the lens 11 and the diaphragm 12, to generate an analog image signal, based on the control by the microcomputer 50 as an image pickup control section.

The image pickup device 22 according to the present embodiment is configured as a single-plate image pickup device having a color filter of a primary color Bayer array, for example. However, it is needless to say that the image pickup device 22 is not limited to the single-plate image pickup device, and may be a laminated image pickup device configured to separate color components in the substrate thickness direction, for example.

Furthermore, the image pickup device 22 according to the present embodiment is configured as what is called an HDR sensor that obtains a plurality of images with different exposure times in one time of exposure. When the proper exposure time SS (see FIG. 3, etc.) is longer than a frame period (vertical synchronization period TVD to be described later), the image pickup device 22 outputs, for every frame period, the long exposure image exposed for a long exposure time and a short exposure image exposed for a short exposure time within the exposure period of the long exposure image.

FIG. 2 illustrates the configuration of the image pickup device 22 as the HDR sensor.

The primary color Bayer array, as is publicly known, includes 2×2 pixels as a basic array, and G (green) filters are arranged at diagonal positions of the basic array, and an R (red) filter and a B (blue) filter are arranged at remaining diagonal positions of the basic array.

The image pickup device 22 is configured such that an H-field 22H constituted of a pixel group for picking up a long time exposure image (hereinafter, shortly referred to as long exposure image, as needed) and an L-field 22L constituted of a pixel group for picking up a short time exposure image (hereinafter, shortly referred to as short exposure image, as needed) are arranged alternately for every two lines in which the basic arrays are aligned in the horizontal direction.

In the track of the interlace system in which a frame is divided into even-numbered fields and odd-numbered fields, the term "field" is used in the present embodiment. However, unlike the interlace system, the image pickup device 22, which is configured as the HDR sensor, according to the present embodiment, reads out the image of H-field 22H and the image of the L-field 22L in the same one frame (in one vertical synchronization period TVD).

At least one of an exposure starting timing and an exposure finishing timing (read-out timing) is made different in the H-field 22H and the L-field 22L, to thereby obtain a long exposure image exposed for a long exposure time from the H-field 22H, and obtain a short exposure image exposed for a short exposure time shorter than the long exposure time from the L-field 22L.

For example, when the long exposure image and the short exposure image are read out in synchronization with a vertical synchronization signal VD (see FIGS. 7 to 9, 19, etc.), the exposure of the long exposure image has only to be started at the time going back by the exposure time of the long exposure image from the read-out clock time indicated by the vertical synchronization signal VD, and the exposure of the short exposure image has only to be started at the time going back by the exposure time of the short exposure image from the read-out clock time.

Note that FIG. 2 shows an exemplary configuration in which a frame is divided into different fields for every two lines. However, the frame may be divided into different fields for every two columns, or for every unit of the 2×2 basic array. In addition, when the Bayer array is not applied, the frame may be divided into different fields for every line, every column, every pixel, or the like. Therefore, the method of dividing the frame into the fields that are different in the exposure time is not limited.

The analog processing section 23 performs waveform shaping after reducing reset noise and the like, to increase the gain to obtain target brightness, with respect to the analog image signal read out from the image pickup device 22.

The A/D conversion section 24 converts the analog image signal outputted from the analog processing section 23 into a digital image signal (referred to as image data, as needed).

The bus 25 is a transfer path for transferring various kinds of data and a control signal generated at a certain part in the image pickup apparatus to another part in the image pickup apparatus. The bus 25 according to the present embodiment is connected to the A/D conversion section 24, the SDRAM 26, the AE processing section 27, the AF processing section 28, the AWB processing section 29, the cumulative addition processing section 31, the image processing section 32, the JPEG processing section 38, the LCD driver 41, the EVF driver 43, the memory I/F 45, and the microcomputer 50.

The image data (hereinafter, referred to as RAW image data, as needed) outputted from the A/D conversion section 24 is transferred through the bus 25, to be temporarily stored in the SDRAM 26.

The SDRAM 26 is a storing section that temporarily stores various kinds of image data such as the above-described RAW image data, or image data processed in the cumulative addition processing section 31, image processing section 32, the JPEG processing section 38, and the like.

The SDRAM 26 also serves as a storing section that temporarily stores at least one of the short exposure image and the long exposure image. The image which is required to be stored in the SDRAM 26 is an image of a temporally preceding frame. Therefore, the image which is required to be stored is not the same in the case where the short exposure image is obtained first and thereafter one or more long exposure images are obtained continuously and in the case where the one or more long exposure images are obtained continuously first and thereafter the short exposure image is obtained. In view of the above, the image to be temporarily stored in the SDRAM 26 is referred to as "at least one of the short exposure image and the long exposure image".

The AE processing section 27 extracts luminance components from the RAW image data, and calculates proper exposure conditions (Tv, Av, Sv, etc.) based on the extracted luminance components. The calculated proper exposure conditions are used in automatic exposure (AE) control. Specifically, control of the diaphragm 12 based on the Av value, control of the mechanical shutter 21 based on the Tv value, or exposure timing control (what is called, control of the electronic shutter) of the image pickup device 22 based on the Tv value, gain control of the analog processing section 23 (or digital gain control of the image processing section 32) based on the Sv value, and the like are performed.

The AF processing section 28 extracts a signal of high-frequency components from the RAW image data to obtain a focusing evaluation value by AF (autofocus) integration processing. The obtained focusing evaluation value is used for the AF driving of the lens 11. Note that it is needless to say that AF is not limited to such a contrast AF, and phase difference AF may be performed by using a dedicated AF sensor (or pixels for AF on the image pickup device 22), for example.

The AWB processing section 29 performs auto white balance processing for adjusting white balance by detecting the color balance of the object, calculating a gain for each of the RGB components, and multiplies the calculated gains, based on the RAW image data.

The cumulative addition processing section 31 is a synthesizing section that adds the short exposure image of one frame and the long exposure image or the long exposure images of one or more frames, to generate a synthetic image corresponding to a proper exposure time SS, when the proper exposure time SS (see FIG. 3, etc.) is longer than the frame period (vertical synchronization period TVD to be described later).

As described later, the microcomputer 50 that functions as an exposure control section sets the frame period as the long exposure time, sets the quotient obtained by dividing the proper exposure time SS by the long exposure time as the number of frames, sets the long exposure time for the frames that are continuous by the number of frames, and sets the remainder obtained by dividing the proper exposure time SS by the long exposure time as the short exposure time. The cumulative addition processing section 31 synthesizes the long exposure images of the frames that are continuous by the number of frames calculated as the quotient and the one short exposure image with the exposure time as the remainder by cumulatively adding the pixel values for each pixel position. As a result, the synthetic image becomes an image corresponding to the image exposed continuously for the proper exposure time SS.

The image processing section 32 performs various kinds of image processing on the RAW image data or synthetic image data generated from the RAW image data by the cumulative addition processing section 31, and includes a WB correction section 33, a synchronization processing section 34, a color reproduction processing section 35, and an NR processing section 36.

The WB correction section 33 performs white balance processing on the image data such that a white object is observed as white in color.

The synchronization processing section 34 performs demosaicing processing for converting the image data of the RGB Bayer array in which only one color component of the RGB components exists for each pixel into the image data in which all pixels include all the three color components of RGB, by obtaining color components which do not exist in a target pixel by complement from the peripheral pixels.

The color reproduction processing section 35 performs processing for reproducing the color of the object with higher fidelity by performing color matrix calculation on the image data.

The NR processing section 36 performs noise reduction processing by performing coring processing in accordance with the spatial frequency on the image data.

The image data subjected to the various kinds of processing by the image processing section 32 is stored again in the SDRAM 26.

When recording the image data, the JPEG processing section 38 reads out the image data from the SDRAM 26, compresses the image data following the JPEG compression method to generate JPEG image data, and causes the SDRAM 26 to store the generated JPEG image data. After a header and the like are added to the JPEG image data stored in the SDRAM 26 by the microcomputer 50, the JPEG image data is recorded as a JPEG file in a recording medium 46 through the memory I/F 45.

In addition, the JPEG processing section 38 also expands the compressed image data. That is, when the recorded image is to be reproduced, the JPEG file is read out from the recording medium 46 through the memory I/F 45, for example, based on the control by the microcomputer 50, and temporarily stored in the SDRAM 26. The JPEG processing section 38 expands the JPEG image data in the JPEG file stored in the SDRAM 26, following the JPEG expansion method, and causes the SDRAM 26 to store the expanded image.

Furthermore, the JPEG processing section 38 compresses and expands also the moving image data by using an appropriate processing method such as Motion JPEG or MPEG. Note that the JPEG processing section 38 is configured to serve also as a compression/expansion section for compressing and expanding the moving image data in the present embodiment. However, a compression/expansion section dedicated for moving image data may be provided in addition to the JPEG processing section 38.

The LCD driver 41 reads out the image data stored in the SDRAM 26, converts the read image data into a video signal, and controls and drives the LCD 42 to cause the LCD 42 to display an image based on the video signal.

With the above-described drive control by the LCD driver 41, the LCD 42 displays the image and also various kinds of information related to the image pickup apparatus.

The EVF driver 43 reads out the image data stored in the SDRAM 26, converts the read image data into a video signal, and drives and controls the EVF 44 to cause the EVF 44 to display an image based on the video signal.

With the above-described drive control by the EVF driver 43, the EVF 44 displays the image and also various kinds of information related to the image pickup apparatus.

The image display performed by the LCD 42 or the EVF 44 includes a rec view display for displaying still image data immediately after the photographing for only a short time, a reproducing display of the JPEG file recorded in the recording medium 46, a reproducing display of a moving image file recorded in the recording medium 46, a live-view display, and the like.

The memory I/F 45 is a recording control section that performs control for recording the image data in the recording medium 46, and is configured to also read out the image data from the recording medium 46.

The recording medium 46 is a recording section that stores the image data in a non-volatile manner and is configured by a memory card configured to be attachable to and detachable from the camera main body 2, for example. The recording medium 46, however, is not limited to the memory card, and may be a disk-shaped recording medium, or another arbitrary recording medium. Therefore, the recording medium 46 does not necessarily have a configuration unique to the image pickup apparatus.

The operation section 47 is a section through which various kinds of operation inputs are performed with respect to the image pickup apparatus and includes a power source button for turning on and off the power source of the image pickup apparatus, a release button for instructing a start of image photographing, which is constituted of a two-stage operation button including, for example, a first release switch and a second release switch, a reproduction button for reproducing the recorded image, a menu button for performing setting and the like of the image pickup apparatus, operation buttons such as a cross key used for item selecting operation and an OK button used for determination operation of the selected item, and the like. The items that can be set by using the menu button, the cross key, the OK button and the like include a photographing mode (single photographing mode, sequential photographing mode, moving image photographing mode, etc.), recording mode, reproducing mode and the like. When an operation is performed with respect to the operation section 47, a signal corresponding to the operation content is outputted to the microcomputer 50.

The flash memory 48 is a storage medium that stores, in a non-volatile manner, a processing program to be executed by the microcomputer 50 (including an image pickup program for executing the image pickup method by the image pickup apparatus), various kinds of information related to the image pickup apparatus. As several examples of the information stored in the flash memory 48, for example, a model name and production number for identifying the image pickup apparatus, parameters to be used for the image processing, setting values set by the user, the vertical synchronization period TVD, etc., can be listed. The information stored in the flash memory 48 is read by the microcomputer 50.

The microcomputer 50 is a control section that controls each of the sections in the camera main body 2, sends a command to the microcomputer 15 through the interface 3 to control the interchangeable lens 1, and integrally controls the image pickup apparatus. When the user performs operation input through the operation section 47, the microcomputer 50 reads the parameters necessary for the processing from the flash memory 48 according to the processing program stored in the flash memory 48, and executes various kinds of sequences corresponding to the operation contents.

Furthermore, the microcomputer 50 functions as an exposure control section that determines the proper exposure time SS based on the Tv value calculated by the AE processing section 27, and when the proper exposure time SS is longer than the frame period (the vertical synchronization period TVD to be described later), sets the long exposure time equal to or shorter than the frame period and a short exposure time shorter than the long exposure time such that the total time of the short exposure time and one or more long exposure times is equal to the proper exposure time SS.

Specifically, the microcomputer 50 sets the vertical synchronization period TVD, which is the frame period, as the long exposure time, and sets the remainder obtained by dividing the proper exposure time SS by the long exposure time as the short exposure time. The microcomputer 50 then sets the quotient obtained by dividing the proper exposure time SS by the long exposure time as the number of frames, and sets the long exposure time for the frames that are continuous by the number of frames. Furthermore, the microcomputer 50 sets the short exposure time for the frame before the first frame of the frames that are continuous by the number of frames and for the frame after the last frame of the frames that are continuous by the number of frames.

Note that the long exposure time can be set to the time shorter than the vertical synchronization period TVD which is the frame period. However, in view of the fact that there is a case where the image obtained by synchronization does not become an image exposed continuously for the proper exposure time SS but becomes an image in which a non-exposure period is generated for every frame period, and the number of frames for making the total exposure time equal to the proper exposure time SS is increased, it is preferable that the long exposure time is equal to the vertical synchronization period TVD which is the frame period.

In addition, the microcomputer 50 performs control of the diaphragm 12 based on the Av value calculated by the AE processing section 27 through the microcomputer 15 and the driver 13, and also performs gain control of the analog processing section 23 (or digital gain control of the image processing section 32) based on the Sv value calculated by the AE processing section 27.

Furthermore, the microcomputer 50 performs control of the mechanical shutter 21 based on the Tv value calculated by the AE processing section 27 at the time of still image photographing.

Next, FIG. 3 is a flowchart showing one image photographing processing in the image pickup apparatus. The processing (and processing shown in each of the subsequent flowcharts) is performed based on the control by the microcomputer 50 as the control section.

Note that the one image photographing processing described below is not the processing in the single photographing mode for photographing one still image by opening and closing the mechanical shutter 21, but the processing for obtaining one image based on a certain cycle of the vertical synchronization signal VD (see FIGS. 7 to 9, and 19, etc.), with the mechanical shutter 21 opened (however, FIGS. 7 to 9 show the example in which one image photographing is repeatedly performed for every vertical synchronization period TVD).

When this processing is performed while processing in the main routine, not shown, is being performed after the power source of the image pickup apparatus is turned on with the power source button, initial setting is performed first (step S1). In the initial setting, if the mechanical shutter 21 is closed, processing for opening the mechanical shutter 21 is performed, for example.

Next, the microcomputer 50 obtains the predetermined cycle of the vertical synchronization signal VD, that is, the vertical synchronization period TVD that is the frame period from the flash memory 48, for example (step S2).

Then, based on the image data obtained in the live view or the like, the AE processing section 27 calculates the proper exposure conditions (Tv, Av, Sv, etc.) (step S3).

The microcomputer 50 controls the aperture diameter of the diaphragm 12 such that the calculated Av value is reflected, and controls the gain of the analog processing section 23 (or digital gain of the image processing section 32) such that the calculated Sv value is reflected (step S4).

Furthermore, the microcomputer 50 calculates the proper exposure time SS which is a shutter speed corresponding to the calculated Tv value (step S5).

Subsequently, the microcomputer 50 determines whether or not SS<TVD (step S6).

When determining that SS≥TVD, the microcomputer 50 further determines whether or not SS<2TVD (step S7).

When determination has been made that SS<TVD in the step S6, processing without synthesis, which will be described later with reference to FIG. 4, is performed (step S8).

When determination has been made that SS<2TVD in step S7, two-image synthesis processing, which will be described later with reference to FIG. 5, is performed (step S9).

Furthermore, when determination has been made that SS≥2TVD in step S7, three-image synthesis processing, which will be described later with reference to FIG. 6, is performed (step S10).

Note that, in the case where 3TVD≤SS<4TVD, four-image synthesis processing may be performed, and in the case where 4TVD≤SS<5TVD, five-image synthesis processing may be performed similarly. However, in order to avoid complicated description, description on the case where 3TVD≤SS is omitted in the present embodiment assuming that SS<3TVD. Therefore, description will be made below supposing that SS<3TVD.

When any one of processings in steps S8 to S10 has been performed, the obtained image is processed by the image processing section 32, and the processed image is displayed on the LCD 42 or the EVF 44, or recorded in the recording medium 46 (step S11).

After that, the processing procedure returns from the above-described processing to the processing in the main routine, not shown.

Next, FIG. 4 is a flowchart showing the processing without synthesis in the step S8 in FIG. 3, and FIG. 7 is a timing chart for describing the processing without synthesis.

Note that "n" is used as an integer indicating the time-series frame number in the flowchart in FIG. 4 or the flowcharts in the subsequent drawings. In particular, when "n" is used as the number of the frame which is currently processed, the one frame before the frame currently being processed is indicated as (n−1) and one frame after the frame currently being processed is indicated as (n+1).

In addition, the long exposure image read out from the H-field 22H in the n frame is referred to as an image of the Hn field, and the short exposure image read out from the L-field 22L in the n frame is referred to as an image of the Ln field. Furthermore, in the timing chart in FIG. 7 or the timing charts in the subsequent drawings, the exposure timing related to the image pickup of the H-field is recited as H exposure, and the exposure timing related to the image pickup of the L-field is recited as L exposure.

The processing shown in FIG. 4 is performed when determination has been made that SS<TVD in the step S6 in FIG. 3. In this case, the quotient obtained by dividing SS by TVD is 0, and the remainder is SS.

Therefore, the exposure time is not set for the Hn field, and SS is set as the exposure time only for the Ln field (step S21).

Then, exposure of the Ln field is performed (step S22).

The image of the exposed Ln field is read out in synchronization with the vertical synchronization signal VD, and subjected to developing processing by the image processing section 32 (step S23). Therefore, the cumulative addition processing is not performed by the cumulative addition processing section 31.

After that, the processing procedure returns from this processing to the processing shown in FIG. 3.

As a result of such processing, the image is displayed at the cycle same as that of the vertical synchronization period TVD, as shown in FIG. 7.

Next, FIG. 5 is a flowchart showing the two-image synthesis processing in the step S9 in FIG. 3, and FIG. 8 is a timing chart for describing the two-image synthesis processing.

The processing shown in FIG. 5 is performed in the case where determination has been made that SS≥TVD in the step S6 in FIG. 3 and determination has been further made that SS<2TVD in the step S7. In this case, the quotient obtained by dividing SS by TVD is 1, and the remainder is (SS−TVD).

Therefore, the vertical synchronization period TVD is set as the exposure time for the H(n+1) field (step S31), and the exposure time (SS−TVD) is set for the Ln field (step S32).

Along the time series, exposure of the Ln field is performed first (step S33), and then exposure of the H(n+1) field is performed (step S34).

The images of the exposed Ln field and H(n+1) field are read out in synchronization with the vertical synchronization signal VD in the similar manner as described above.

After that, the cumulative addition processing of the image of the Ln field and the image of the H(n+1) field is performed by the cumulative addition processing section 31, and a synthetic image is generated (step S35).

Then, the developing processing is performed on the synthetic image by the image processing section 32 (step S36), and the processing procedure returns from this processing to the processing shown in FIG. 3.

As a result of such processing, the image corresponding to the proper exposure time SS longer than the vertical synchronization period TVD is displayed at the cycle same as that of the vertical synchronization period TVD, as shown in FIG. 8.

Next, FIG. 6 is a flowchart showing the three-image synthesis processing in the step S10 in FIG. 3, and FIG. 9 is a timing chart for describing the three-image synthesis processing.

The processing shown in FIG. 6 is performed when determination has been made that SS≥2TVD in the step S7 in FIG. 3 (it is assumed that SS<3TVD, as described above). In this case, the quotient obtained by dividing SS by TVD is 2, and the remainder is (SS−2TVD).

Therefore, the vertical synchronization period TVD is set as the exposure time for the H(n+2) field (step S41), the vertical synchronization period TVD is set as the exposure time for the H(n+1) field (step S42), and the exposure time (SS−2TVD) is set for the Ln field (step S43).

Then, along the time series, exposure of the Ln field is performed first (step S44), exposure of the H(n+1) field is performed next (step S45), and further exposure of the H(n+2) field is performed (step S46).

The images of the exposed Ln field, H(n+1) field, and H(n+2) field are read out in synchronization with the vertical synchronization signal VD in the similar manner as described above.

After that, the cumulative addition processing of the image of the Ln field, the image of the H(n+1) field, and the image of the H(n+2) field is performed by the cumulative addition processing section 31, and a synthetic image is generated (step S47).

Then, the developing processing is performed on the synthetic image by the image processing section 32 (step S48), and the processing procedure returns from this processing to the processing shown in FIG. 3.

As a result of such processing, the image corresponding to the proper exposure time SS longer than the vertical synchronization period TVD is displayed at the cycle same as that of the vertical synchronization period TVD, as shown in FIG. 9.

Next, FIG. 10 is a flowchart showing moving image photographing processing in the image pickup apparatus. Note that description is made here assuming that the processing is the moving image photographing processing. However, the same processing (also the sub routine and the timing chart in FIG. 19, to be described later) can be applied also to the live-view.

The moving image photographing processing shown in FIG. 10 is substantially the same as the one-image photographing processing shown in FIG. 3, but is different in several points, that is, images are repeatedly obtained in the moving photographing processing, and this processing copes with also the change in the brightness of the object.

In the initialization processing performed first after the processing shown in FIG. 10 has been started, not only the mechanical shutter 21 is opened but also various kinds of counters to be used in the processing are reset (step S1A). Specifically, counters are set such that PreMixcnt=0, Mixcnt=0, and Stepcnt=0. Note that the symbol "=" used for the counter without a question mark "?" indicates that the value of the right side is assigned to the counter of the left side, and the symbol "=" used for the counter with the question mark "?" indicates equality (the symbols similar to the C language in programming are used).

PreMixcnt is a counter for indicating that the processing performed previously is which one of the processing without synthesis, the two-image synthesis processing, and the three-image synthesis processing, Mixcnt is a counter for indicating which one of the processing without synthesis, the two-image synthesis processing, and the three-image synthesis processing is being executed, and Stepcnt is a counter for indicating, regarding the loop of steps S3 to S12, whether the loop is "first time continuous loop" or "second time continuous loop or subsequent continuous loop" in the two-image synthesis processing, and whether the loop is "first time continuous loop", "second time continuous loop", or "third time continuous loop or subsequent continuous loop" in the three-image synthesis processing.

Stepcnt is used for determining which of pre-two-image synthesis processing and normal two-image synthesis processing is to be performed, with respect to the two-image synthesis processing, and determining which one of first pre-three-image synthesis processing, second pre-three-image synthesis processing, and the normal three-image synthesis processing is to be performed, with respect to the three-image synthesis processing.

After the processing in the step S1A is performed, the subsequent processings in steps S2 to S11 are performed similarly as in the one-image photographing processing shown in FIG. 3.

After that, the microcomputer 50 determines whether to finish or continue the processing of displaying and recording (step S12).

When determination is made to continue the processing, the processing procedure returns to the step S3 and the processing as described above is performed, and when determination is made to finish the processing, the processing procedure returns from this processing to the processing in the main routine, not shown.

FIG. 11 is a flowchart showing the processing without synthesis in the step S8 in FIG. 10, and FIG. 19 is a timing chart for describing the moving image photographing processing. Note that FIG. 19 shows the state where the object gradually becomes dark, and the proper exposure time SS becomes longer by degrees.

The processing shown in FIG. 11 is performed when determination has been made that SS<TVD in the step S6 in FIG. 10. In this case, the quotient obtained by dividing SS by TVD is 0, and the remainder is SS.

When the processing is started, the microcomputer 50 first performs setting such that Mixcnt=0 (step S20).

After the processings shown in steps S21 to S23 shown in FIG. 4 are performed, the microcomputer 50 performs setting such that PreMixcnt=Mixcnt (step S24), and the processing procedure returns from this processing to the processing shown in FIG. 10.

As a result of such processing, the image is displayed at the cycle same as that of the vertical synchronization period TVD, as shown in L0 to L3 in the "DISPLAY" part in FIG. 19.

FIG. 12 is a flowchart showing the two-image synthesis processing in the step S9 in FIG. 10.

The processing shown in FIG. 12 is performed when determination has been made that SS≥TVD in the step S6 in FIG. 10, and determination has been further made that SS<2TVD in the step S7. In this case, the quotient obtained by dividing SS by TVD is 1, and the remainder is (SS−TVD).

When this processing is started, the microcomputer 50 first performs setting such that Mixcnt=1 (step S51).

Next, the microcomputer 50 determines whether or not PreMixcnt=Mixcnt (step S52).

When determining that PreMixcnt≠Mixcnt, the microcomputer 50 performs setting such that Stepcnt=0 (step S53).

When the microcomputer 50 has performed the processing in the step S53, or determined that PreMixcnt=Mixcnt, the microcomputer 50 determines whether or not Stepcnt=0 (step S54).

When determination has been made that Stepcnt=0, the pre-two-image synthesis processing, which will be described later with reference to FIG. 13, is performed (step S55).

In addition, when determination has been made that Stepcnt≠0 in the step S54, the normal two-image synthesis processing, which will be described later with reference to FIG. 14, is performed (step S56).

After the processing in the step S55 or step S56 is performed, the microcomputer 50 performs setting such that PreMixcnt=Mixcnt (step S57), and the processing procedure returns from this processing to the processing shown in FIG. 10.

Next, FIG. 13 is a flowchart showing the pre-two-image synthesis processing in the step S55 in FIG. 12.

The processing shown in FIG. 13 is performed when determination has been made that Stepcnt=0 in the step S54 in FIG. 12, that is, when determination has been made that the loop of the steps S3 to S12 is the first time continuous loop in the two-image synthesis processing. In addition, the quotient obtained by dividing SS by TVD is 1, and the remainder is (SS−TVD), as described above.

When this processing is started, the vertical synchronization period TVD is set for H(n+1) field as the exposure time (step S61), the vertical synchronization period TVD is set for Hn field (step S62), and the exposure time (SS−TVD) is set for the Ln field (step S63).

Then, exposure of the Hn field and exposure of the Ln field are performed (step S64). The images of the exposed Hn field and Ln field are read out in synchronization with the vertical synchronization signal VD in the similar manner as described above.

The images of the Hn field and Ln field, which are thus read out, are saved in the memory such as the SDRAM (step S65).

The image of the Hn field is subjected to the developing processing by the image processing section 32 (step S66).

Therefore, the cumulative addition processing is not performed by the cumulative addition processing section 31 in the pre-two-image synthesis processing.

Then, the microcomputer 50 increments Stepcnt (step S67). As a result, when the two-image synthesis processing in the step S9 is started in the next loop of the steps S3 to S12, the normal two-image synthesis processing in the step S56 is started based on the determination in the step S54 in FIG. 12.

After that, the processing procedure returns from this processing to the processing shown in FIG. 12.

As a result of such processing, the image corresponding to the proper exposure time SS that is same as the vertical synchronization period TVD is shown at the cycle same as that of the vertical synchronization period TVD, as shown in H4 in the "DISPLAY" part in FIG. 19. In addition, display of H4 is performed in the vertical synchronization period TVD next to L3 in the "DISPLAY" part in FIG. 19. Therefore, a dropped frame is not generated in the display. In addition, since the exposure period of the image of H4 is TVD, the change of the exposure amount with respect to the images of the previous and next frames is smooth, which results in the image with natural brightness change.

Next, FIG. 14 is a flowchart showing the normal two-image synthesis processing in the step S56 in FIG. 12.

The processing shown in FIG. 14 is performed when determination has been made that Stepcnt≠0 in the step S54 in FIG. 12, that is, determination has been made that the loop of the steps S3 to S12 is the second time continuous loop or subsequent continuous loop in the two-image synthesis processing. In addition, the quotient obtained by dividing SS by TVD is 1, and the remainder is (SS−TVD), as described above.

When this processing is started, the above-described processings in the steps S61, S63, and S64 are performed. The above-described processing in the step S62 is not necessary (since the processing has been previously performed as the processing in the step S61 in FIG. 13 or FIG. 14 in the previous loop).

Then, the read-out image of the Ln field is saved in the memory such as SDRAM 26 (step S65A).

Subsequently, the image of the L(n−1) field is read from the memory such as SDRAM 26 (step S68).

After that, the cumulative addition processing of the image of the Hn field and the image of the L(n−1) field is performed by the cumulative addition processing section 31, and a synthetic image is generated (step S69).

Then, the developing processing is performed on the synthetic image by the image processing section 32 (step S66A), and the processing procedure returns from this processing to the processing shown in FIG. 12.

As a result of such processing, the image corresponding to the proper exposure time SS longer than the vertical synchronization period TVD is displayed at the cycle same as that of the vertical synchronization period TVD, as shown in (L4+H5) to (L9+H10) in the "DISPLAY" part in FIG. 19. In addition, similarly as described above, display of (L4+H5) is performed in the vertical synchronization period TVD next to H4 in the "DISPLAY" part in FIG. 19, which prevents a dropped frame from being generated in the display and enables the exposure amount to be changed smoothly.

FIG. 15 is a flowchart showing the three-image synthesis processing in the step S10 in FIG. 10.

The processing shown in FIG. 15 is performed when determination has been made that SS≥2TVD in the step S7 in FIG. 10 (it is assumed that SS<3TVD, as described above). In this case, the quotient obtained by dividing SS by TVD is 2, and the remainder is (SS−2TVD).

When this processing is started, the microcomputer 50 first performs setting such that Mixcnt=2 (step S71).

Next, the microcomputer 50 determines whether or not PreMixcnt=Mixcnt (step S72).

When determining that PreMixcnt≠Mixcnt, the microcomputer 50 performs setting such that Stepcnt=0 (step S73).

When the microcomputer 50 has performed the processing in the step S73 or determined that PreMixcnt=Mixcnt in the step S72, the microcomputer 50 determines whether or not Stepcnt=0 (step S74).

When determining that Stepcnt≠0, the microcomputer 50 further determines whether or not Stepcnt=1 (step S75).

When determination has been made that Stepcnt=0 in the step S74, first pre-three-image synthesis processing, which will be described later with reference to FIG. 16, is performed (step S76).

When determination has been made that Stepcnt=1 in the step S75, second pre-three-image synthesis processing, which will be described later with reference to FIG. 17, is performed (step S77).

When determination has been made that Stepcnt≠1, normal three-image synthesis processing, which will be described later with reference to FIG. 18, is performed (step S78).

After any one of the processing in the steps S76 to S78 is performed, the microcomputer 50 performs setting such that PreMixcnt=Mixcnt (step S79), and the processing procedure returns from this processing to the processing shown in FIG. 10.

FIG. 16 is a flowchart showing the first pre-three-image synthesis processing in the step S76 in FIG. 15.

The processing shown in FIG. 16 is performed when determination has been made that Stepcnt=0 in the step S74 in FIG. 15, that is, determination has been made that the loop of the steps S3 to S12 is the first time continuous loop in the three-image synthesis processing. In addition, as described above, the quotient obtained by dividing SS by TVD is 2, and the remainder is (SS−2TVD).

When this processing is started, the vertical synchronization period TVD is set for H(n+2) field as the exposure time (step S81), the vertical synchronization period TVD is set for H(n+1) field (step S82), and the exposure time (SS−2TVD) is set for the Ln field (step S83).

Then, exposure of the Hn field and exposure of the Ln field are performed (step S84). The images of the exposed Hn field and Ln field are read out in synchronization with the vertical synchronization signal VD in the similar manner as described.

The images of the Hn field and Ln field, which are thus read out, are saved in the memory such as the SDRAM (step S85).

Subsequently, the image of L(n−1) field is read from the memory such as the SDRAM 26 (step S86).

After that, the cumulative addition processing of the image of the Hn field and the image of the L(n−1) field is performed by the cumulative addition processing section 31, and a synthetic image is generated (step S87).

Then, developing processing is performed on the synthetic image by the image processing section 32 (step S88).

Further, the microcomputer 50 increments Stepcnt (step S89). As a result, Stepcnt becomes 1. That is, when the three-image synthesis processing in the step S10 is started in the next loop from the steps S3 to S12, the second pre-threeimage synthesis processing in the step S77 is started based on the determination in the step S75 in FIG. 15.

After that, the processing procedure returns from this processing to the processing shown in FIG. 15.

As a result of such processing, the image corresponding to the proper exposure time SS longer than the vertical synchronization period TVD is displayed at the cycle same as that of the vertical synchronization period TVD, as shown in (L10+H11) in the "DISPLAY" part in FIG. 19. In addition, display of (L10+H11) is performed in the vertical synchronization period TVD next to (L9+H10) in the "DISPLAY" part in FIG. 19. Therefore, a dropped frame is not generated in the display. In addition, in the image of (L10+H11), the change of the exposure amount with respect to the images of previous and next frames is smooth, which results in the image with natural brightness change.

FIG. 17 is a flowchart showing the second pre-three-image synthesis processing in the step S77 in FIG. 15.

The processing shown in FIG. 17 is performed when determination has been made that Stepcnt=1 in the step S75 in FIG. 15, that is, determination has been made that the loop of the steps S3 to S12 is the second time continuous loop in the three-image synthesis processing. In addition, as described above, the quotient obtained by dividing SS by TVD is 2, and the remainder is (SS−2TVD).

When this processing is started, the processings in the steps S81, and S83 to S85 are performed. The above-described processing in the step S82 is not necessary (since the processing has been previously performed as the processing in the step S81 in FIG. 16 in the previous loop).

Subsequently, the image of H(n−1) field is read from the memory such as the SDRAM 26 (step S86A).

Then, the cumulative addition processing of the image of the Hn field and the image of the H(n−1) field is performed by the cumulative addition processing section 31, and a synthetic image is generated (step S87A).

After that, the developing processing in the step S88 is performed and the microcomputer 50 increments Stepcnt in the step S89. As a result, Stepcnt becomes 2. That is, when the three-image synthesis processing in the step S10 is started in the next loop of the steps S3 to S12, the normal three-image synthesis processing in the step S78 is started based on the determination in the step S75 in FIG. 15.

After that, the processing procedure returns from this processing to the processing shown in FIG. 15.

As a result of such processing, the image corresponding to the proper exposure time SS longer than the vertical synchronization period TVD is displayed at the cycle same as that of the vertical synchronization period TVD, as shown in (H11+H12) in the "DISPLAY" part in FIG. 19. In addition, display of (H11+H12) is performed in the vertical synchronization period TVD next to (L10+H11) in the "DISPLAY" part in FIG. 19. Therefore, a dropped frame is not generated in the display. In addition, since the exposure period of the image of (H11+H12) is 2TVD, the change of the exposure amount with respect to the images of previous and next frames is smooth, which results in the image with natural brightness change.

FIG. 18 is a flowchart showing the normal three-image synthesis processing in the step S78 in FIG. 15.

The processing shown in FIG. 18 is performed when determination has been made that Stepcnt≠1 in the step S75 in FIG. 15, that is, determination has been made that the loop of the steps S3 to S12 is the third time continuous loop or subsequent continuous loop in the three-image synthesis processing. In addition, as described above, the quotient obtained by dividing SS by TVD is 2, and the remainder is (SS−2TVD).

When this processing is started, the processings in the steps S81, S83 to S85, and S86A are performed. The above-described processing in the step S82 is not necessary (since the processing has been previously performed as the processing in the step S81 in FIG. 17 or FIG. 18 in the previous loop).

Furthermore, the image of L(n−2) field is read from the memory such as the SDRAM 26 (step S86B).

Then, the cumulative addition processing of the image of the Hn field, the image of the H(n−1) field, and the image of the L(n−2) field is performed by the cumulative addition processing section 31, and a synthetic image is generated (step S87B).

Then, the developing processing in the step S88 is performed and the processing procedure returns from this processing to the processing shown in FIG. 15.

As a result of such processing, the image corresponding to the proper exposure time SS longer than the vertical synchronization period TVD is displayed at the cycle same as that of the vertical synchronization period TVD, as shown in (L11+H12+H13), (L12+H13+H14), . . . in the "DISPLAY" part in FIG. 19. In addition, similarly as described above, display of (L11+H12+H13) is performed in the vertical synchronization period TVD next to (H11+H12) in the "DISPLAY" part in FIG. 19, which prevents a dropped frame from being generated in the display. In addition, since the image of the frame after the image of (H11+H12) whose exposure period is 2TVD is the image of (L11+H12+H13), the change of the exposure amount is smooth, to thereby provide the image with natural brightness change.

Thus, in the image pickup apparatus, when the state is shifted from the state where the proper exposure time SS is shorter than the frame period and synthesis processing is not performed by the cumulative addition processing section 31 as the synthesizing section to the state where two images are synthesized in the moving image or the live view under the control by the microcomputer 50, a long exposure image of one frame is used as an image for recording or displaying (see the pre-two-image synthesis processing in FIG. 13 and H4 in the "DISPLAY" part in FIG. 19). In addition, when the state is shifted from the state where the cumulative addition processing section 31 as the synthesizing section synthesizes j images (j is an integer equal to or greater than 2) to the state where the cumulative addition processing section 31 synthesizes (j+1) images, a synthetic image is generated by using only the long exposure images and the synthetic image is used as an image for recording or displaying during at least one frame (see the second pre-three-image synthesis processing in FIG. 17, and (H11+H12) in the "DISPLAY" part in FIG. 19).

Note that FIG. 19 illustrates the state where the object gradually becomes dark and the proper exposure time SS gradually becomes long, as described above. In contrast, when the object gradually becomes bright, and the proper exposure time SS gradually becomes short, the pre-two-image synthesis processing shown in FIG. 13, the first pre-three-image synthesis processing in FIG. 16, and the second pre-three-image synthesis processing in FIG. 17 may be omitted.

In addition, in the description above, the cumulative addition processing section 31 as the synthesizing section is configured to obtain the synthetic image which is same as the image exposed continuously for the proper exposure time SS by synthesizing the continuous long exposure images and the short exposure image. However, the present invention is not limited to such a configuration. For example, the short exposure image and the long exposure image of the same one frame may be synthesized in order only to obtain a synthetic image with the exposure amount corresponding to the proper exposure time SS.

In the exemplary configuration shown in FIG. 1, the image pickup device 22 configured as the HDR sensor is used as the image pickup section that outputs, for every frame period, the long exposure image exposed for the long exposure time and the short exposure image exposed for the short exposure time within the exposure period of the long exposure image, when the proper exposure time SS is longer than the frame period. The present invention, however, is not limited to such a configuration.

FIG. 20 is a block diagram showing the configuration of the image pickup apparatus in a modified example of the present embodiment. The modified example shown in FIG. 20 is an example of what is called a twin-lens reflex camera that forms two optical images on the two image pickup devices.

The interchangeable lens 1 further includes a half mirror 16 on the optical paths of the lens 11 and the diaphragm 12, and is configured to form two optical images of the object.

A mechanical shutter 21A and an image pickup device 22A are arranged on an optical path of one of the optical images, and an analog image signal read out from the image pickup device 22A is processed by an analog processing section 23A and converted into a digital image signal by an A/D conversion section 24A.

In addition, a mechanical shutter 21B and an image pickup device 22B are arranged on an optical path of the other of the optical images, and an analog image signal read out from the image pickup device 22B is processed by an analog processing section 23B and converted into a digital image signal by an A/D conversion section 24B.

In such a configuration, in the case of the moving image photographing and the live view, exposure time of the image generated by the image pickup device 22A may be made different from the exposure time of the image generated by the image pickup device 22B by differentiating the operations of the electronic shutters of the image pickup device 22A and the image pickup device 22B. In the case of the sequential photographing, the exposure time of the image generated by the image pickup device 22A may be made different from the exposure time of the image generated by the image pickup device 22B by differentiating the open/close times of the mechanical shutter 21A and the mechanical shutter 21B.

Furthermore, the image pickup section, which is configured to output, for every frame period, the long exposure image exposed for the long exposure time and a short exposure image exposed for the short exposure time within the exposure period of the long exposure image when the proper exposure time SS is longer than the frame period, is not limited to the above-described example, and an image pickup device capable of non-destructively reading out an image may be used, for example. When such an image pickup device is used, the short exposure image may be read out non-destructively at the time when the short exposure time has elapsed from the start of the exposure and the long exposure image may be read out at the time when the long exposure time has elapsed from the start of the exposure, for every frame period.

With such a first embodiment, when the proper exposure time SS is longer than the vertical synchronization period TVD as the frame period, the long exposure time equal to or shorter than the frame period and the short exposure time shorter than the long exposure time are set such that the total time of the short exposure time and one or more long exposure times is equal to the proper exposure time SS, the long exposure image exposed for the long exposure time and the short exposure image exposed for the short exposure time within the exposure period of the long exposure image are outputted for every frame period, and the short exposure image of one frame and the long exposure image or the long exposure images of one or more frames are added to generate a synthetic image corresponding to the proper exposure time SS. Therefore, it is enabled to obtain the image corresponding to an arbitrary exposure time longer than the frame period without decreasing the frame rate.

It is possible to obtain a proper exposure image with an accurate exposure amount with the smallest number of frames, by setting the vertical synchronization period TVD, which is the frame period, as the long exposure time and setting the remainder obtained by dividing the proper exposure time SS by the long exposure time as the short exposure time.

Furthermore, it is enabled to obtain the long exposure image and the short exposure image from which the image same as the image exposed continuously for the proper exposure time SS can be synthesized, by setting the quotient by dividing the proper exposure time SS by the long exposure time as the number of frames, and setting the long exposure time for the frames that are continuous by the number of frames.

In addition, it is enabled to select a desired control method of starting and finishing the exposure in synchronization with the vertical synchronization signal, by setting the short exposure time for the frame before the first frame of the frames that are continuous by the number of frames or for the frame after the last frame of the frames that are continuous by the number of frames.

In addition, synthesizing the long exposure images of the frames that are continuous by the number of frames and one short exposure image enables the image same as the image exposed continuously for the proper exposure time SS to be obtained as the synthetic image. Furthermore, the obtained synthetic image does not include a non-exposure period in the middle of frames, which prevents unnatural discontinuity from being generated in an object blur in the case where a moving object exists, for example.

In addition, a storing section that temporarily stores at least one of the short exposure image and the long exposure image is further provided, to thereby eliminate a delay circuit and the like, and enable an image synthesis to be performed at a desired time point.

Furthermore, in the moving image or the live view, when the state is shifted from the state where the proper exposure time SS is shorter than the frame period and synthesizing is not performed by the synthesizing section to the state where two images are synthesized, the long exposure image of one frame is used as an image for recording or displaying, and when the state is shifted from the state where the synthesizing section synthesizes j images (j is an integer equal to or greater than 2) to the state where the synthesizing section synthesizes (j+1) images, a synthetic image is generated by using only the long exposure image and the synthetic image is used as the image for recording or displaying during at least one frame. Therefore, it is enabled to prevent a dropped frame from being generated in the display and prevent the brightness of the image from changing unnaturally when the number of images to be synthesized by the synthesizing section is changed.

Note that the above-described sections may be configured as circuits. Arbitrary circuits may be mounted as a single circuit or as circuits by combining a plurality of circuits, as long as the circuit or circuits are capable of performing the functions same as those in the above-described embodiment. Furthermore, arbitrary circuits are not limited to those configured as dedicated circuits for performing intended functions, and may be configured to perform intended functions by causing a general-use circuit to execute a processing program.

Description has been made above mainly on the image pickup apparatus. The present invention, however, may be an image pickup method for performing control same as the control performed by the image pickup apparatus, a computer program for causing a computer to execute processing same as the processing performed by the image pickup apparatus, a non-transitory computer-readable medium storing the computer program, and the like.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image pickup apparatus comprising:
an exposure control circuit that determines a proper exposure time, and sets, when the proper exposure time is longer than a frame period, a long exposure time equal to or shorter than the frame period and a short exposure time shorter than the long exposure time such that a total time of the short exposure time and one or more long exposure times is equal to the proper exposure time;
an image pickup circuit that outputs, for every frame period, a long exposure image exposed for the long exposure time and a short exposure image exposed for the short exposure time within an exposure period of the long exposure image, when the proper exposure time is longer than the frame period; and
a synthesizing circuit that adds the short exposure image of one frame and the long exposure image or long exposure images of one or more frames, to generate a synthetic image corresponding to the proper exposure time, when the proper exposure time is longer than the frame period.

2. The image pickup apparatus according to claim 1, wherein the exposure control circuit sets the frame period as the long exposure time, and sets a remainder obtained by dividing the proper exposure time by the long exposure time as the short exposure time.

3. The image pickup apparatus according to claim 2, wherein the exposure control circuit sets a quotient obtained by dividing the proper exposure time by the long exposure time as a number of frames, and sets the long exposure time for frames that are continuous by the number of frames.

4. The image pickup apparatus according to claim 3, wherein the exposure control circuit sets the short exposure time for a frame before a first frame of the frames that are continuous by the number of frames or for a frame after a last frame of the frames that are continuous by the number of frames.

5. The image pickup apparatus according to claim 4, wherein the synthesizing circuit synthesizes the long exposure image of the frames that are continuous by the number of frames and the one short exposure image.

6. The image pickup apparatus according to claim 1, further comprising a storing circuit that temporarily stores at least one of the short exposure image and the long exposure image.

7. The image pickup apparatus according to claim 1, wherein, in a moving image or a live view, when a state is shifted from a state where the proper exposure time is shorter than the frame period and synthesizing is not performed by the synthesizing circuit to a state where the synthesizing circuit synthesizes two images, the long exposure image of one frame is used as an image for recording or displaying, and when the state is shifted from a state where the synthesizing circuit synthesizes j (j is an integer equal to or larger than 2) images to a state where the synthesizing circuit synthesizes (j+1) images, only the long exposure images are used to generate a synthetic image and the synthetic image is used as the image for recording or displaying, during at least one frame.

8. A non-transitory computer-readable medium storing a computer program for causing a computer to execute:
an exposure control step of determining a proper exposure time, and setting, when the proper exposure time is longer than a frame period, a long exposure time equal to or shorter than the frame period and a short exposure time shorter than the long exposure time such that a total time of the short exposure time and one or more long exposure times is equal to the proper exposure time;
an image pickup step of outputting, for every frame period, a long exposure image exposed for the long exposure time and a short exposure image exposed for the short exposure time within an exposure period of the long exposure image, when the proper exposure time is longer than the frame period; and
a synthesizing step of adding the short exposure image of one frame and the long exposure image or long exposure images of one or more frames, to generate a synthetic image corresponding to the proper exposure time, when the proper exposure time is longer than the frame period.

9. An image pickup method comprising:
an exposure control step of determining a proper exposure time, and setting, when the proper exposure time is longer than a frame period, a long exposure time equal to or shorter than the frame period and a short exposure time shorter than the long exposure time such that a total time of the short exposure time and one or more long exposure times is equal to the proper exposure time;
an image pickup step of outputting, for every frame period, a long exposure image exposed for the long exposure time and a short exposure image exposed for the short exposure time within an exposure period of the long exposure image, when the proper exposure time is longer than the frame period; and
a synthesizing step of adding the short exposure image of one frame and the long exposure image or long exposure images of one or more frames, to generate a synthetic image corresponding to the proper exposure time, when the proper exposure time is longer than the frame period.

* * * * *